US008708570B2

(12) United States Patent
Umekida et al.

(10) Patent No.: US 8,708,570 B2
(45) Date of Patent: Apr. 29, 2014

(54) BEARING DEVICE FOR WHEEL

(75) Inventors: Mitsuru Umekida, Iwata (JP); Shin Tomogami, Iwata (JP); Kiyotake Shibata, Iwata (JP); Yuichi Asano, Iwata (JP); Hisaaki Kura, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/517,376

(22) PCT Filed: Nov. 29, 2010

(86) PCT No.: PCT/JP2010/071277
§ 371 (c)(1),
(2), (4) Date: Jul. 18, 2010

(87) PCT Pub. No.: WO2011/077903
PCT Pub. Date: Jun. 30, 2011

(65) Prior Publication Data
US 2012/0281941 A1 Nov. 8, 2012

(30) Foreign Application Priority Data

Dec. 21, 2009 (JP) .................................. 2009-289171
Dec. 24, 2009 (JP) .................................. 2009-292566

(51) Int. Cl.
*F16C 33/64* (2006.01)
(52) U.S. Cl.
USPC ......................................... 384/544; 384/542
(58) Field of Classification Search
USPC .................... 384/544, 542; 464/178
See application file for complete search history.

(56) References Cited

U.S. PATENT DOCUMENTS

| 7,811,176 | B2 * | 10/2010 | Cermak ........................ 464/178 |
| 2001/0016520 | A1 | 8/2001 | Sahashi et al. |
| 2009/0180726 | A1 | 7/2009 | Siebeneick et al. |
| 2010/0209035 | A1 | 8/2010 | Ozawa et al. |

(Continued)

FOREIGN PATENT DOCUMENTS

| DE | 10 2006 034 039 | 1/2008 |
| DE | 10 2006 042 533 | 3/2008 |

(Continued)

OTHER PUBLICATIONS

Supplementary European Search Report dated Jun. 24, 2013 in corresponding European Patent Application No. 10839138.4.

(Continued)

*Primary Examiner* — Thomas R Hannon
(74) *Attorney, Agent, or Firm* — Wenderoth, Lind & Ponack, L.L.P.

(57) ABSTRACT

A hub wheel (21) and an outer joint member (3) are coupled to each other through intermediation of a recess-projection fitting structure (M). The recess-projection fitting structure (M) can be separated by being applied with a pulling-out force in an axial direction under a state in which a bolt member (30) is removed, and can be re-formed by re-screwing the bolt member (30) into a bolt hole (5*d*). The hub wheel (21) comprises a receiving portion (23*a*) for receiving the bolt member (30). The shaft portion (5) has a small diameter portion (5*a*) serving as a fit-in portion to be fitted along an inner periphery of the receiving portion (23*a*) under a state in which the recess-projection fitting structure (M) is formed. The small diameter portion (5*a*) is used as a part for confirming the accuracy and the state of the recess-projection fitting structure (M).

33 Claims, 30 Drawing Sheets

(56) References Cited

U.S. PATENT DOCUMENTS

| | | |
|---|---|---|
| 2010/0220946 A1 | 9/2010 | Ozawa et al. |
| 2011/0009199 A1 | 1/2011 | Yamauchi et al. |
| 2011/0012420 A1 | 1/2011 | Nakagawa et al. |
| 2012/0313425 A1 | 12/2012 | Siebeneick et al. |

FOREIGN PATENT DOCUMENTS

| | | |
|---|---|---|
| DE | 10 2008 003 646 | 7/2009 |
| JP | 2001-241459 | 9/2001 |
| JP | 2004-340311 | 12/2004 |
| JP | 2008-230489 | 10/2008 |
| JP | 2009-56869 | 3/2009 |
| JP | 2009-067193 | 4/2009 |
| JP | 2009-097627 | 5/2009 |
| JP | 2009-255725 | 11/2009 |
| JP | 2009-255729 | 11/2009 |
| JP | 2009-262623 | 11/2009 |
| JP | 2009-270627 | 11/2009 |
| JP | 2009-270629 | 11/2009 |
| WO | 2009/051047 | 4/2009 |

OTHER PUBLICATIONS

International Preliminary Report on Patentability and Written Opinion of the International Searching Authority issued Jul. 19, 2012 in International (PCT) Application No. PCT/JP2010/071277.

International Search Report issued Feb. 22, 2011 in International (PCT) Application No. PCT/JP2010/071277.

* cited by examiner

US 8,708,570 B2

BEARING DEVICE FOR WHEEL

TECHNICAL FIELD

The present invention relates to a bearing device for wheel, for supporting a wheel of a vehicle such as an automobile so that the wheel is freely rotatable with respect to a vehicle body.

BACKGROUND ART

As a bearing device for wheel, there have been developed the following types: a structure called a first generation type in which roller bearings are used in double row combination; a second generation type evolved from the first generation type, in which a vehicle body mounting flange is integrated with an outer member; a third generation type in which one of two inner raceway surfaces of the double row roller bearing is formed on an outer periphery of a hub wheel provided with a wheel mounting flange; and a fourth generation type in which the one of the two inner raceway surfaces of the double row roller bearing is formed on the outer periphery of the hub wheel, and another of the two inner raceway surfaces of the double row roller bearing is formed on an outer periphery of an outer joint member of a constant velocity universal joint.

For example, Patent Literature 1 below describes one example of the bearing device for wheel of the above-mentioned third generation type. The bearing device for wheel described in Patent Literature 1 comprises: a bearing for wheel comprising a hub wheel provided with a flange to be mounted to a wheel, and an outer member arranged on an outer peripheral side of the hub wheel; and a constant velocity universal joint comprising an outer joint member to be coupled to the hub wheel. In this bearing device for wheel, the hub wheel and the outer joint member are coupled to each other by press-fitting a male spline provided to a shaft portion of the outer joint member to a female spline provided to a hole portion of the hub wheel, that is, what is called spline fitting. However, coupling of the hub wheel and the outer joint member to each other by spline fitting has problems as follows. First, it is necessary for both the shaft portion of the outer joint member and the hub wheel to be provided with a spline, which leads to a cost increase. Further, regarding fitting of recesses and projections of the male spline and the female spline to each other, which is necessary to perform at the time of press-fitting, when press-fitting is performed by tooth surface fitting, tooth surfaces may be damaged, for example, by being scraped. Meanwhile, when press-fitting is performed by large diameter fitting, backlash in the circumferential direction is liable to occur. The backlash in the circumferential direction may lead to deterioration in torque transmission efficiency and generation of abnormal noise.

In view of the above-mentioned circumstances, the applicants of the present application have proposed a bearing device for wheel described in JP 2009-56869 A (Patent Literature 2), which is capable of solving the above-mentioned various problems. Specifically, projection portions provided to any one of the shaft portion of the outer joint member and the hole portion of the hub wheel and extending in an axial direction are press-fitted to another of the shaft portion of the outer joint member and the hole portion of the hub wheel so that recessed portions are formed with the projection portions along the another of the shaft portion of the outer joint member and the hole portion of the hub wheel. In this way, there is formed a recess-projection fitting structure in which the projection portions and the recessed portions are held in intimate contact at fitting parts with each other, and the hub wheel and the outer joint member are coupled to each other through intermediation of this recess-projection fitting structure.

Further, for example, when the bearing device for wheel is repaired, it may be difficult to repair the bearing device for wheel under a state in which the hub wheel and the outer joint member are coupled to each other. Thus, in order that a bearing part and a joint part can be individually repaired, it is desired that the hub wheel and the outer joint member be separable from each other. Moreover, after the hub wheel and the outer joint member are separated from each other, it is necessary for both the hub wheel and the outer joint member to be re-coupled to each other. In this regard, the above-mentioned recess-projection fitting structure is separable by being applied with a pulling-out force in the axial direction under a state in which the bolt member is removed from the bolt hole provided in the shaft portion. Thus, satisfactory repair operation properties can be secured. Further, after the repair, the above-mentioned recess-projection fitting structure can be re-formed by press-fitting the shaft portion of the outer joint member into the hole portion of the hub wheel. Specifically, the recess-projection fitting structure can be re-formed by screwing the bolt member into the bolt hole provided in the shaft portion. Thus, in order to re-form the recess-projection fitting structure, it is no longer necessary to use a large-scale equipment such as a press machine for press-fitting. Therefore, on site such as an automobile maintenance factory, inspection, repair, and the like of the bearing device for wheel can be easily performed.

CITATION LIST

Patent Literature 1: JP 2004-340311 A
Patent Literature 2: JP 2009-56869 A

SUMMARY OF INVENTION

Technical Problems

However, there is room for improvement also in the bearing device for wheel described in Patent Literature 2. Various performances (coupling strength, torque transmission performance, and the like of the hub wheel and the outer joint member) of this bearing device for wheel significantly depend on the way of forming the recess-projection fitting structure (press-fitting accuracy of the shaft portion of the outer joint member with respect to the hole portion of the hub wheel). Thus, after formation and re-formation of the recess-projection fitting structure, it is necessary to confirm whether or not the recess-projection fitting structure is formed with desired accuracy and in a desired way. However, in the bearing device for wheel described in Patent Literature 2, it is structurally difficult to accurately confirm the accuracy of the recess-projection fitting structure particularly after the re-formation. The reason for the difficulty is described in detail below.

First, FIG. 15 illustrates a main-part sectional view of the bearing device for wheel described in Patent Literature 2. In this bearing device for wheel, a double row bearing for wheel 82 comprising a hub wheel 81 and an outer member 83, and a constant velocity universal joint 85 comprising an outer joint member 86 provided with a mouth portion 87 and a shaft portion 88 are coupled and integrated with each other through intermediation of a recess-projection fitting structure 90. The outer member 83 of the bearing for wheel 82 is fixed to a knuckle 84 extending from a suspension of a vehicle body (not shown). In this case, through press-fitting of projection portions 91 provided on an outer surface of the shaft portion 88 and extending in an axial direction into a hole portion of the hub wheel 81, recessed portions 92 are formed in an inner surface of the hole portion, and the projection portions 91 and the recessed portions 92 are held in intimate contact with each other at fitting parts. In this way, the recess-projection fitting structure 90 is formed. Further, the hub wheel 81 and the outer joint member 86 are tightened to each other by screwing a bolt member 93 into a bolt hole 88a provided in the shaft portion 88 of the outer joint member 86. In order to perform a repair operation and an inspection operation, the bolt member 93 is removed to separate the recess-projection fitting structure 90. After those operations are completed, as described above, the recess-projection fitting structure 90 is re-formed by screwing the bolt member 93 into the bolt hole 88a provided in the shaft portion 88.

After the recess-projection fitting structure 90 is re-formed, as described above, it is necessary to confirm whether or not the recess-projection fitting structure 90 is formed with desired accuracy and in a desired way. As a method of confirming the accuracy and the way, confirmation of a relative position in the axial direction of the hub wheel 81 and the outer joint member 86 can be conceived. However, normally, the repair operation of the bearing device for wheel is performed under the state in which the outer member 83 of the bearing for wheel 82 is fixed to the knuckle 84. Thus, it is difficult to employ the confirmation method as described above. That is, the relative position in the axial direction of the hub wheel 81 and the outer joint member 86 can be confirmed, for example, through measurement of an axial clearance between an end surface 81a of the hub wheel 81 and an end surface 87a of the mouth portion 87 of the outer joint member 86 facing each other. However, this part is covered with the knuckle 84, and hence such a measurement operation is markedly difficult. When the recess-projection fitting structure 90 is re-formed, tightening torque of the bolt member 93 is controlled, and hence the accuracy of the recess-projection fitting structure 90 can be confirmed by this controlled torque. However, the shaft portion 88 may be press-fitted in an inclined state, and hence it is risky to assure the accuracy of the recess-projection fitting structure 90 only with the controlled torque.

Further, also regarding other factors than those described above, there is room for improvement in the bearing device for wheel described in Patent Literature 2. Specifically, when the above-mentioned recess-projection fitting structure is formed and re-formed, the recess-projection fitting structure of predetermined accuracy cannot be obtained unless the shaft portion of the outer joint member is press-fitted into the hole portion of the hub wheel with high accuracy. As a result, coupling strength, torque transmission performance, and the like of the hub wheel and the outer joint member may be adversely affected. In order to obtain a recess-projection fitting structure having high accuracy, it is effective to control a relative posture of the hub wheel and the outer joint member, particularly at the starting stage of press-fitting. However, Patent Literature 2 does not describe this point at all.

In view of the above-mentioned circumstances, the present invention has been made to achieve a first object of providing a highly reliable bearing device for wheel which enables the operation of confirming the accuracy and the state of the recess-projection fitting structure that is re-formed by re-coupling the hub wheel and the outer joint member to each other to be easily and accurately performed, and which maintains excellent characteristics such as high coupling strength and excellent torque transmission performance even after the hub wheel and the outer joint member are re-coupled to each other.

Further, a second object of the present invention is to provide a bearing device for wheel in which the hub wheel and the outer joint member are coupled and re-coupled to each other with high accuracy even after being separated from each other.

Solution to Problems

According to a first invention of the present application invented to achieve the above-mentioned first object, there is provided a bearing device for wheel, comprising: a bearing for wheel comprising: an outer member having an inner periphery on which double row outer raceway surfaces of the outer member are formed; and an inner member comprising a hub wheel to be mounted to a wheel and having an outer periphery on which double row inner raceway surfaces respectively facing the double row outer raceway surfaces are formed; a constant velocity universal joint comprising an outer joint member; and a recess-projection fitting structure, which is formable by press-fitting a projection portion provided to any one of a shaft portion of the outer joint member and a hole portion of the hub wheel and extending in an axial direction to another of the shaft portion of the outer joint member and the hole portion of the hub wheel so that a recessed portion is formed with the projection portion along the another of the shaft portion of the outer joint member and the hole portion of the hub wheel, and in which the projection portion and the recessed portion are held in intimate contact at a fitting part with each other, the hub wheel and the outer joint member being tightened to each other by screwing a bolt member into a bolt hole provided in the shaft portion of the outer joint member, the recess-projection fitting structure being allowed to be separated by being applied with a pulling-out force in the axial direction under a state in which the bolt member is removed, wherein the hub wheel comprises a receiving portion for the bolt member so that the hub wheel and the outer joint member are tightened with the bolt member to each other between the receiving portion and the bolt hole, and wherein the shaft portion of the outer joint member comprises a fit-in portion to be fitted along an inner periphery of the receiving portion under a state in which the recess-projection fitting structure is formed, the fit-in portion being used as a part for confirming a fitting condition of the recess-projection fitting structure.

Note that, in the recess-projection fitting structure in the above-mentioned first invention, as described above, the projection portion and the recessed portion are held in intimate contact at the fitting part with each other. However, a gap may exist in only a partial region of the fitting part. Such a gap is inevitably formed during a process of forming the recessed portion with the projection portion. Thus, such a gap is encompassed in the concept that "the projection portion and the recessed portion are held in intimate contact at the fitting part." Further, the concept of "state in which the recess-projection fitting structure is formed" in the first invention also encompasses not only the state in which the recess-projection fitting structure is formed first but also the state in which the recess-projection fitting structure is re-formed after being separated.

According to the structure of the above-mentioned first invention, when the bolt member is removed after the recess-projection fitting structure is re-formed (after the hub wheel and the outer joint member are re-coupled to each other), the fit-in portion provided to the shaft portion of the outer joint member is exposed to an outside so that the fit-in portion can be viewed from an outboard side. Then, for example, through measurement of an axial clearance between an end surface of the receiving portion and an end surface of the fit-in portion, it is possible to confirm a relative position in the axial direction of the outer joint member with respect to the hub wheel, specifically, confirm a fitting condition of the recess-projection fitting structure (accuracy and state of the recess-projection fitting structure). Thus, even when the hub wheel and the outer joint member are re-coupled to each other under the state in which the bearing for wheel is mounted to a vehicle body (knuckle), an operation of confirming the accuracy and the way of forming the recess-projection fitting structure can be easily and accurately performed. With this, it is possible to provide the highly reliable bearing device for wheel which maintains excellent characteristics such as high coupling strength and excellent torque transmission performance even after the hub wheel and the outer joint member are re-coupled to each other.

In the above-mentioned structure, a guide portion for guiding the press-fitting of the projection portion (phasing the projection portion and the recessed portion formed by the projection portion with respect to each other) may be provided at an end portion on a projection-portion-press-fitting start side of the another of the shaft portion of the outer joint member and the hole portion of the hub wheel. When such a guide portion is provided in advance, the projection portion can be press-fitted along this guide portion, and hence the projection portion can be press-fitted with higher accuracy. As a result, a recess-projection fitting structure having much higher accuracy can be formed and re-formed.

Further, according to a second invention of the present application invented to achieve the above-mentioned second object, there is provided a bearing device for wheel, comprising: a bearing for wheel comprising: an outer member having an inner periphery on which double row outer raceway surfaces are formed; an inner member comprising a hub wheel to be mounted to a wheel and having an outer periphery on which double row inner raceway surfaces respectively facing the double row outer raceway surfaces are formed; and a plurality of double row rolling elements interposed between the double row outer raceway surfaces and the double row inner raceway surfaces; a constant velocity universal joint comprising an outer joint member; and a recess-projection fitting structure, which is formable by press-fitting a projection portion provided to any one of a shaft portion of the outer joint member and a hole portion of the hub wheel and extending in an axial direction to another of the shaft portion of the outer joint member and the hole portion of the hub wheel so that a recessed portion is formed with the projection portion along the another of the shaft portion of the outer joint member and the hole portion of the hub wheel, and in which the projection portion and the recessed portion are held in intimate contact over an entire fitting part with each other, the hub wheel and the outer joint member being tightened to each other by a bolt member screwed into a bolt hole provided in the shaft portion of the outer joint member, the recess-projection fitting structure being allowed to be separated by being applied with a pulling-out force in the axial direction under a state in which the bolt member is removed, wherein the hub wheel has a receiving surface, which is formed directly or through intermediation of a separate member, for the bolt member so that the hub wheel and the outer joint member are tightened with the bolt member to each other between the receiving surface and the bolt hole, wherein a guide portion for guiding the press-fitting of the projection portion is provided at an end portion on a press-fitting start side of the another of the shaft portion of the outer joint member and the hole portion of the hub wheel, and wherein a length of the bolt member is set so that, at re-assembly of the recess-projection fitting structure after separation of the recess-projection fitting structure, a male threaded portion of the bolt member having a seat surface held in abutment against the receiving surface is free from being engaged with a female threaded portion of the bolt hole until an end portion on the press-fitting start side of the projection portion is fitted to the guide portion.

Note that, in the recess-projection fitting structure in the above-mentioned second invention, as described above, the projection portion and the recessed portion are held in intimate contact over the entire fitting part with each other. However, a gap may exist in only a partial region of the fitting part. Such a gap is inevitably formed during a process of forming the recessed portion with the projection portion. Thus, such a gap is encompassed in the concept that "the projection portion and the recessed portion are held in intimate contact over the entire fitting part." Further, the concept of "guiding the press-fitting of the projection portion" encompasses both "guiding the press-fitting of the projection portion for forming the recessed portion" and "guiding the press-fitting of the projection portion at the time of re-forming the recess-projection fitting structure after separating the recess-projection fitting structure" (that is, guiding phasing of the projection portion and the recessed portion with respect to each other).

As described above, in the bearing device for wheel according to the second invention of the present application, the guide portion for guiding the press-fitting of the projection portion (phasing the projection portion and the recessed portion formed with the projection portion with respect to each other) is provided at the end portion on the projection-portion-press-fitting start side of the another of the shaft portion of the outer joint member and the hole portion of the hub wheel (member to be provided with the recessed portion). When such a guide portion is provided in advance, the projection portion can be press-fitted along this guide portion, and hence the projection portion can be press-fitted with higher accuracy. Thus, a situation in which the projection portion is press-fitted in a decentered state or an inclined state is prevented as much as possible. As a result, a recess-projection fitting structure having high accuracy can be obtained, and the recess-projection fitting structure having high accuracy can be re-formed.

In addition, the length of the bolt member is set so that, at re-assembly of the recess-projection fitting structure after separation of the recess-projection fitting structure, the male threaded portion of the bolt member having a seat surface held in abutment against the receiving surface are free from being engaged with the female threaded portion of the bolt hole until the end portion on the press-fitting start side of the projection portion is fitted to the guide portion. For example, when the bolt member to be used is excessively long, the bolt member is threadedly engaged into the bolt hole under a state in which the projection portion and the recessed portion are not phased with respect to each other in the circumferential direction. Thus, along with screwing-in of the bolt member, the shaft portion is press-fitted into the hole portion in an inclined state. As a result, there arises a problem that the recess-projection fitting structure of predetermined accuracy cannot be re-formed. Meanwhile, when the bolt member to be used is excessively short, the bolt member is not threadedly engaged into the bolt hole, and hence the recess-projection fitting structure cannot be re-formed by screwing-in of the bolt member. In this regard, when the above-mentioned structure of the present invention is employed, the above-mentioned problems which may be caused by such inappropriate lengths of the bolt member can be reliably solved. As a result, the recess-projection fitting structure having high accuracy can be re-formed.

In each structure described above, it is desired that, when the projection portion is provided to the shaft portion of the outer joint member, a hardness of at least the end portion on the press-fitting start side of the projection portion be set to be higher than a hardness of an inner diameter portion of the hole portion of the hub wheel. With this, rigidity of the shaft portion can be increased, and the projection portion bites into the inner diameter portion of the hole portion of the hub wheel with higher bite-in performance.

In this case, the shaft portion of the outer joint member may comprise a pocket portion for accommodating an extruded portion formed along with formation of the recessed portion by the press-fitting of the projection portion. In this case, the extruded portion is formed of a material pushed out from the formed recessed portion, trimmed for forming the recessed portion, or both pushed out and trimmed by an amount corresponding to a capacity of the recessed portion formed by the press-fitting of the projection portion. When the pocket portion is provided, the extruded portion can be retained in the pocket portion, and the extruded portion is prevented from intruding into a vehicle and the like. Further, in this case, the extruded portion can be left accommodated within the pocket portion, and hence it is no longer necessary to perform removal treatment for the extruded portion. Thus, assembly man-hours can be reduced, which leads to enhancement of assembly operability and cost reduction.

It is desired that, when the projection portion is provided to an inner surface of the hole portion of the hub wheel, a hardness of at least the end portion on the press-fitting start side of the projection portion be set to be higher than a hardness of an outer diameter portion of the shaft portion of the outer joint member. In this case, it is unnecessary to perform thermosetting treatment on the shaft portion side, and hence productivity of the outer joint member can be enhanced. Further, in this case, the above-mentioned pocket portion is formed in the hole portion of the hub wheel.

When the projection portion comprises a plurality of projection portions provided at a plurality of points in a circumferential direction, it is desired that, at an intermediate portion of each of the plurality of projection portions in a height direction, a circumferential thickness of the each of the plurality of projection portions be set to be smaller than a groove width between adjacent ones of the plurality of projection portions. In this case, a thickness of a body of the hub wheel having intruded into the groove between the adjacent ones of the plurality of projection portions is large in the circumferential direction. Thus, a shear surface area of the body of the hub wheel can be increased, and hence torsional strength can also be increased. In addition, a tooth thickness of each of the plurality of projection portions is small, and hence a press-fitting load can be reduced. As a result, press-fitting properties (formability of the recess-projection fitting structure) can be enhanced. The same advantage can be obtained also by setting, at the intermediate portions of the respective plurality of projection portions in the height direction, a total sum of the circumferential thicknesses of the respective plurality of projection portions to be smaller than a total sum of the groove widths between adjacent ones of the plurality of projection portions.

The inner member can be formed of the hub wheel and an inner race press-fitted to an outer periphery of an inboard-side end portion of the hub wheel. In this case, the double row inner raceway surfaces can be provided respectively on an outer periphery of the hub wheel and an outer periphery of the inner race. With this, weight reduction and compactification of the bearing device for wheel can be achieved. Further, when a preload is applied to the bearing by crimping the end portion of the hub wheel, it is unnecessary to apply a preload to the bearing by using the outer joint member and the bolt member, and hence it is no longer necessary to strictly control tightening torque of the bolt member. Thus, the shaft portion of the outer joint member can be press-fitted without necessity of considering the preload on the bearing, and hence coupling properties (assembly properties) of the hub wheel and the outer joint member can be enhanced.

When an end surface of the hub wheel and an end surface of the outer joint member facing each other are brought into contact with each other, flexural rigidity in the axial direction is enhanced. As a result, a product having high quality and excellent in durability is produced. Further, at the time of press-fitting the plurality of projection portions, the hub wheel and the outer joint member can be positioned relative to each other in the axial direction. With this, it is possible to stabilize not only dimensional accuracy of the bearing device for wheel, but also a length of the recess-projection fitting structure in the axial direction. As a result, torque transmission performance can be enhanced. In addition, even without provision of a separate sealing structure, a foreign matter is prevented from intruding into the recess-projection fitting structure, and hence a stable fitting condition can be maintained at low cost over a long time period. Note that, when contact surface pressure of the end surface of the hub wheel and the end surface of the outer joint member is excessively high, torque may be transmitted also through this contact portion. In particular, when high torque is applied, an abrupt slip may occur at the contact portion so that abnormal noise is generated. Thus, in this case, it is desired that the end surface of the hub wheel and the end surface of the outer joint member be held in contact with each other at surface pressure of 100 MPa or less so that the contact portion constantly slides (so that torque is not transmitted at the contact portion). Note that, in order to reliably prevent generation of abnormal noise, it is effective to keep the end surface of the hub wheel and the end surface of the outer joint member facing each other out of contact with each other. In this case, it is desired that a sealing member be interposed in a gap formed between the end surface of the hub wheel and the end surface of the outer joint member so that a foreign matter is prevented from intruding into the recess-projection fitting structure.

A sealing material may be interposed between the seat surface of the bolt member and the receiving surface of the hub wheel (receiving portion). With this, rainwater and a foreign matter are prevented from intruding into the recess-projection fitting structure through the bolt tightening portion. Thus, the fitting condition is further stabilized, and quality is further enhanced.

In the above-mentioned structure, when the shaft portion is press-fitted into the hole portion of the hub wheel in order to form the recess-projection fitting structure, the hub wheel swells. As a result, on the raceway surfaces (in particular, double row inner raceway surfaces) of the bearing for wheel, what is called hoop stress is generated by radial expansion of the hub wheel into an outer diameter direction. When the hoop stress is generated, a rolling fatigue life may be shortened, and cracks may be generated. Thus, it is desired that the recess-projection fitting structure be arranged out of a position directly below the double row inner raceway surfaces. This is because, with this, generation of the hoop stress on the raceway surfaces is suppressed, and hence failures such as shortening of a rolling fatigue life, generation of cracks, and stress corrosion cracking are prevented from occurring.

Advantageous Effects of Invention

As described hereinabove, according to the first invention of the present application, even when, in particular, the recess-projection fitting structure is re-formed by re-coupling the hub wheel and the outer joint member to each other, accuracy of the re-formed recess-projection fitting structure can be easily and accurately confirmed. With this, it is possible to provide the highly reliable bearing device for wheel which maintains high coupling strength and excellent torque transmission performance even after repair.

Further, according to the second invention of the present application, the hub wheel and the outer joint member can be coupled and re-coupled to each other with high accuracy even after being separated from each other. Still further, the hub wheel and the outer joint member can be easily separated from and re-coupled to each other. Thus, a bearing part and a joint part can be separated and individually undergo inspection, maintenance, repair, and the like. As a result, high maintenance properties can be assured. In addition, also when the hub wheel and the outer joint member are re-coupled to each other, high coupling accuracy can be achieved. Thus, high assembly accuracy of the bearing device for wheel can be maintained even through repeated inspection, maintenance, repair, and the like.

DESCRIPTION OF EMBODIMENTS

In the following, description is made of embodiments of a first invention of the present application with reference to FIGS. 1 to 14.

Figure 1:
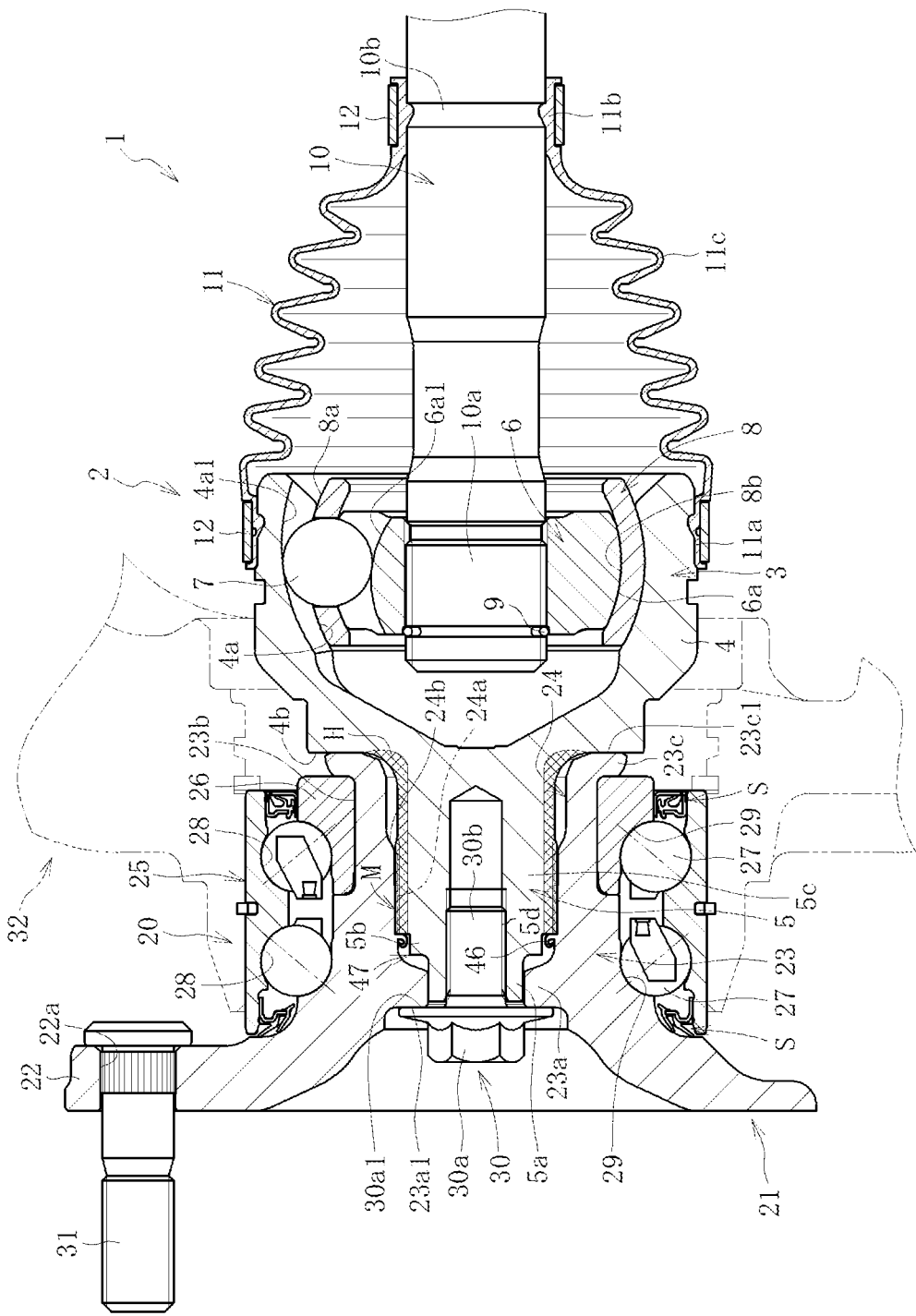
FIG. 1 A sectional view of a bearing device for wheel according to a first embodiment of a first invention of the present application.

FIG. 1 is a sectional view of a bearing device for wheel 1 according to a first embodiment of the first invention of the present application. A main part of the bearing device for wheel 1 illustrated in FIG. 1 is formed of an integral piece of a double row bearing for wheel 20, which comprises a hub wheel 21, and a constant velocity universal joint 2. Note that, in the following description, an inboard side and an outboard side respectively refer to sides on an inner side and an outer diameter side in a vehicle width direction of a vehicle under a state in which the bearing device for wheel 1 is mounted to the vehicle. In FIG. 1, the right side corresponds to the inboard side and the left side corresponds to the outboard side.

A main part of the constant velocity universal joint 2 is formed of an outer joint member 3, an inner joint member 6 arranged on an inner diameter side with respect to the outer joint member 3, a plurality of balls 7 interposed between the outer joint member 3 and the inner joint member 6, and a cage 8 interposed between the outer joint member 3 and the inner joint member 6 so that the balls 7 are retained. To an inner periphery of the inner joint member 6, an end portion 10a of a shaft 10 extending from a power transmission device (not shown) is coupled so that torque can be transmitted. To an outer periphery of the end portion 10a of the shaft 10, a stopper ring 9 for preventing the shaft 10 from dropping off the inner joint member 6 is fitted.

The outer joint member 3 comprises a mouth portion 4 and a shaft portion 5. The mouth portion 4 has a cup-like shape in which one end is opened, and has an inner spherical surface 4a in which a plurality of track grooves 4a1 extending in an axial direction are equiangularly formed. An opening of the mouth portion 4 is closed by a tubular boot 11 formed of an integral piece of a large diameter portion 11a, a small diameter portion 11b, and a bellows portion 11c. Specifically, by tightening the large diameter portion 11a externally fitted to the mouth portion 4 with a boot band 12, and by tightening the small diameter portion 11b externally fitted to a boot mount portion 10b of the shaft 10 with another boot band 12, the opening of the mouth portion 4 is closed with the boot 11. With this, a lubricant such as grease sealed in an inside of the joint is prevented from leaking to an outside, and a foreign matter is prevented from intruding into the inside of the joint.

The shaft portion 5 comprises a small diameter portion 5a as a fit-in portion, an intermediate diameter portion 5b, and a large diameter portion 5c in the stated order from a leading end side toward a proximal end side. At an axial center of the shaft portion 5, there is provided a bolt hole 5d opened in a leading end surface (end surface on the outboard side). Into the bolt hole 5d, a threaded shaft portion 30b, which forms a bolt member 30 together with a head portion 30a integrated with a flange (washer), is threadedly engaged through intermediation of the hub wheel 21. With this, the shaft portion 5 of the outer joint member 3 is bolt-fixed with respect to the hub wheel 21, and hence the shaft portion 5 of the outer joint member 3 is prevented from dropping off the hub wheel 21.

The inner joint member 6 has an outer spherical surface 6a in which a plurality of track grooves 6a1 extending in the axial direction are equiangularly formed.

The track grooves 4a1 of the outer joint member 3 and the track grooves 6a1 of the inner joint member 6 are provided in pairs, and a ball track formed of each of the pairs of the track grooves 4a1 and the track grooves 6a1 incorporates corresponding one of the balls 7 as torque transmitting elements so that the balls 7 can roll. The cage 8 is interposed so as to be slidable between the outer joint member 3 and the inner joint member 6, and has an outer spherical surface 8a to be fitted to the inner spherical surface 4a of the mouth portion 4, and an inner spherical surface 8b to be fitted to the outer spherical surface 6a of the inner joint member 6. Note that, the constant velocity universal joint 2 used in this embodiment is of what is called a Birfield type (BJ) in which the track grooves 4a1 and the track grooves 6a1 each have a curved-surface shape, but there may be employed a constant velocity universal joint of other types such as what is called an undercut free type (UJ) in which the track grooves 4a1 are each formed into a linear shape on the opening side of the mouth portion 4 and the track grooves 6a1 are each formed into a linear shape on a deep side of the mouth portion 4.

The hub wheel 21 is formed of an integral piece of a cylindrical portion 23 provided with a hole portion 24 extending in the axial direction, and a flange 22 extending from the outboard side of the cylindrical portion 23 to an outer diameter side. The flange 22 is provided to mount the hub wheel 21 to a wheel, and is provided with a bolt mounting hole 22a. A hub bolt 31 is mounted into the bolt mounting hole 22a so that a wheel and a brake rotor (not shown) are fixed to the flange 22 with the hub bolt 31.

The hole portion 24 comprises a shaft-portion fitting hole 24a positioned at a substantially intermediate portion of the hub wheel 21 in the axial direction and a tapered portion (tapered hole) 24b which has an outboard-side one end continuous to the shaft-portion fitting hole 24a and which is gradually reduced in diameter toward the outboard side. A taper angle of the tapered portion 24b is set to range, for example, from 15° to 75°. In the shaft-portion fitting hole 24a, through intermediation of a recess-projection fitting structure M described below, the shaft portion 5 of the outer joint member 3 and the hub wheel 21 are coupled to each other.

Figure 7A:
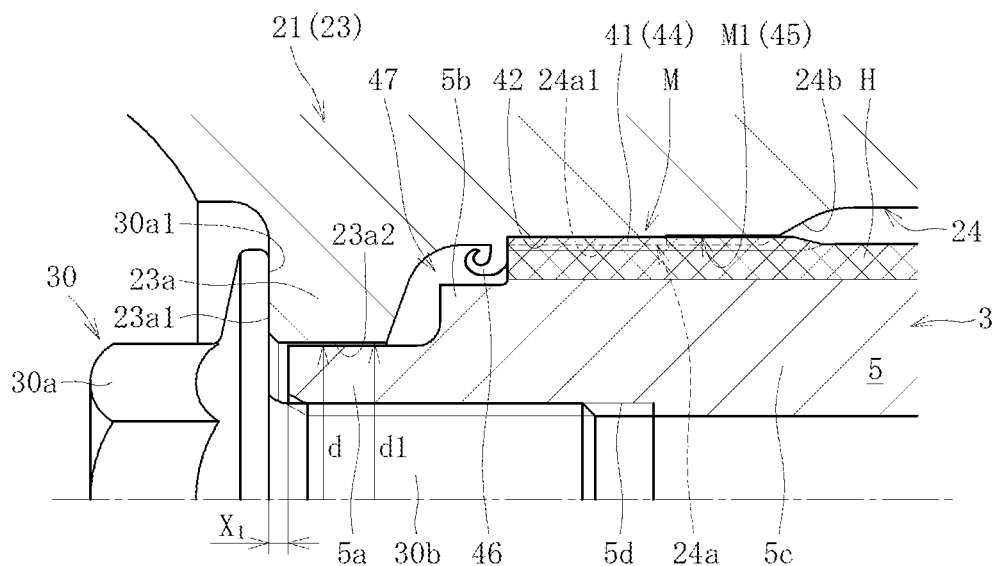
FIG. 7A A main-part enlarged sectional view of the bearing device for wheel illustrated in FIG. 1.
Figure 7B:
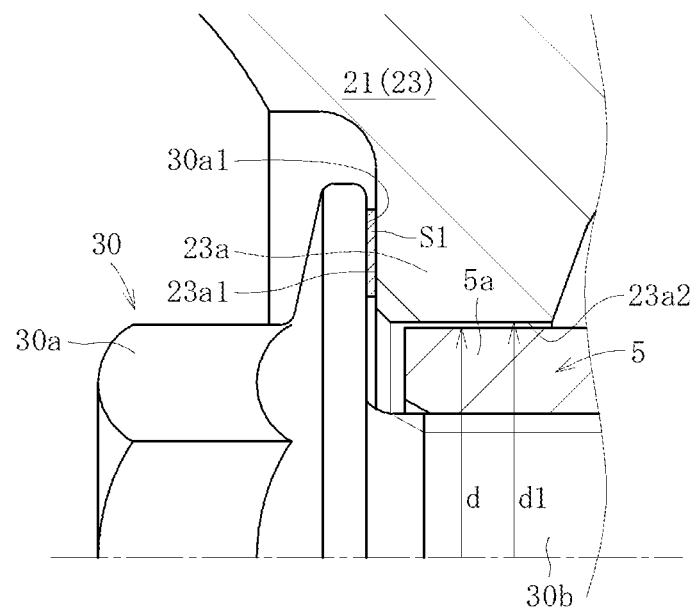
FIG. 7B A view illustrating a case where the structure illustrated in FIG. 7A is additionally provided with a sealing material.

In the cylindrical portion 23, on the outboard side with respect to the shaft-portion fitting hole 24a, a cylindrical receiving portion 23a projecting in an inner diameter direction is provided for receiving the head portion 30a of the bolt member 30. In a finished product state illustrated in FIG. 1, the small diameter portion 5a of the shaft portion 5 of the outer joint member 3, which serves as a fit-in portion, is fitted along an inner periphery of the receiving portion 23a. As illustrated in FIGS. 7A and 7B, an inner diameter dimension d1 of the receiving portion 23a is set to be slightly larger than an outer diameter dimension d of the small diameter portion 5a (d1>d), and hence an inner surface 23a2 of the receiving portion 23a and an outer surface of the small diameter portion 5a face each other across a minute radial clearance.

At a part on the inboard side of an outer peripheral surface of the cylindrical portion 23, there is formed a step portion 23b having a small diameter. Through press-fitting of an inner race 26 with respect to the step portion 23b, there is formed an inner member having double-row inner raceway surfaces 29 and 29. Of those double-row inner raceway surfaces, the inner raceway surface 29 on the outboard side is formed on an outer peripheral surface of the hub wheel 21, and the inner raceway surface 29 on the inboard side is formed on an outer peripheral surface of the inner race 26. A main part of the bearing for wheel 20 is formed of the inner member, a cylindrical outer member 25 arranged on an outer diameter side with respect to the inner member and having an inner periphery on which double-row outer raceway surfaces 28 and 28 are formed, and balls 27 as rolling elements arranged between the outer raceway surface 28 on the outboard side of the outer member 25 and the inner raceway surface 29 of the hub wheel 21 and between the outer raceway surface 28 on the inboard side of the outer member 25 and the inner raceway surface 29 of the inner race 26. The outer member 25 is mounted to a knuckle 32 (indicated by two-dot chain lines in FIG. 1) extending from a suspension of a vehicle body (not shown). To opening portions at both ends of the outer member 25, annular sealing member S and S are respectively mounted, for example, for preventing a lubricant such as grease sealed in an inside of the bearing for wheel 20 from leaking to the outside. As described above, the inner member having the inner raceway surfaces 29 and 29 is formed of the hub wheel 21 and the inner race 26 press-fitted to the step portion 23b of the hub wheel 21. Thus, weight reduction and compactification of the bearing device for wheel 1 are achieved.

In the bearing for wheel 20, the inner race 26 is pressed to the outboard side with a crimped portion 23c formed by crimping an inboard-side end portion of the cylindrical portion 23 of the hub wheel 21 so that the inner race 26 is fixed to the hub wheel 21 and a preload is applied to the inside of the bearing. In this way, when a preload is applied to the bearing for wheel 20 with the crimped portion 23c, it is unnecessary to apply a preload to the bearing for wheel 20 with the outer joint member 3 and the bolt member 30. In addition, it is unnecessary to strictly control tightening torque of the bolt member 30. Thus, the shaft portion 5 of the outer joint member 3 can be assembled to the hub wheel 21 without necessity of considering a preload amount, and hence assembly properties of the shaft portion 5 and the hub wheel 21 are enhanced.

An inboard-side end portion of the hub wheel 21 is held in abutment against an outboard-side end portion of the outer joint member 3. Specifically, an end surface 23c1 of the crimped portion 23c of the hub wheel 21 and a back surface 4b of the mouth portion 4 of the outer joint member 3 face and are held in contact with each other.

Figure 2A:
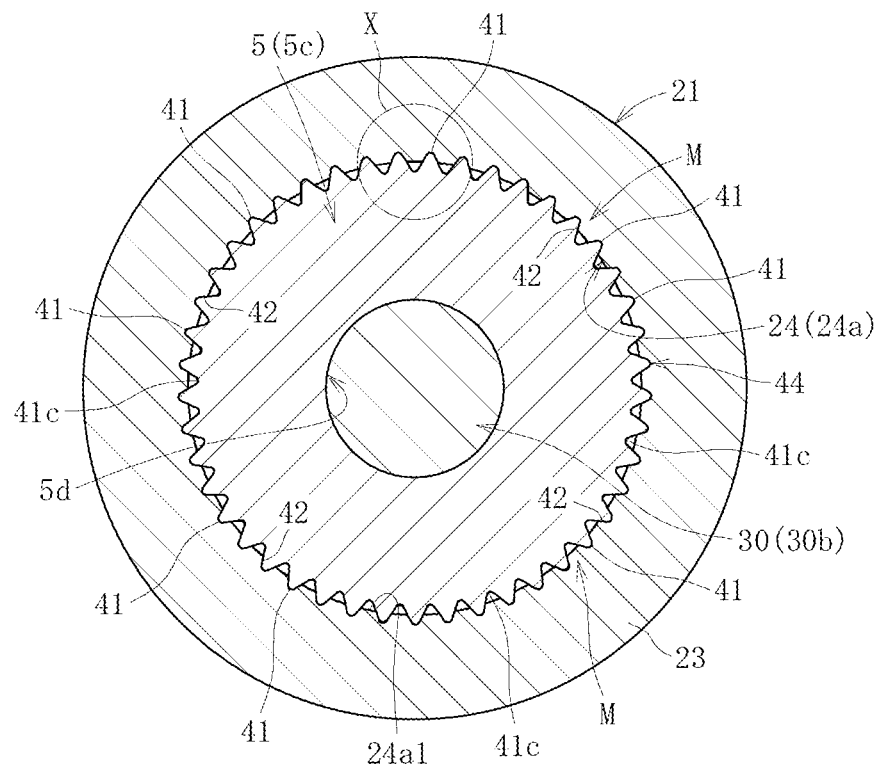
FIG. 2A An axially orthogonal sectional view of a recess-projection fitting structure illustrated in FIG. 1.
Figure 2B:
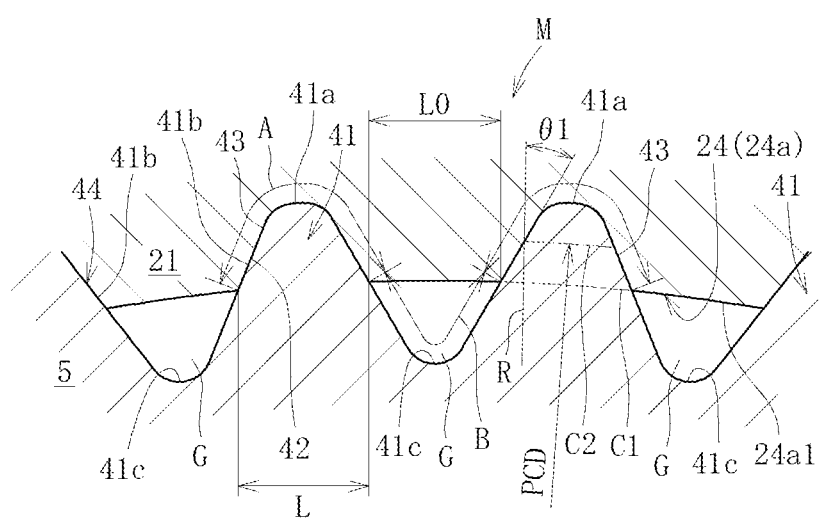
FIG. 2B An enlarged view of an X portion in FIG. 2A.

As illustrated in FIGS. 2A and 2B, the recess-projection fitting structure M is formed of projection portions 41 provided on an outer surface of the large diameter portion 5c of the shaft portion 5 and extending in the axial direction, and recessed portions 42 formed in an inner surface 24a1 of the shaft-portion fitting hole 24a of the hole portion 24 of the hub wheel 21. The projection portions 41 and the recessed portions 42 of the hub wheel 21, which fit to the projection portions 41, are kept in an intimate contact state at fitting parts 43. In this embodiment, a male spline 44 is formed on the outer surface of the large diameter portion 5c of the shaft portion 5. With this, the plurality of projection portions 41 extending in the axial direction are circumferentially arranged at a predetermined interval, and the plurality of axial recessed portions 42 to be fitted to the projection portions 41 are circumferentially formed in the inner surface 24a1 of the shaft-portion fitting hole 24a of the hub wheel 21.

In this embodiment, the projection portions 41 each have a triangular shape in cross-section in which an apex portion (tooth tip) 41a is formed into a convex round shape, and a fitting region with respect to corresponding one of the recessed portions 42 is a range A illustrated in FIG. 2B. Specifically, each of the projection portions 41 and corresponding one of the recessed portions 42 are fitted to each other over a range from halfway portions on both sides in the circumferential direction to the apex portion 41a of the projection portion 41 in cross-section. Between the projection portions 41 and 41 adjacent to each other in the circumferential direction, a gap G is formed on an inner diameter side with respect to the inner surface 24a1 of the hub wheel 21. Thus, the projection portions 41 each have a region B in which the projection portion 41 is not fitted to corresponding one of the recessed portions 42.

Figure 3A:
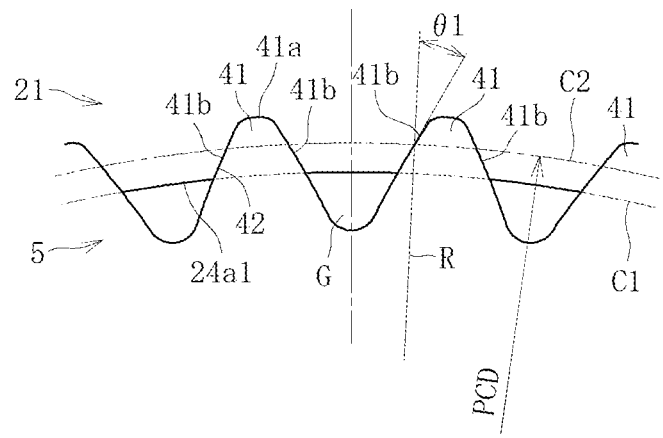
FIG. 3A A front view of projection portions provided to a shaft portion.

Also as illustrated in FIG. 3A, on a pitch circle of the projection portions 41, when an angle formed by a radial line R and a side surface 41b of each of the projection portions 41 is represented by $\theta 1$, the angle $\theta 1$ is set to fall within a range of $0° \leq \theta 1 \leq 45°$ (In FIG. 3A, $\theta 1$ is approximately 30°). Here, the pitch circle of the projection portions 41 refers to a circle C2 which passes, across the side surfaces 41b of each of the projection portions 41, halfway points of a distance from a circle C1 which passes boundary portions between a region in which the projection portion 41 is fitted to the recessed portion 42 and a region in which the projection portion 41 is not fitted to the recessed portion 42 to a circular orbit passing the apex portions 41a of the projection portions 41. When a diameter of the pitch circle C2 of the projection portions 41 is represented by PCD and the number of the projection portions 41 is represented by Z, a ratio P of Z to PCD (P=PCD/Z) is set to fall within a range of $0.3 \leq P \leq 1.0$.

Figure 3B:
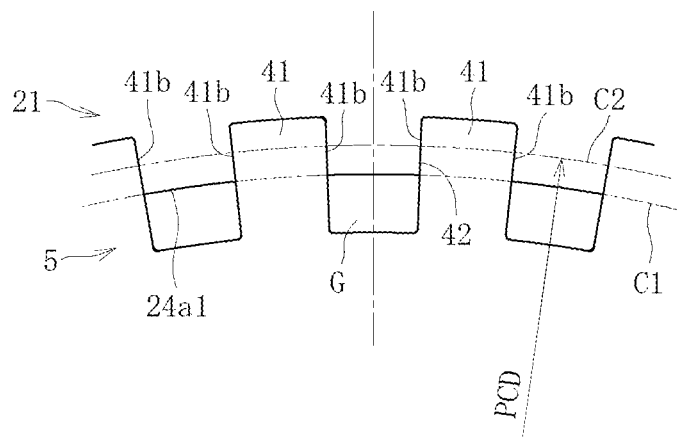
FIG. 3B A front view illustrating another example of the projection portions.
Figure 3C:
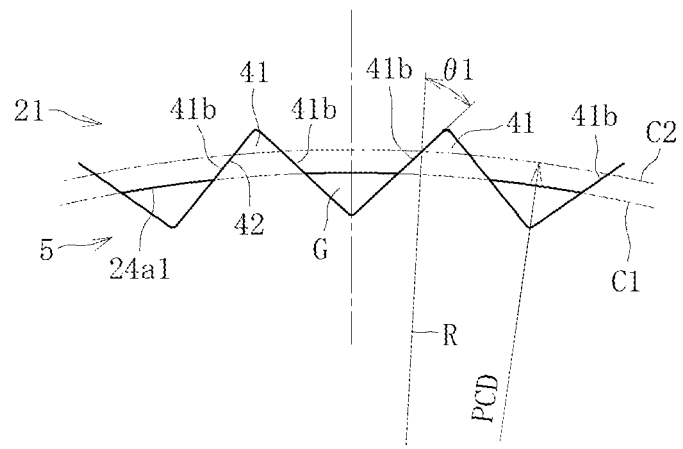
FIG. 3C A front view illustrating still another example of the projection portions.

The projection portions 41 illustrated in FIGS. 2A, 2B, and 3A each have a triangular shape in cross-section in which the apex portion 41a is formed into a convex round shape. Alternatively, there may be employed projection portions 41 each having other sectional shapes as illustrated in FIGS. 3B and 3C. The projection portions 41 illustrated in FIG. 3B each have a rectangular shape in cross-section in which the angle $\theta 1$ is set to substantially 0°, and the projection portions 41 illustrated in FIG. 3C each have a triangular shape in cross-section in which the angle $\theta 1$ is set to approximately 45°.

The hub wheel 21 and the outer joint member 3 are coupled to each other with the above-mentioned recess-projection fitting structure M formed between the hole portion 24 of the hub wheel 21 and the shaft portion 5 of the outer joint member 3 so that torque can be transmitted. The recess-projection fitting structure M can be obtained, for example, by the following procedure.

First, as illustrated in FIGS. 1 and 2, the male spline 44 comprising the large number of projection portions 41 extending in the axial direction is formed on the outer surface of the large diameter portion 5c of the shaft portion 5 of the outer joint member 3 by well-known processing methods such as a rolling process, a trimming process, a pressing process, and a drawing process. When the projection portions 41 of the shaft portion 5 are formed of the male spline 44, processing equipment for forming a spline for other shafts of this type can be utilized, and hence the projection portions 41 can be formed at low cost. Then, at the axial center of the shaft portion 5, the bolt hole 5d opened in the leading end surface of the shaft portion 5 is formed.

Figure 4:
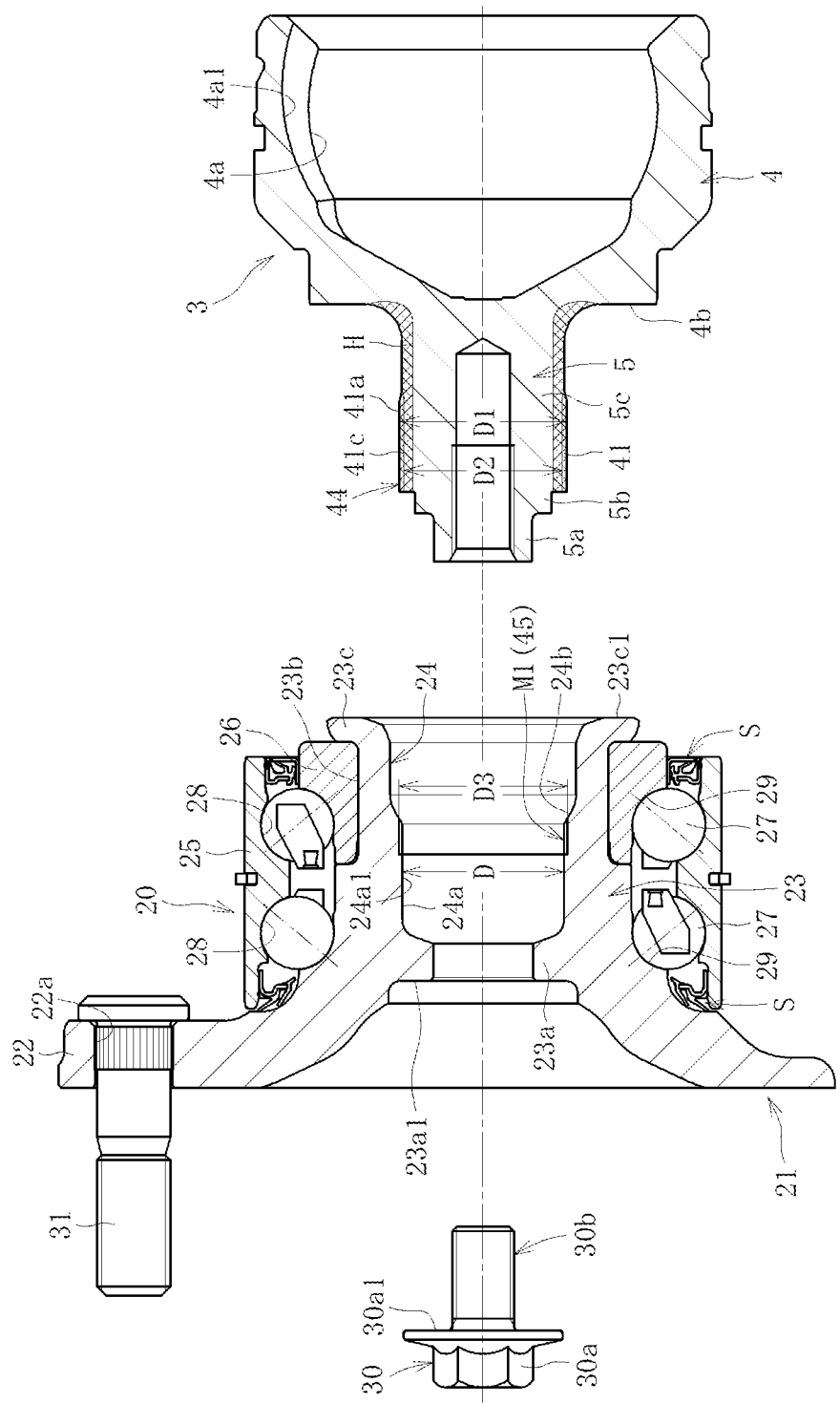
FIG. 4 A sectional view illustrating an assembly step for the bearing device for wheel illustrated in FIG. 1.

Next, on the shaft portion 5, regions indicated by cross-hatching in FIGS. 1 and 4 are subjected to thermosetting treatment so as to form a cured layer H. The cured layer H is continuously formed in the circumferential direction over the entirety of each of the projection portions 41 and the entirety of each bottom portion 41c. Note that, an axial range in which the cured layer H is formed is defined as a range comprising at least a continuous region from an edge on the outboard side of the male spline 44 to the proximal end portion of the shaft portion 5. Methods of the thermosetting treatment are not particularly limited, and, for example, induction hardening and carburizing-and-quenching can be employed.

Meanwhile, an inner diameter side of the hub wheel 21 is left unheated. In other words, the inner surface of the hole portion 24 of the hub wheel 21 is an uncured portion which is not subjected to thermosetting treatment (unheated state). A difference in hardness between the cured layer H of the shaft portion 5 of the outer joint member 3 and the uncured portion of the hub wheel 21 is set to 20 points or more in HRC. For example, a hardness of the cured layer H is set to range approximately from 50 HRC to 65 HRC, and a hardness of the uncured portion is set to range approximately from 10 HRC to 30 HRC. Note that, it suffices that, on the inner surface of the hole portion 24 of the hub wheel 21, only the inner surface 24a1 of the shaft-portion fitting hole 24a is left uncured, and other regions may be subjected to thermosetting treatment. Further, a predetermined region of the hub wheel 21, which is to be left uncured, may be subjected to thermosetting treatment as long as the above-mentioned difference in hardness is secured between the cured layer H of the shaft portion 5 and the uncured portion of the hub wheel 21.

Figure 6:
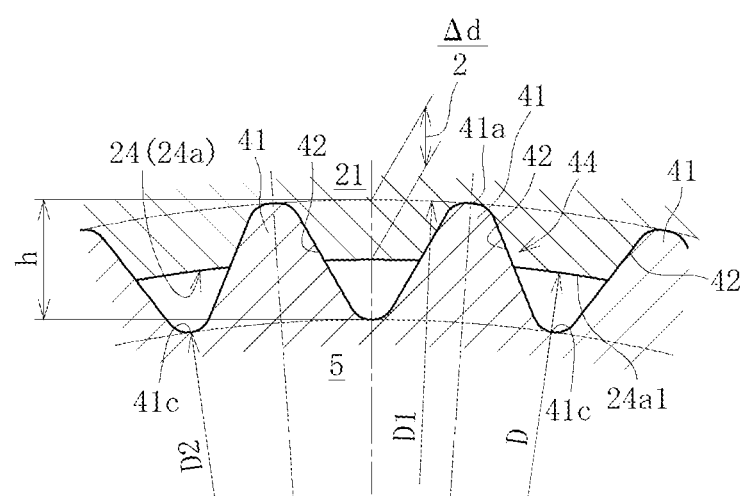
FIG. 6 A main-part enlarged view of FIG. 2A.

An intermediate portion of each of the projection portions 41 in a height direction corresponds to a position of the inner surface 24a1 of the shaft-portion fitting hole 24a prior to formation of the recessed portions 42. Specifically, as illustrated in FIGS. 4 and 6, an inner diameter dimension D of the shaft-portion fitting hole 24a is set to be smaller than a maximum outer diameter dimension (diameter dimension of a circular orbit passing the apex portions 41a of the projection portions 41) D1 of the male spline 44, and to be larger than a minimum outer diameter dimension (diameter dimension of a circular orbit passing the bottom portions 41c between the projection portions 41 and 41 adjacent to each other in the circumferential direction) D2 of the male spline 44 (D2<D<D1).

Figure 5A:
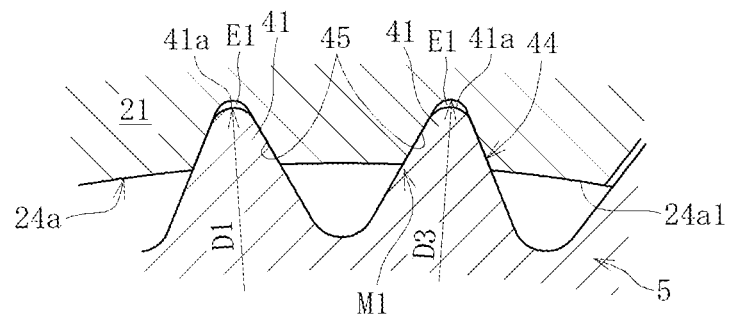
FIG. 5A A conceptual view illustrating a guide portion provided along an inner diameter of a hole portion of a hub wheel.

As illustrated in FIG. 4, in the hole portion 24 of the hub wheel 21, at an inboard-side end portion of the shaft-portion fitting hole 24a, there is provided a guide portion M1 for guiding the projection portions 41 at the start of press-fitting. As illustrated in FIG. 5A, the guide portion M1 is formed of a plurality of guide grooves 45 formed at a predetermined pitch in the circumferential direction (in this case, at the same pitch as those of the projection portions 41) at the inboard-side end portion of the shaft-portion fitting hole 24a. A diameter dimension D3 of a circular orbit connecting groove bottoms of the guide grooves 45 is set to be somewhat larger than the maximum outer diameter dimension D1 of the male spline 44 (D3>D1). With this, under a state in which leading end portions of the projection portions 41 of the shaft portion 5 are arranged at the inboard-side end portion of the shaft-portion fitting hole 24a of the hub wheel 21, a radial gap E1 is formed between each of the apex portions 41a of the projection portions 41 and corresponding one of the groove bottoms of the guide grooves 45.

Then, as illustrated in FIG. 4, a leading end of the shaft portion 5 of the outer joint member 3 is arranged at the inboard-side end portion of the hole portion 24 of the hub wheel 21, and then the shaft portion 5 is press-fitted into the shaft-portion fitting hole 24a of the hub wheel 21. At the time of press-fitting the shaft portion 5, the leading end portions of the projection portions 41 provided to the shaft portion 5 are fitted to the guide grooves 45 formed at the inboard-side end portion of the shaft-portion fitting hole 24a. At this time, as described above, the radial gap E1 is formed between each of the projection portions 41 and corresponding one of the guide grooves 45, and hence the projection portions 41 can be easily fitted to the guide grooves 45. In addition, the guide grooves 45 do not hinder press-fitting of the projection portions 41. Note that, prior to press-fitting of the shaft portion 5, a sealing material is applied in advance to the outer surface on the leading end side comprising the male spline 44 of the shaft portion 5. A type of a usable sealing material is not particularly limited, and, for example, sealing materials made of various resins can be selected and used.

The tapered portion 24b gradually reduced in diameter along a direction in which the shaft portion 5 is press-fitted is provided in the hole portion 24 of the hub wheel 21. Thus, at the time of formation of the guide grooves 45, when a jig for forming the guide grooves 45 is press-fitted, the jig is centered with respect to the shaft-portion fitting hole 24a of the hole portion 24, and hence the guide grooves 45 having high accuracy are formed. Thus, when press-fitting of the shaft portion 5 (projection portions 41) is started under a state in which the projection portions 41 provided to the shaft portion 5 and the guide grooves 45 are phased with respect to each other, the shaft portion 5 is centered along the guide grooves 45 at the inboard-side end portion of the shaft-portion fitting hole 24a. As described above, the inner diameter dimension D of the shaft-portion fitting hole 24a, the maximum outer diameter dimension D1 of the male spline 44, and the minimum outer diameter dimension D2 of the male spline 44 are set to satisfy the dimensional relationship of D2<D<D1. Thus, when the shaft portion 5 is press-fitted into the shaft-portion fitting hole 24a, the projection portions 41 bite into an inner diameter portion of the inboard-side end surface of the hub wheel 21 and cut into a body of the hub wheel 21. Then, when the shaft portion 5 is further press-fitted, the projection portions 41 cut out or push out the inner surface 24a1 of the shaft-portion fitting hole 24a. In this way, the recessed portions 42 conforming to the projection portions 41 of the shaft portion 5 are formed in the inner surface 24a1 of the shaft-portion fitting hole 24a. At this time, the projection portions 41 of the shaft portion 5 are formed to be harder by 20 points or more in HRC than the inner surface 24a1 of the shaft-portion fitting hole 24a of the hub wheel 21, and hence the recessed portions 42 are easily formed in the inner surface 24a1 of the shaft-portion fitting hole 24a of the hub wheel 21. Further, when the hardness on the shaft portion 5 side is set to be high as described above, torsional strength of the shaft portion 5 can also be enhanced.

Through such a press-fitting step, as illustrated in FIGS. 2A and 2B, the recessed portions 42 to be fitted to the projection portions 41 of the shaft portion 5 are formed in the inner surface 24a1 of the shaft-portion fitting hole 24a of the hub wheel 21. As the projection portions 41 gradually bite into the inner surface 24a1 of the shaft-portion fitting hole 24a of the hub wheel 21, the hole portion 24 is slightly increased in diameter, and in this state, the shaft portion 5 provided with the projection portions 41 is allowed to move in the axial direction. Meanwhile, when the axial movement of the shaft portion 5 is stopped, the inner surface 24a1 radially shrinks to return to an original diameter. In other words, at the time of press-fitting the projection portions 41, the hub wheel 21 is elastically deformed in an outer diameter direction, and a preload generated by the elastic deformation is applied to a surface of a part of the projection portions 41, which is to be fitted to the recessed portions 42. Thus, the recessed portions 42 are held in intimate contact with surfaces of the projection portions 41 entirely over the axial direction thereof. In this way, the recess-projection fitting structure M is formed. As described above, the sealing material is applied in advance to the outer surface on the leading end side of the shaft portion 5, and hence the sealing material is spread over fitting portions 43 of the projection portions 41 and the recessed portions 42 along with press-fitting of the shaft portion 5. Thus, a foreign matter can be effectively prevented from intruding into the fitting portions 43. Further, along with press-fitting of the shaft portion 5, the inner surface 24a1 of the hub wheel 21 undergoes work hardening caused by plastic deformation. Thus, rotational torque is transmitted with higher efficiency.

In order to form the recess-projection fitting structure M, the shaft portion 5 may be moved relative to the fixed hub wheel 21, or reversely, the hub wheel 21 may be moved relative to the fixed shaft portion 5. Alternatively, both the hub wheel 21 and the shaft portion 5 may be moved relative to each other.

As described above, the tapered portion 24b is capable of functioning as the jig for forming the guide grooves or a guide at the time of starting press-fitting of the shaft portion 5, and hence the shaft portion 5 can be press-fitted with high accuracy. The guide grooves 45 (guide portion M1) are provided at the inboard-side end portion of the shaft-portion fitting hole 24*a* on the outboard side with respect to the tapered portion 24*b*, and hence the shaft portion 5 can be press-fitted under a state in which the projection portions 41 are fitting along the guide grooves 45. Thus, a situation in which the projection portions 41 are further press-fitted under a state in which the shaft portion 5 is decentered or inclined with respect to the hole portion 24 (axial line) of the hub wheel 21 can be effectively prevented. As a result, the recess-projection fitting structure M having high accuracy can be obtained. Further, at the time of press-fitting the shaft portion 5, the sealing material applied to the outer surface of the shaft portion 5 functions as a lubricant, and hence the shaft portion 5 can be smoothly press-fitted.

Figure 5B:
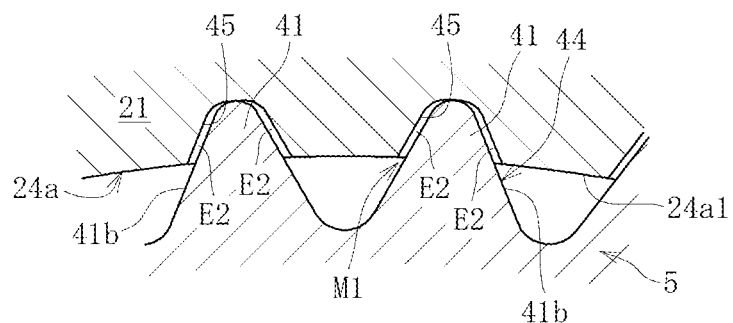
FIG. 5B A view illustrating another example of the guide portion.
Figure 5C:
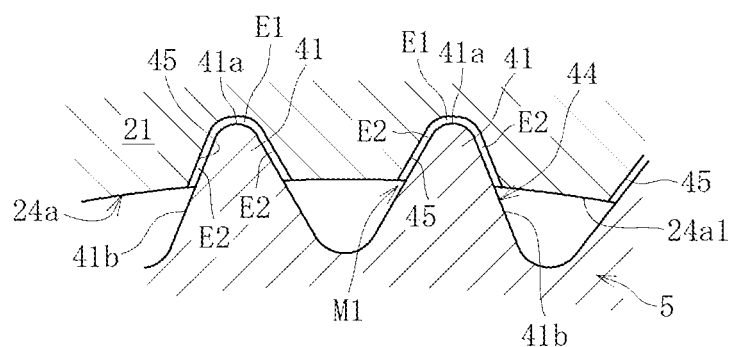
FIG. 5C A view illustrating still another example of the guide portion.

The form of the guide grooves 45 is not limited to that illustrated in FIG. 5A. For example, as illustrated in FIG. 5B, the guide grooves 45 may be formed so that circumferential gaps E2 are formed between each of the guide grooves 45 and the side surfaces 41*b* of corresponding one of the projection portions 41. Alternatively, as illustrated in FIG. 5C, the guide grooves 45 may be formed so that the radial gap E1 is formed between each of the guide grooves 45 and the apex portion 41*a* of corresponding one of the projection portions 41 and that the circumferential gaps E2 are formed between each of the guide grooves 45 and the side surfaces 41*b* of corresponding one of the projection portions 41.

The shaft portion 5 continues to be press-fitted until the back surface 4*b* of the mouth portion 4 of the outer joint member 3 abuts against the end surface 23*c*1 of the crimped portion 23*c* of the hub wheel 21 as illustrated in FIG. 1. When the hub wheel 21 and the mouth portion 4 of the outer joint member 3 are brought into abutment against each other in this way, flexural rigidity in the axial direction of the bearing device for wheel 1 is enhanced. As a result, a product having high quality and excellent in durability is produced. Further, the shaft portion 5 of the outer joint member 3 can be positioned relative to the hub wheel 21 in the axial direction. Thus, dimensional accuracy of the bearing device for wheel 1 is stabilized, and an axial length of the recess-projection fitting structure M is also stabilized. As a result, torque transmission performance is increased. Further, with this contact, a sealing structure is formed between the hub wheel 21 and the mouth portion 4, and hence a foreign matter can be prevented from intruding into the recess-projection fitting structure M. With this, a fitting condition of the recess-projection fitting structure M can be stably maintained over a long time period.

Note that, when the end surface 23*c*1 of the hub wheel 21 and the back surface 4*b* of the mouth portion 4 are held in contact with each other, it is desired that contact surface pressure of the end surface 23*c*1 and the back surface 4*b* be set to 100 MPa or less for the following reasons. When the contact surface pressure exceeds 100 MPa, torque may be transmitted also through a contact portion (between the end surface 23*c*1 and the back surface 4*b*). In particular, when torque exceeds a frictional force of the contact portion as a result of application of excessively high torque, an abrupt slip may occur at the contact portion so that abnormal noise is generated. In contrast, when the contact surface pressure of the end surface 23*c*1 and the back surface 4*b* is set to 100 MPa or less as described above, the contact portion slides even with low torque, and hence generation of abnormal noise can be suppressed.

At a time point when press-fitting of the shaft portion 5 is completed and the back surface 4*b* of the mouth portion 4 and the end surface 23*c*1 of the crimped portion 23*c* of the hub wheel 21 come into contact with each other, the intermediate diameter portion 5*b* of the shaft portion 5 is not held in contact with the inner surface 24*a*1 of the hole portion 24 (shaft-portion fitting hole 24*a*) of the hub wheel 21 or the inboard-side end surface of the receiving portion 23*a*. With this, on an outer diameter side with respect to the intermediate diameter portion 5*b* of the shaft portion 5, there is formed a pocket portion 47 for accommodating extruded portions 46 formed along with formation of the recessed portions 42.

When the shaft portion 5 of the outer joint member 3 is press-fitted into the hole portion 24 of the hub wheel 21, also as illustrated in FIG. 7A, a material (body of the hub wheel 21) is extruded from the recessed portions 42 by a cut-out action or a push-out action caused by the projection portions 41. As a result, the extruded portions 46 are formed. When the extruded portions 46 are left as they are, the extruded portions 46 may drop into the inside of the vehicle. In contrast, when the pocket portion 47 as described above is formed, the extruded portions 46 are accommodated and retained in the pocket portion 47 while being curled, and hence the above-mentioned failure can be overcome. Further, in this case, the extruded portions 46 can be left accommodated within the pocket portion 47, and hence it is no longer necessary to separately perform removal treatment for the extruded portions 46. Thus, assembly man-hours can be reduced, which leads to enhancement of assembly operability and cost reduction. Note that, a shape of the pocket portion 47 is not limited as long as the extruded portions 46 can be accommodated as a whole. Further, a capacity of the pocket portion 47 is set to be at least larger than an expected formation amount of the extruded portions 46.

It is desired that the recess-projection fitting structure M formed as described above be arranged out of inner diameter sides with respect to (position directly below) the raceway surfaces 28 and 29 of the bearing for wheel 20. In particular, it is more desired that the recess-projection fitting structure M be formed out of an inner diameter side of intersections of the lines forming contact angles on the inner raceway surfaces 29 and 29, and be formed in a part of an axial region between those intersections. This is because, with this, an increase in hoop stress on bearing raceway surfaces can be effectively suppressed or prevented. When the increase in hoop stress can be suppressed or prevented, failures such as shortening of a rolling fatigue life, generation of cracks, and stress corrosion cracking can be prevented from occurring. As a result, the bearing for wheel 20 having higher quality can be provided.

Further, as illustrated in FIG. 6, at the time of forming the recess-projection fitting structure M, when a press-fitting margin of each of the projection portions 41 with respect to the hub wheel 21 is represented by Δd (=D1−D) and a height of each of the projection portions 41 is represented by "h", it is desired that Δd/2h be set to fall within a range of 0.3<Δd/2h<0.86. With this, a part of each of the projection portions 41 near the intermediate portion in the height direction bites into the inner surface of the hub wheel 21, and hence the press-fitting margin of each of the projection portions 41 can be sufficiently secured. As a result, the recessed portions 42 can be reliably formed.

When Δd/2h is 0.3 or less, torsional strength decreases. Meanwhile, when Δd/2h is 0.86 or more, minute decentering or inclination at the time of press-fitting may cause the entirety of each of the projection portions 41 to bite into a counterpart side. As a result, a press-fitting load may sharply increase, and formability of the recess-projection fitting structure M may be deteriorated. When the formability of the recess-projection fitting structure M is deteriorated, the torsional strength decreases. In addition, an expansion amount of an outer diameter of the hub wheel 21 increases. Thus, a function of the bearing for wheel 20 is adversely affected, which may cause a problem of shortening of a rotational life. In contrast, when Δd/2h is set to fall within the above-mentioned range, the formability of the recess-projection fitting structure M is stabilized, and a variation in press-fitting load is eliminated. As a result, stable torsional strength can be obtained.

In the recess-projection fitting structure M described above, the projection portions 41 and the recessed portions 42 are held in intimate contact with each other at the fitting parts 43 without gaps, and hence backlash can be suppressed in the radial direction and the circumferential direction. Thus, a high torque load capacity can be secured even when a coupling portion of the hub wheel 21 and the outer joint member 3 is compactified. As a result, the bearing device for wheel 1 can be downsized and reduced in weight. Further, backlash in the coupling portion is suppressed, and hence generation of abnormal noise at the time of torque transmission can also be effectively prevented.

Further, it is unnecessary to form a female spline or the like in advance in the hole portion 24 of the hub wheel 21, and hence processing cost of the hub wheel 21 can be saved, and productivity can be enhanced. Still further, at the time of assembly of the hub wheel 21 and the shaft portion 5 of the outer joint member 3, phasing of the splines with respect to each other can be omitted, and hence assembly properties can be enhanced. Yet further, it is possible to avoid damage to tooth surfaces at the time of press-fitting, and hence a stable fitting condition can be maintained. Yet further, as described above, the hardness on the inner diameter side of the hub wheel 21 is set to be low, and hence the recessed portions 42 provided to the hub wheel 21 are fitted to the projection portions 41 of the shaft portion 5 with high fitting properties. Thus, backlash is more effectively prevented in the radial direction and the circumferential direction.

Further, as illustrated in FIG. 3, the on pitch circle C2 of the projection portions 41, the angle θ1 formed by the radial line R and the side surface 41b of the projection portion 41 is set to fall within the range of $0° \leq θ1 \leq 45°$. This is because of the following reasons. That is, regarding an increase in diameter of the hole portion 24 of the hub wheel 21 along with press-fitting of the shaft portion 5, a radial expansion force at the time of press-fitting is liable to act when θ1 is excessively large, and hence a radial expansion amount of the hub wheel 21 increases at the completion of press-fitting, which leads to an increase in tensile stress (hoop stress) on an outer diameter portion of the hub wheel 21 and an outer diameter portion of the inner race 26 of the bearing for wheel 20. In addition, a radial component force becomes larger at the time of torque transmission, and hence the hub wheel 21 increases in diameter, which also leads to an increase in the hoop stress on the outer diameter portion of the hub wheel 21 and the outer diameter portion of the inner race 26. The hoop stress thus increased shortens a life of the bearing. In this regard, with the above-mentioned setting, the radial expansion amount of the hub wheel 21 after press-fitting is reduced, with the result that press-fitting properties can be enhanced.

Further, when the pitch circle diameter of the projection portions 41 is represented by PCD and the number of the projection portions 41 is represented by Z, PCD/Z is set to fall within the range of $0.30 \leq PCD/Z \leq 1.0$. This is because, when PCD/Z is excessively small (when PCD/Z is less than 0.30), an applicable range of the press-fitting margin of each of the projection portions 41 with respect to the hub wheel 21 is markedly small, and a dimensional tolerance is reduced. As a result, it is difficult to perform press-fitting.

In particular, when θ1 is set to fall within a range of $20° \leq θ1 \leq 35°$ and PCD/Z is set to fall within a range of $0.33 \leq PCD/Z \leq 0.7$, even without taking measures such as use of special steel as a formation material for the shaft portion 5 (outer joint member 3), surface treatment on the projection portions 41, and sharpening of the shapes of the projection portions 41, the recessed portions 42 can be formed by using the shaft portion 5 made of a general machine-structural steel material. In addition, the radial expansion amount of the hub wheel 21 after the shaft portion 5 is press-fitted can be suppressed. Further, when θ1 is set to $θ1 \geq 20°$, in a case where the projection portions 41 are provided on the shaft portion 5 side, the projection portions 41 can be formed by a rolling process in which cost and processing accuracy are best balanced.

When press-fitting of the shaft portion 5 is completed, the leading end surface of the shaft portion 5 (small diameter portion 5a) is positioned on the inboard side with respect to a receiving surface 23a1 of the receiving portion 23a provided to the hub wheel 21. Then, through intermediation of the receiving portion 23a, the threaded shaft portion 30b of the bolt member 30 is threadedly engaged into the bolt hole 5d of the shaft portion 5. In this way, the shaft portion 5 of the outer joint member 3 is bolt-fixed to the hub wheel 21, and hence separation of the hub wheel 21 and the outer joint member 3 is restricted. The bolt member 30 is tightened in such a manner that a seat surface 30a1 of the bolt member 30 is brought into abutment against the receiving surface 23a1 of the receiving portion 23a. When tightening of the bolt member 30 is completed, the hub wheel 21 is sandwiched in the axial direction between the head portion 30a of the bolt member 30 and the mouth portion 4 of the outer joint member 3. In this way, when the hub wheel 21 is sandwiched in the axial direction between the bolt member 30 and the mouth portion 4, flexural rigidity in the axial direction of the bearing device for wheel 1 is further enhanced. As a result, reliability and durability can be enhanced.

As illustrated in FIG. 7B, a sealing material S1 may be interposed between the seat surface 30a1 of the bolt member 30 and the receiving surface 23a1 of the receiving portion 23a of the hub wheel 21. With this, sealability between the seat surface 30a1 and the receiving surface 23a1 can be secured, and hence rainwater and a foreign matter can be prevented from intruding from the outboard side into the recess-projection fitting structure M. A type of the usable sealing material S1 is not particularly limited as long as sealability can be secured. For example, a sealing material of the same type as that of the sealing material applied to the outer surface of the shaft portion 5 can be used. As a matter of course, a type of a sealing material different from that applied to the shaft portion 5 may be used. The sealing material may be applied to any one of or both the seat surface 30a1 and the receiving surface 23a1.

Note that, when the seat surface 30a1 of the bolt member 30 and the receiving surface 23a1 of the hub wheel 21 are held in intimate contact with each other without gaps, it is not necessary to interpose the sealing material S1 between the seat surface 30a1 and the receiving surface 23a1. For example, when the receiving surface 23a1 is grinded, the receiving surface 23a1 is fitted to the seat surface 30a1 of the bolt member 30 with higher fitting properties. Thus, as illustrated in FIG. 7A, the sealing material S1 can be omitted. As a matter of course, the grinding process on the receiving surface 23a1 can be omitted as long as sealability is secured.

In the bearing device for wheel 1 described above, the outer joint member 3 is allowed to be separated from the hub wheel 21 so that a bearing part (bearing for wheel 20) and a joint part (constant velocity universal joint 2) can be individually repaired when it is necessary, for example, to repair the bearing device for wheel 1. In order to separate the outer joint member 3 from the hub wheel 21, in the finished product state illustrated in FIG. 1, the bolt member 30 is removed. After that, a pulling-out force equal to or larger than a coupling force of the recess-projection fitting structure M is applied to between the hub wheel 21 and the shaft portion 5 of the outer joint member 3, to thereby pull out the shaft portion 5 of the outer joint member 3 from the hub wheel 21. With this, the hub wheel 21 and the outer joint member 3 are separated from each other. Here, a case is exemplified where, after the hub wheel 21 and the outer joint member 3 are separated from each other, the hub wheel 21 and the outer joint member 3 thus separated are re-coupled to each other as they are. In the following, description is made of such a separation step and a re-coupling step in detail.

Figure 8:
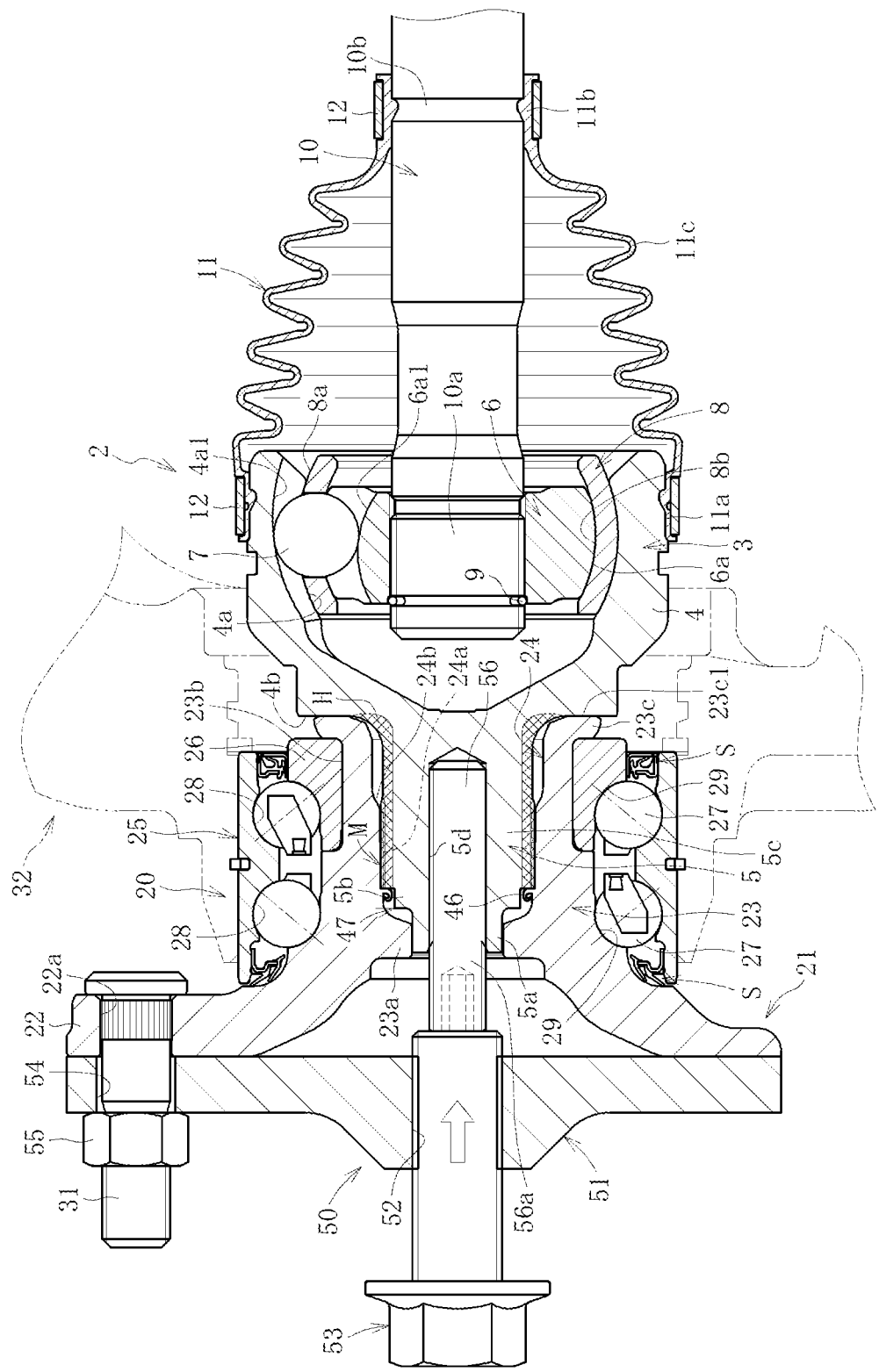
FIG. 8 A sectional view illustrating a separation step for the bearing device for wheel illustrated in FIG. 1.

The separation step, that is, pulling-out of the shaft portion 5 of the outer joint member 3 from the hub wheel 21 can be performed by using, for example, a jig 50 as illustrated in FIG. 8. The jig 50 comprises a platform 51, a pressing bolt member 53 to be threadedly engaged into a threaded hole 52 of the platform 51, and a threaded shaft 56 to be threadedly engaged into the bolt hole 5d of the shaft portion 5. The platform 51 is provided with a through-hole 54. In order to mount the platform 51 to the hub wheel 21, a nut member 55 is threadedly engaged with a bolt 31 of the hub wheel 21, which is inserted through the through-hole 54. After the platform 51 is mounted to the hub wheel 21, the threaded shaft 56 is threadedly engaged into the bolt hole 5d of the shaft portion 5 in such a manner that a proximal portion 56a is projected to the outboard side with respect to the receiving portion 23a. A projecting amount of the proximal portion 56a is set to be larger than the axial length of the recess-projection fitting structure M.

The pressing bolt member 53 is arranged coaxially with the threaded shaft 56, and the pressing bolt member 53 is threadedly mounted from the outboard side into the threaded hole 52 of the platform 51. In this state, the pressing bolt member 53 is threadedly advanced in a direction indicated by a hollow arrow in FIG. 8. Because the pressing bolt member 53 is arranged coaxially with the threaded shaft 56, the threaded shaft 56 is pressed to the inboard side when pressing bolt member 53 is threadedly advanced. In accordance therewith, when the outer joint member 3 is moved to the inboard side with respect to the hub wheel 21 and the pressing bolt member 53 is threadedly advanced somewhat further, the recess-projection fitting structure M is disengaged. As a result, the outer joint member 3 is separated from the hub wheel 21.

Figure 9:
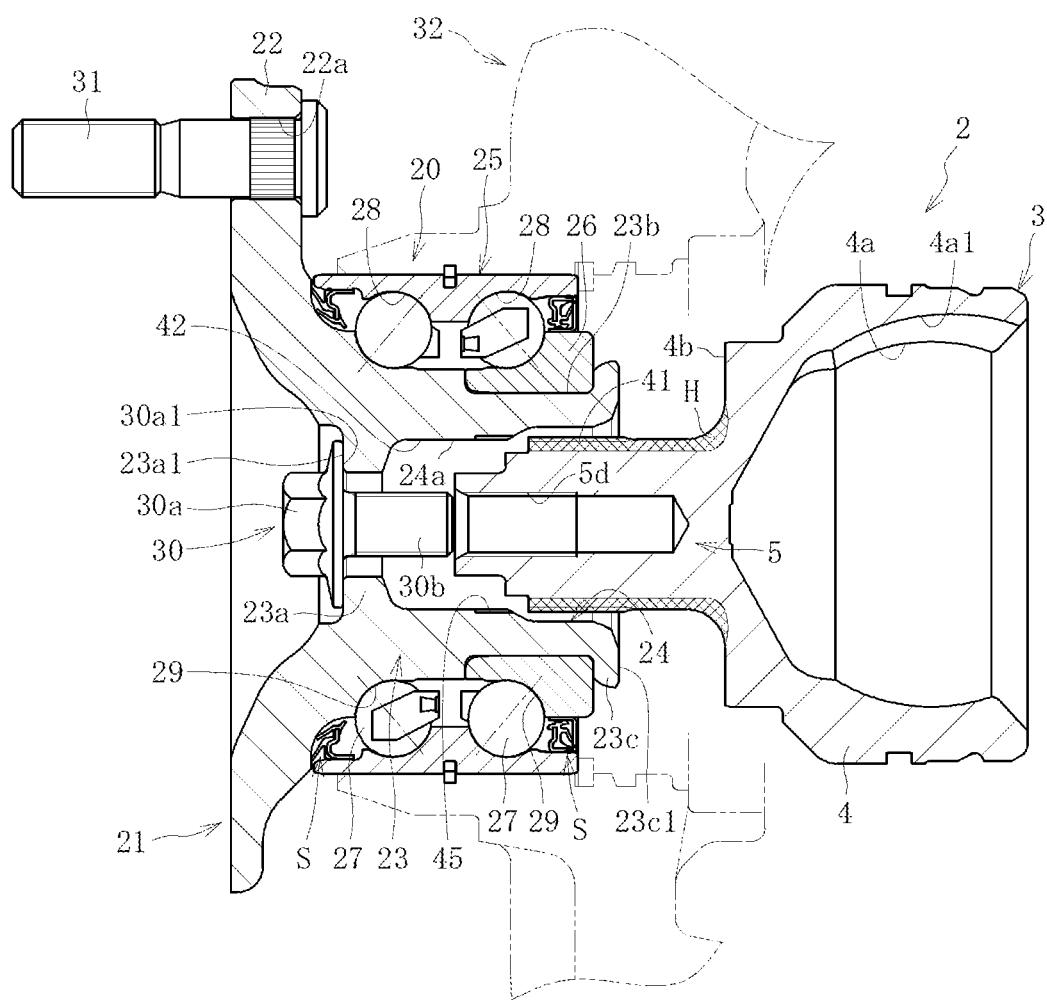
FIG. 9 A sectional view illustrating a re-coupling step after the separation step illustrated in FIG. 8.

Under a state in which the hub wheel 21 and the outer joint member 3 are separated from each other, when the recess-projection fitting structure M is re-formed by using the bolt member 30 illustrated in FIG. 1, the hub wheel 21 and the outer joint member 3 can be re-coupled to each other. In the re-coupling step, as illustrated in FIG. 9, after the platform 51 is removed from the hub wheel 21 and the threaded shaft 56 is removed from the shaft portion 5, the bolt member 30 is inserted along the inner periphery of the receiving portion 23a of the hub wheel 21 so that the seat surface 30a1 of the bolt member 30 is brought into abutment against the receiving surface 23a1 of the hub wheel 21. Simultaneously, in such a manner that the projection portions 41 on the shaft portion 5 side and the recessed portions 42 of the hub wheel 21, which are formed by previous press-fitting of the shaft portion 5, are phased with respect to each other in the circumferential direction, the shaft portion 5 of the outer joint member 3 is arranged along an inner diameter of the hole portion 24 of the hub wheel 21. The guide grooves 45 are provided on the inboard side of the recessed portions 42 formed along the hole portion 24 (shaft-portion fitting hole 24a) of the hub wheel 21. Thus, it suffices that the projection portions 41 and the guide grooves 45 are phased with respect to each other in the circumferential direction. Note that, in FIG. 9, of the components of the constant velocity universal joint 2, only the outer joint member 3 is illustrated.

Then, when the outer joint member 3 and the hub wheel 21 are moved closer relative to each other under the state in which the projection portions 41 on the shaft portion 5 side and the recessed portions 42 (guide grooves 45) on the hub wheel 21 side are phased with respect to each other in the circumferential direction, the shaft portion 5 of the outer joint member 3 is fitted into the hole portion 24 of the hub wheel 21, with the result that the projection portions 41 and the guide grooves 45 are fitted to each other. In this way, when the projection portions 41 and the guide grooves 45 are fitted to each other, the threaded shaft portion 30b of the bolt member 30 is threadedly engaged into the bolt hole 5d. In this state, when the bolt member 30 is turned so that the bolt member 30 is screwed into the bolt hole 5d, thrust is generated. The thrust generated by this screwing-in causes the shaft portion 5 of the outer joint member 3 to be press-fitted into the shaft-portion fitting hole 24a of the hub wheel 21. In this way, as in the previous press-fitting, the recess-projection fitting structure M in which all the fitting parts 43 of the projection portions 41 with respect to the recessed portions 42 come into intimate contact with the corresponding recessed portions 42 is re-formed. As a result, the outer joint member 3 and the hub wheel 21 are re-coupled to each other.

In this way, when the recess-projection fitting structure M can be re-formed by screwing the bolt member 30 into the bolt hole 5d again, the recess-projection fitting structure M can be re-formed without using large-scale equipment such as a press machine for press-fitting. In the second press-fitting, the shaft portion 5 is press-fitted into the shaft-portion fitting hole 24a provided with the recessed portions 42, and hence press-fitting can be performed with a load lower than that in the first press-fitting. Because of this, the recess-projection fitting structure M can be re-formed by utilizing the thrust generated by screwing-in of the bolt member 30. Therefore, on site such as an automobile maintenance factory, the hub wheel 21 and the outer joint member 3 can be separated from and re-coupled to each other, that is, inspection, maintenance, repair, and the like of a bearing device for wheel can be easily performed. As a result, high maintenance properties can be achieved.

Note that, as illustrated in FIGS. 8 and 9, the hub wheel 21 and the outer joint member 3 can be separated from and re-coupled to each other under a state in which the outer member 25 of the wheel bearing 20 is mounted to the knuckle 32 of a vehicle. Thus, maintenance properties on site are especially satisfactory.

By the way, various performances (coupling strength, torque transmission performance, and the like of the hub wheel 21 and the outer joint member 3) of the bearing device for wheel 1 significantly depend on the way of forming the recess-projection fitting structure M. Thus, after the recess-projection fitting structure M is formed, in particular, after the recess-projection fitting structure M is re-formed, it is necessary to confirm whether or not the recess-projection fitting structure M is formed with desired accuracy and in a desired way. As a method for confirming the accuracy of the recess-projection fitting structure M, confirmation of a relative position in the axial direction of the hub wheel 21 and the outer joint member 3 can be conceived. However, the hub wheel 21 and the outer joint member 3 are separated from and re-coupled to each other (undergo a repair operation) under the state in which the outer member 25 of the bearing for wheel 20 is mounted to the knuckle 32 as described above. Thus, it is necessary to elaborate how to confirm the relative position in the axial direction of the hub wheel 21 and the outer joint member 3.

Specifically, the relative position in the axial direction of the hub wheel 21 and the outer joint member 3 can be confirmed, for example, through measurement of an axial clearance between the end surface 23c1 of the crimped portion 23c of the hub wheel 21 and the back surface 4b of the mouth portion 4 of the outer joint member 3 facing each other (in this embodiment in which the end surface 23c1 of the crimped portion 23c and the back surface 4b of the mouth portion 4 are held in abutment against each other, through checking of how the end surface 23c1 and the back surface 4b are held in contact with each other). However, this part is covered with the knuckle 32, and hence cannot be viewed by an operator. Thus, such a confirming operation is markedly difficult. When the recess-projection fitting structure M is re-formed, the tightening torque of the bolt member 30 is controlled, and hence the accuracy of the recess-projection fitting structure M after re-formation can be assured by this controlled torque. However, the shaft portion 5 of the outer joint member 3 may be press-fitted in an inclined state, and hence it is risky to assure the accuracy of the recess-projection fitting structure M only with the controlled torque.

In terms of this, in the first invention of the present application, the shaft portion 5 of the outer joint member 3 is provided with the small diameter portion 5a as a fit-in portion to be fitted along the inner periphery of the receiving portion 23a provided to the hub wheel 21 under the state in which the recess-projection fitting structure is formed. The small diameter portion 5a is used as a part for confirming a fitting condition of the recess-projection fitting structure M (whether or not the recess-projection fitting structure M is formed with desired accuracy and in a desired way). In other words, when the bolt member 30 is removed after re-formation of the recess-projection fitting structure M, (the leading end surface of) the small diameter portion 5a provided to the shaft portion 5 is exposed to the outside so that the small diameter portion 5a is viewable by the operator from the outboard side. In this way, when the small diameter portion 5a of the shaft portion 5 is exposed to the outside, even under the state in which the bearing for wheel 20 is mounted to the knuckle 32, as illustrated in FIG. 7A, through measurement of an axial clearance x1 between the receiving surface 23a1 of the receiving portion 23a of the hub wheel 21 and the leading end surface of the shaft portion 5, it is possible to confirm the relative position in the axial direction of the outer joint member 3 with respect to the hub wheel 21, more specifically, confirm whether or not the recess-projection fitting structure M is formed with desired accuracy and in a desired way. Thus, even when the hub wheel 21 and the outer joint member 3 are re-coupled to each other under the state in which the bearing for wheel 20 is mounted to the knuckle 32, an operation of confirming the accuracy and the way of forming the recess-projection fitting structure M can be easily and accurately performed. With this, it is possible to provide the highly reliable bearing device for wheel 1 which maintains excellent characteristics such as high coupling strength and excellent torque transmission performance even after the hub wheel 21 and the outer joint member 3 are re-coupled to each other.

Hereinabove, description is made of the case where the hub wheel 21 and the outer joint member 3 separated from each other are re-coupled to each other as they are. In addition, for example, even when the hub wheel 21 is damaged and needs to be replaced, the hub wheel 21 and the outer joint member 3 can be coupled to each other by the same procedure. In this case, it is desired that the inner surface 24a1 of the hole portion 24 (shaft-portion fitting hole 24a) of the hub wheel 21 to be newly used be provided with small recessed portions formed at a predetermined interval along the circumferential direction. This is because, by using the hub wheel 21 thus formed, press-fitting resistance at the time of press-fitting of the shaft portion 5 can be reduced, and the hub wheel 21 and the outer joint member 3 can be coupled to each other by the thrust generated by screwing-in of the bolt member 30.

Figure 10:
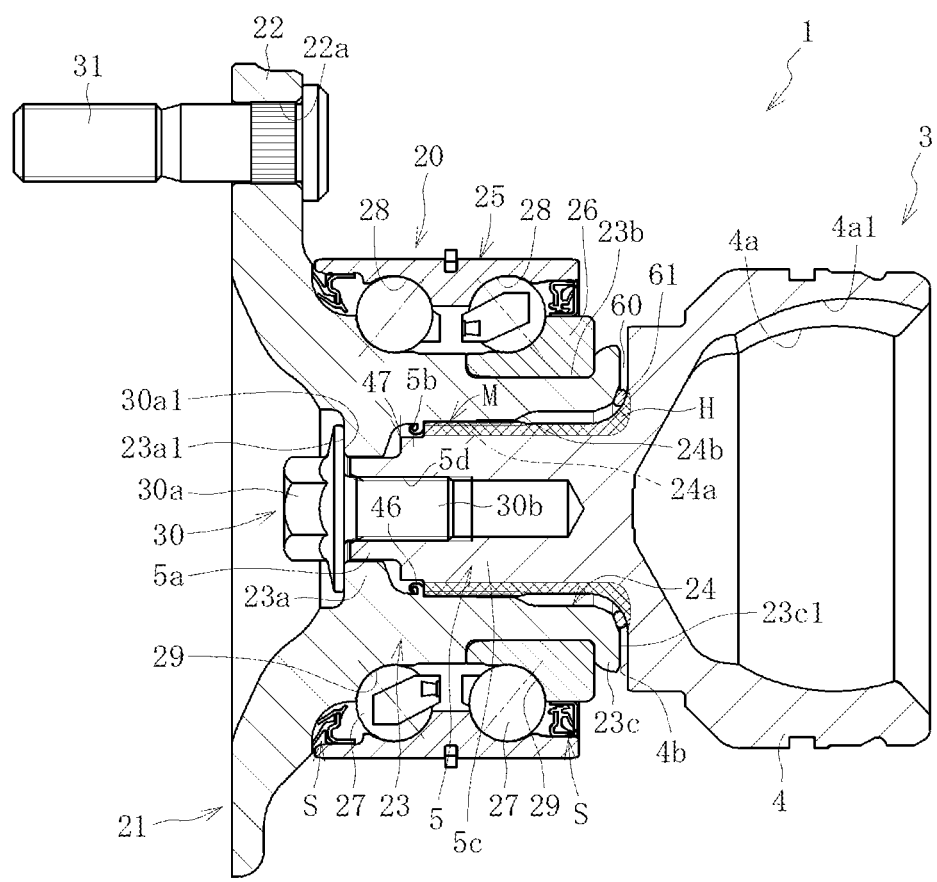
FIG. 10 A sectional view of a bearing device for wheel according to a second embodiment of the first invention of the present application.

FIG. 10 is a sectional view of a bearing device for wheel 1 according to a second embodiment of the first invention of the present application. The bearing device for wheel 1 illustrated in FIG. 10 is different from the bearing device for wheel 1 illustrated in FIG. 1 mainly in that the end surface 23c1 of the crimped portion 23c of the hub wheel 21 and the back surface 4b of the mouth portion 4 are kept out of contact with each other. In this case, as illustrated also in FIG. 11A on an enlarged scale, a gap 60 is provided between the end surface 23c1 of the crimped portion 23c and the back surface 4b of the mouth portion 4. The gap 60 thus formed more effectively prevents generation of abnormal noise which may be caused by contact of the mouth portion 4 of the outer joint member 3 and the hub wheel 21.

Figure 11A:
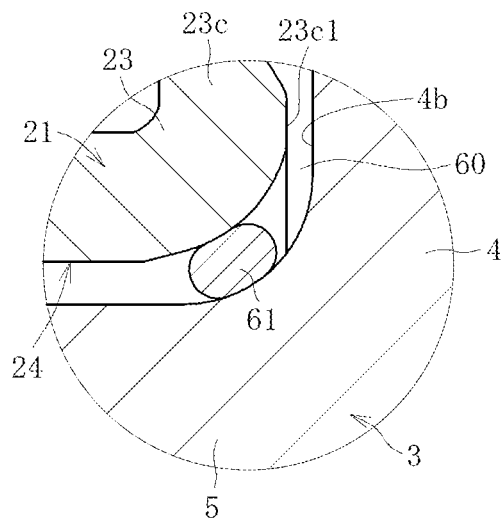
FIG. 11A A partially enlarged sectional view of FIG. 10.
Figure 11B:
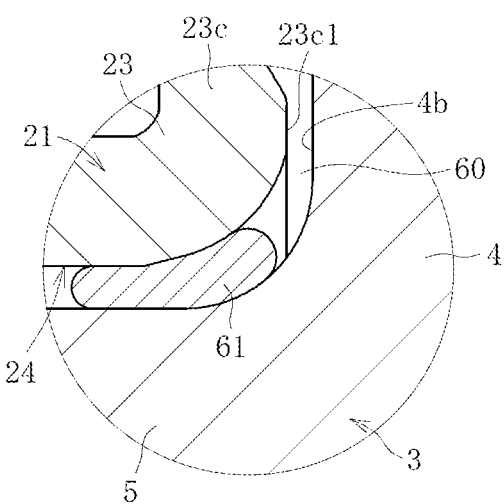
FIG. 11B A sectional view illustrating a modification of FIG. 11A.

In this way, when the end surface 23c1 of the hub wheel 21 and the back surface 4b of the mouth portion 4 are kept out of contact with each other, foreign matter intrusion prevention means for the recess-projection fitting structure M is provided on the inboard side with respect to the recess-projection fitting structure M. Specifically, as illustrated in FIG. 11A, the foreign matter intrusion prevention means is formed of a sealing member 61 fitted in the gap 60 between the crimped portion 23c of the hub wheel 21 and the back surface 4b of the mouth portion 4. In this way, by closing the gap 60 to be formed between the crimped portion 23c of the hub wheel 21 and the mouth portion 4 with the sealing member 61, rainwater and a foreign matter are prevented from intruding into the recess-projection fitting structure M through the gap 60. As the sealing member 61, a commercially available O-ring and the like as illustrated in FIG. 11A can be used. Alternatively, a gasket or the like as illustrated in FIG. 11B can be used as well.

Note that, components other than those described above are substantially the same as those of the bearing device for wheel 1 illustrated in FIG. 1. Thus, the same reference symbols are used to omit redundant description.

The head portion 30a of the bolt member 30 used in the embodiments described hereinabove is integrated with a flange (washer). The washer may be interposed as a separated member between the head portion 30a of the bolt member 30 and the hub wheel 21.

Figure 12A:
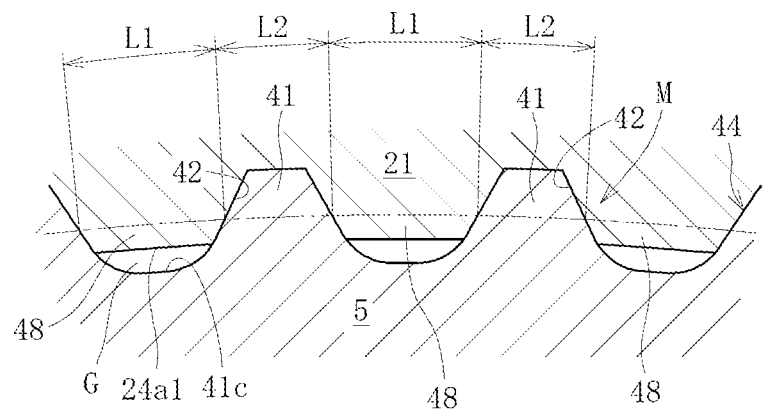
FIG. 12A A sectional view illustrating another embodiment of the recess-projection fitting structure.

Further, in the embodiments described hereinabove, the pitch of the projection portions 41 and the pitch of the recessed portions 42 are set to the same value. Thus, as illustrated in FIG. 2B, at the intermediate portion of each of the projection portions 41 in the height direction, a circumferential thickness L of each of the projection portions 41 and a groove width L0 between the projection portions 41 and 41 adjacent to each other are substantially equal to each other. Meanwhile, as illustrated in FIG. 12A, at the intermediate portion of each of the projection portions 41 in the height direction, a circumferential thickness L2 of each of the projection portions 41 may be set to be smaller than a groove width L1 between the projection portions 41 and 41 adjacent to each other. In other words, at the intermediate portion of each of the projection portions 41 in the height direction, the circumferential thickness L2 of each of the projection portions 41 of the shaft portion 5 is set to be smaller than a circumferential thickness L1 of a projecting portion 48 formed between the recessed portions 42 and 42 adjacent to each other of the hub wheel 21 (L2<L1).

When the above-mentioned relationship is satisfied at each of the projection portions 41, a total sum Σ of the circumferential thicknesses L2 of the projection portions 41 can be set to be smaller than a total sum Σ1 of the circumferential thicknesses L1 of the projecting portions 48. With this, a shear surface area of each of the projecting portions 48 of the hub wheel 21 can be increased, and hence torsional strength can be secured. In addition, a tooth thickness of each of the projection portions 41 is small, and hence a press-fitting load can be reduced. As a result, press-fitting properties can be enhanced.

In this case, it is not necessary for all the projection portions 41 and the projecting portions 48 to satisfy the relationship of L2<L1. As long as the total sum Σ of the circumferential thicknesses of the projection portions 41 of the shaft portion 5 is smaller than the total sum Σ1 of the circumferential thicknesses of the projecting portions 48 of the hub wheel 21, some of the projection portions 41 and the projecting portions 48 may satisfy a relationship of L2=L1 or L2>L1.

Figure 12B:
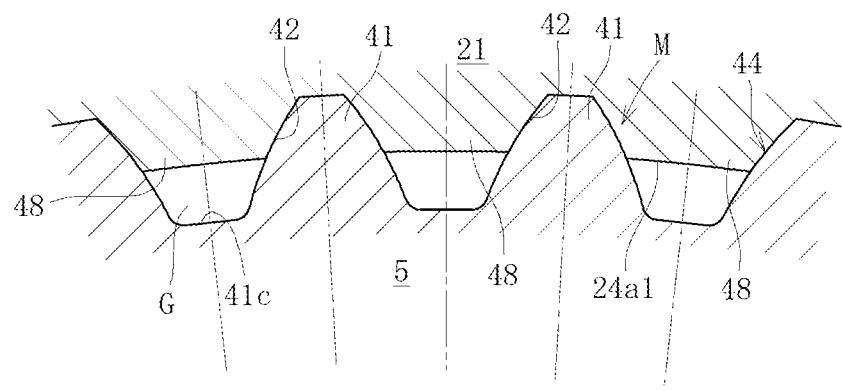
FIG. 12B A sectional view illustrating still another embodiment of the recess-projection fitting structure.

Note that, in FIG. 12A, each of the projection portions 41 is formed into a trapezoidal shape in cross-section. However, the sectional shape of each of the projection portions 41 is not limited thereto. For example, as illustrated in FIG. 12B, each of the projection portions 41 may be formed into an involute shape in cross-section.

Figure 13A:
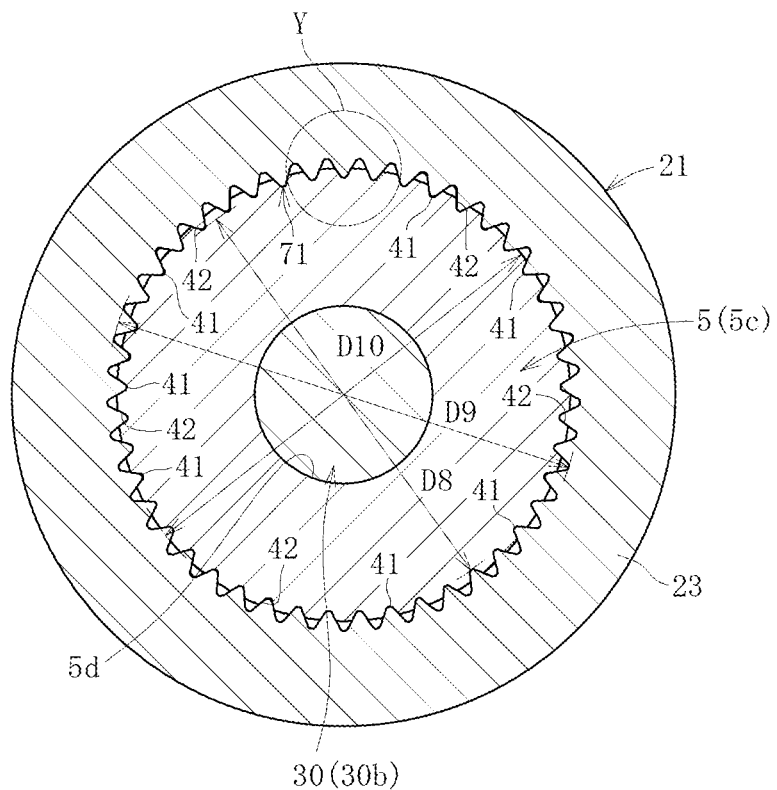
FIG. 13A A sectional view illustrating yet another embodiment of the recess-projection fitting structure.

In the embodiment described hereinabove, the male spline 44 (projection portions 41) is formed on the shaft portion 5 side. Reversely, as illustrated in FIG. 13A, the projection portions 41 may be formed on the hub wheel 21 side through formation of a female spline 71 on the inner surface of the hole portion 24 of the hub wheel 21. In this case, as in the case where the shaft portion 5 is provided with the male spline 44, the hardness of the projection portions 41 of the hub wheel 21 is set to be higher than the outer surface of the shaft portion 5 by 20 points or more in HRC, for example, by means in which the female spline 71 of the hub wheel 21 is subjected to thermosetting treatment while the outer surface of the shaft portion 5 is left unheated. The female spline 71 can be formed by various well-known processing methods such as a broaching process, a trimming process, a pressing process, and a drawing process. Similarly, as for the thermosetting treatment, various types of heat treatment such as induction hardening and carburizing-and-quenching can be employed.

After that, when the shaft portion 5 is press-fitted into the hole portion 24 of the hub wheel 21, with the projection portions 41 on the hub wheel 21 side, the recessed portions 42 to be fitted to the projection portions 41 are formed in the outer surface of the shaft portion 5. In this way, the recess-projection fitting structure M in which the projection portions 41 and the recessed portions 42 are held in intimate contact with each other at the fitting parts 43 is formed. The fitting parts 43 of the projection portions 41 and the recessed portions 42 correspond to regions A illustrated in FIG. 13B. The other region of each of the projection portions 41 corresponds to the region B in which the projection portion 41 is not fitted to corresponding one of the recessed portions 42. The gap G is formed on the outer diameter side with respect to the outer surface of the shaft portion 5 and between the projection portions 41 and 41 adjacent to each other in the circumferential direction.

Figure 14:
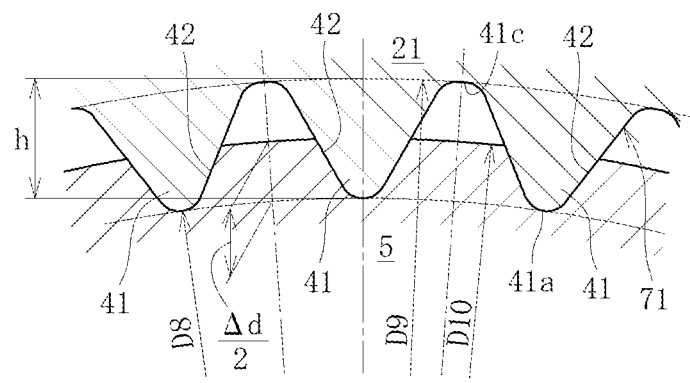
FIG. 14 A main-part enlarged view of FIG. 13A.
Figure 15:
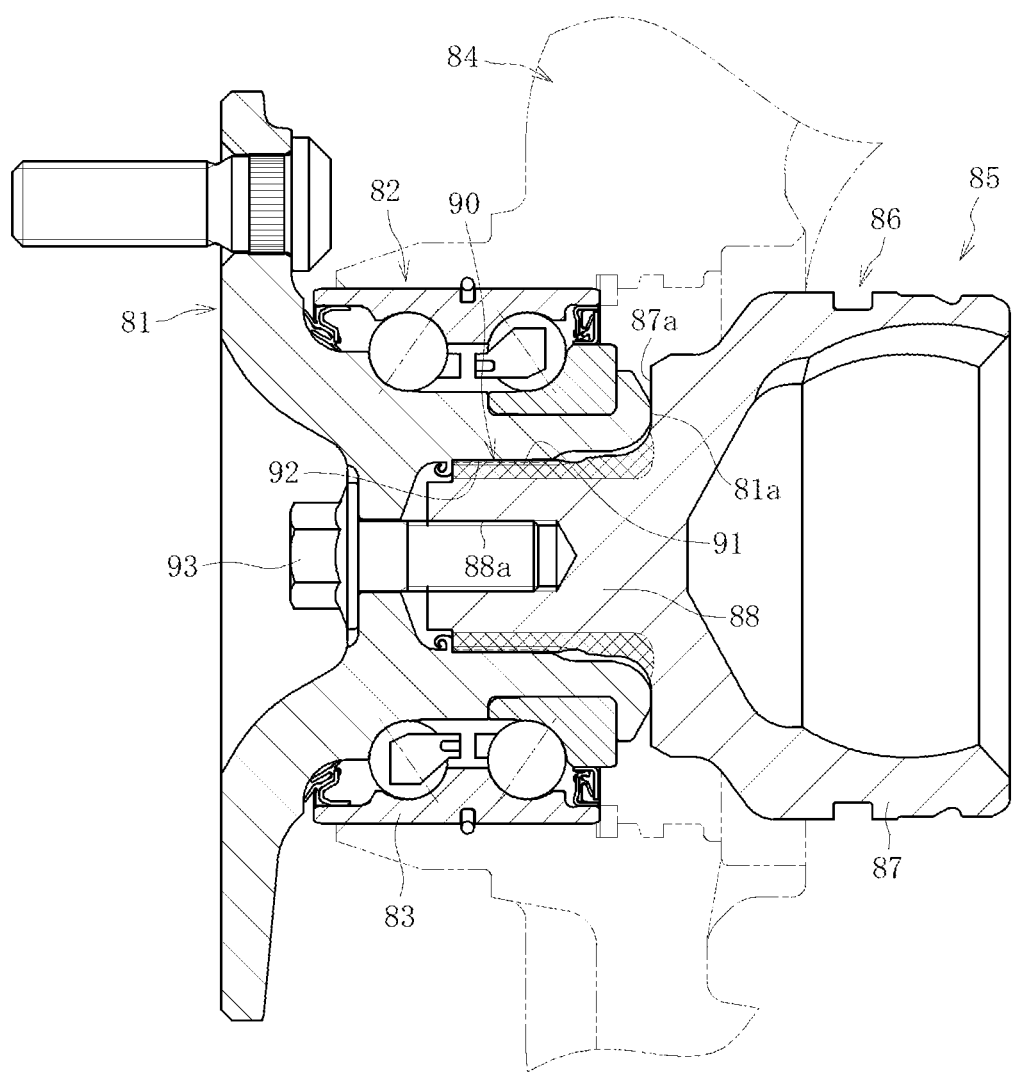
FIG. 15 A sectional view of a conventional bearing device for wheel.

As illustrated in FIG. 14, the intermediate portion of each of the projection portions 41 in the height direction corresponds to a position of the outer surface of the shaft portion 5 prior to formation of the recessed portions. In other words, an outer diameter dimension D10 of the shaft portion 5 is set to be larger than a minimum inner diameter D8 of each of the projection portions 41 of the female spline 71 (diameter dimension of a circular orbit passing the apex portions 41a of the projection portions 41) and to be smaller than a maximum inner diameter dimension D9 of the female spline 71 (diameter dimension of a circular orbit passing the bottom portions 41c between the projection portions 41 and 41 adjacent to each other) (D8<D10<D9). Further, when a press-fitting margin of each of the projection portions 41 with respect to the shaft portion 5 is represented by Δd and the height of each of the projection portions 41 is represented by "h", Δd/2h is set to fall within a range of 0.3<Δd/2h<0.86. The press-fitting margin Δd at this time is represented by a difference in diameter between the outer diameter dimension D10 of the shaft portion 5 and the minimum inner diameter D8 of each of the projection portions 41 (D10-D8). With this, the part of each of the projection portions 41 near the intermediate portion in the height direction bites into the outer surface of the shaft portion 5, and hence the press-fitting margin of each of the projection portions 41 can be sufficiently secured. As a result, the recessed portions 42 can be reliably formed.

Figure 13B:
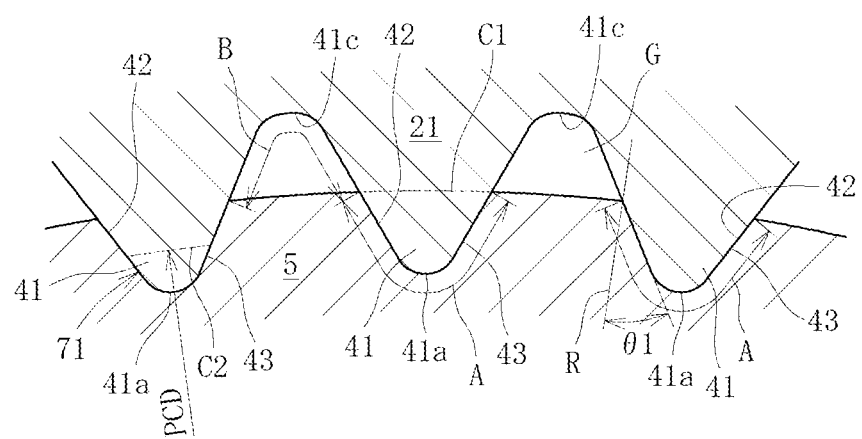
FIG. 13B An enlarged view of a Y portion of FIG. 13A.

Also in this recess-projection fitting structure M, as illustrated in FIG. 13B, the circle C2 which passes, across the projection portions 41, the halfway points of the distance from the circle C1 which passes boundary portions between the region in which the projection portion 41 is fitted to the recessed portion 42 and the region in which the projection portion 41 is not fitted to the recessed portion 42 to the circular orbit passing the apex portions 41a of the projection portions 41 is defined as the pitch circle. On this pitch circle, the angle θ1 formed by the radial line R and the side surface of each of the projection portions 41 is set to fall within the range of 0°≤θ1≤45°. Further, when a diameter of the pitch circle C2 of the projection portions 41 is represented by PCD and the number of the projection portions 41 is represented by Z, PCD/Z is set to fall within the range of 0.30≤PCD/Z≤1.0.

Also in this structure, the extruded portions 46 are formed by press-fitting, and hence it is preferred to provide the pocket portion 47 for accommodating those extruded portions 46. In this structure, the extruded portions 46 are formed on the inboard side of the shaft portion 5, and hence the pocket portion 47 is provided on the inboard side with respect to the recess-projection fitting structure M and on the hub wheel 21 side (not shown).

As described above, when the projection portions 41 of the recess-projection fitting structure M are formed on the inner surface of the hole portion 24 of the hub wheel 21, it is unnecessary to perform thermosetting treatment on the shaft portion 5 side. Thus, there is an advantage that the outer joint member 3 of the constant velocity universal joint 2 can be manufactured with excellent productivity.

Hereinabove, description has been made of the embodiments of the first invention of the present application. However, the first invention of the present application is not limited to the above-mentioned embodiments, and various modifications may be made thereto. For example, for the projection portions 41 of the recess-projection fitting structure M, there may be employed a projection portion 41 having various sectional shapes other than the above-mentioned shapes, such as a semi-circular shape, a semi-elliptical shape, and a rectangular shape. In addition, the area, the number, a circumferential arrangement pitch, and the like of the projection portions 41 can also be arbitrarily changed. The projection portions 41 may be formed of a key or the like separate from the shaft portion 5 and the hub wheel 21.

Further, the hole portion 24 of the hub wheel 21 may comprise a modified hole such as a polygonal hole other than a circular hole, and the sectional shape of the shaft portion 5 to be fit-inserted into the hole portion 24 also may comprise a modified sectional shape such as a polygonal shape other than a circular shape. Still further, when the shaft portion 5 is press-fitted into the hole portion 24 of the hub wheel 21, it suffices that a hardness of at least an end portion region of each of the projection portions 41 comprising an end portion thereof on a press-fitting start side is higher than a hardness of a side which is subjected to press-fitting. Thus, it is not necessary to increase the hardness of the entirety of each of the projection portions 41. Further, in the embodiments described hereinabove, as illustrated, for example, in FIGS. 2B and 13B, the gap G is formed between the outer surface of the shaft portion 5 and the inner surface of the hub wheel 21 of the recess-projection fitting structure M. However, the entirety of a groove to be formed between the projection portions 41 and 41 adjacent to each other in the circumferential direction may be filled with a body of a counterpart so that such a gap G is not formed.

Although not shown, a member to be provided with the recessed portions 42 may be provided with small recessed portions in advance at a predetermined interval along the circumferential direction. It is necessary to set a capacity of the small recessed portions to be smaller than a capacity of the recessed portions 42. When such small recessed portions are provided, a volume of the extruded portions 46 formed at the time of press-fitting of the projection portions 41 can be reduced. As a result, press-fitting resistance can be reduced. Further, an amount of the extruded portions 46 can be reduced, and hence the capacity of the pocket portion 47 can be saved. As a result, processability of the pocket portion 47 and strength of the shaft portion 5 can be enhanced. Note that, various shapes such as a triangular shape, a semi-elliptical shape, and a rectangular shape can be employed as the shape of the small recessed portion. In addition, the number of the small recessed portions can also be arbitrarily set.

Further, as the rolling elements for the bearing for wheel 20, rollers may be used other than the balls 27. In addition, in the constant velocity universal joint 2, the inner joint member 6 and the shaft 10 may be integrated with each other through intermediation of the above-mentioned recess-projection fitting structure M.

Further, in the embodiments described hereinabove, the first invention of the present application is applied to a third-generation bearing device for wheel. In addition, the first invention of the present application may be similarly applied to bearing device for wheels of a first generation type, a second generation type, and a fourth generation type as well.

In the following, description is made of embodiments of a second invention of the present application with reference to FIGS. 16 to 31.

Figure 16:
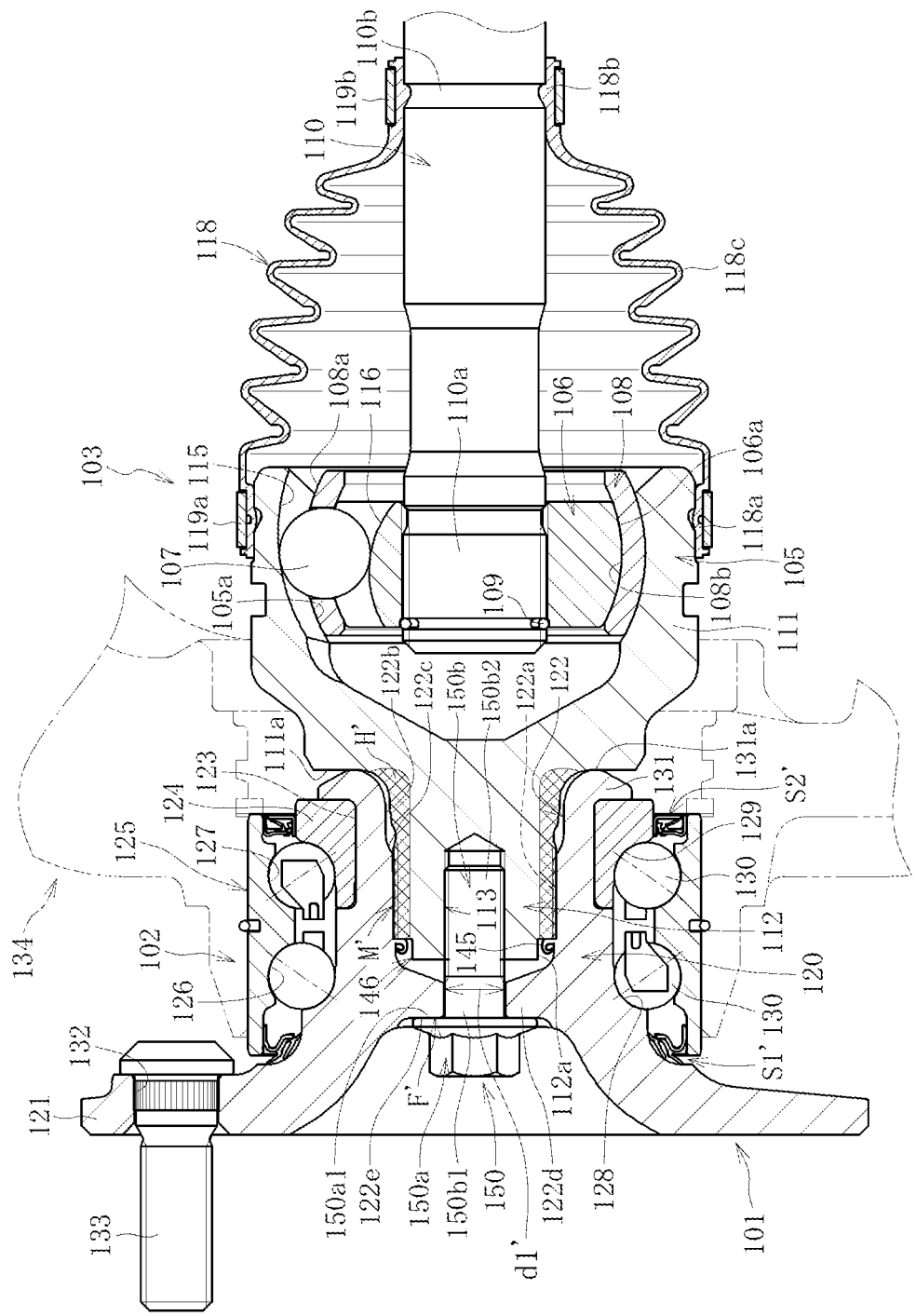
FIG. 16 A sectional view of a bearing device for wheel according to a first embodiment of a second invention of the present application.

FIG. 16 is a sectional view of a bearing device for wheel according to a first embodiment of the second invention of the present application. A main part of the bearing device for wheel illustrated in FIG. 16 is formed of an integral piece of a double row bearing for wheel 102 comprising a hub wheel 101 and a constant velocity universal joint 103. Note that, in the following description, the inboard side and the outboard side respectively refer to the sides on the inner side and the outer diameter side in the vehicle width direction of a vehicle under a state in which the bearing device for wheel is mounted to the vehicle. In FIG. 16, the right side corresponds to the inboard side and the left side corresponds to the outboard side.

The constant velocity universal joint 103 comprises, as main components, a joint outer race 105 as an outer joint member, a joint inner race 106 as an inner joint member arranged on an inner diameter side with respect to the joint outer race 105, a plurality of balls 107 interposed between the joint outer race 105 and the joint inner race 106, and a cage 108 interposed between the joint outer race 105 and the joint inner race 106 so that the balls 107 are retained. The joint inner race 106 is spline-fitted to a shaft 110 by press-fitting an end portion 110a of the shaft 110 along an inner diameter of a hole portion of the joint inner race 106 so that torque can be transmitted between the joint inner race 106 and the shaft 110. A stopper ring 109 is fitted to the end portion 110a of the shaft 110 so that the shaft 110 is prevented from dropping off the joint inner race 106.

The joint outer race 105 comprises a mouth portion 111 and a shaft portion 112. The mouth portion 111 has a cup-like shape in which one end is opened, and has an inner spherical surface 105a in which a plurality of track grooves 115 extending in an axial direction are equiangularly formed. The track grooves 115 extend to an opening end of the mouth portion 111. An opening portion of the mouth portion 111 is closed by a boot 118. The boot 118 is formed of a large diameter portion 118a, a small diameter portion 118b, and a bellows portion 118c coupling the large diameter portion 118a and the small diameter portion 118b to each other. The large diameter portion 118a of the boot 118 is tightened to the joint outer race 105 with a boot band 119a under a state in which the large diameter portion 118a is externally fitted to the opening portion of the mouth portion 111. Meanwhile, the small diameter portion 118b of the boot 118 is tightened to the shaft 110 with a boot band 119b under a state in which the small diameter portion 118b is externally fitted to a boot mount portion 110b of the shaft 110.

At a leading end portion (end portion on the outboard side) of the shaft portion 112, there is provided a small diameter portion 112a smaller in outer diameter dimension than other parts. At the axial center of the leading end portion of the shaft portion 112, there is provided a bolt hole 113 opened in an end surface on the outboard side. The bolt hole 113 is provided with a female threaded portion, and a bolt member 150 inserted through the hub wheel 101 is threadedly engaged into the female threaded portion. With this, the shaft portion 112 of the joint outer race 105 is bolt-fixed to the hub wheel 101, and hence the shaft portion 112 of the joint outer race 105 is prevented from dropping off the hub wheel 101. The bolt member 150 is formed of a head portion 150a integrated with a flange (washer) and a threaded shaft portion 150b. The threaded shaft portion 150b comprises a columnar proximal portion 150b1 and a male threaded portion 150b2 threadedly engaged with the female threaded portion of the bolt hole 113.

The joint inner race 106 has an outer spherical surface 106a in which a plurality of track grooves 116 extending in the axial direction are equiangularly formed.

The track grooves 115 of the joint outer race 105 and the track grooves 116 of the joint inner race 106 are provided in pairs, and a ball track formed of each of the pairs of the track grooves 115 and the track grooves 116 incorporates corresponding one of the balls 107 as torque transmitting elements so that the balls 107 can roll. The balls 107 are interposed between the track grooves 115 of the joint outer race 105 and the track grooves 116 of the joint inner race 106 so as to transmit torque. The cage 108 is interposed so as to be slidable between the joint outer race 105 and the joint inner race 106, and has an outer spherical surface 108a to be fitted to the inner spherical surface 105a of the joint outer race 105 and an inner spherical surface 108b to be fitted to the outer spherical surface 106a of the joint inner race 106. Note that, the constant velocity universal joint 103 used in this embodiment is of what is called a Rzeppa type in which the track grooves 115 and the track grooves 116 each have a curved-surface shape, but there may be employed a constant velocity universal joint of other well-known types such as what is called an undercut free type in which the outer race track grooves 115 are each formed into a linear shape on the opening side of the mouth portion 111 and the inner race track grooves 116 are each formed into a linear shape on a deep side of the mouth portion 111.

The hub wheel 101 is formed of an integral piece of a cylindrical portion 120 and a flange 121 provided on the outboard side of the cylindrical portion 120. The flange 121 functions as a mounting portion for mounting the hub wheel 101 to a wheel, and is provided with a bolt mounting hole 132. A hub bolt 133 is mounted into the bolt mounting hole 132 so that a wheel and a brake rotor are fixed to the flange 121 with the hub bolt 133.

The cylindrical portion 120 of the hub wheel 101 is provided with a hole portion 122. The hole portion 122 comprises a shaft-portion fitting hole 122a positioned at a substantially intermediate portion of the hub wheel 101 (cylindrical portion 120) in the axial direction and a large diameter hole 122b positioned on the inboard side with respect to the shaft-portion fitting hole 122a. Between the shaft-portion fitting hole 122a and the large diameter hole 122b, there is provided a tapered portion (tapered hole) 122c gradually reduced in diameter toward the outboard side. A taper angle (an angle of inclination to the axis) of the tapered portion 122c is set to range, for example, from 15° to 75°. In the shaft-portion fitting hole 122a, through intermediation of a recess-projection fitting structure M' described below, the shaft portion 112 of the joint outer race 105 and the hub wheel 101 are coupled to each other.

In the cylindrical portion 120, on the outboard side with respect to the shaft-portion fitting hole 122a, a cylindrical inner wall 122d projecting in an inner diameter direction is provided. The inner wall 122d functions as a receiving portion for receiving the head portion 150a of the bolt member 150, and the threaded shaft portion 150b of the bolt member 150 is inserted along an inner periphery of the inner wall 122d. Then, when the male threaded portion 150b2 of the threaded shaft portion 150b is threadedly engaged with the female threaded portion of the bolt hole 113, an inner peripheral surface of the inner wall 122d faces an outer peripheral surface of the proximal portion 150b1 of the threaded shaft portion 150b. An inner diameter dimension d1' of the inner wall 122d is set to be slightly larger than an outer diameter dimension (axial diameter) d' of the proximal portion 150b1 of the threaded shaft portion 150b (refer to FIG. 22A). Specifically, the inner diameter dimension d1' is set to fall within an approximate range of 0.05 mm<d1'−d'<0.5 mm. Note that, at a central portion of an outboard-side end surface of the hub wheel 101, there is provided a concave recessed portion 122e formed backward to the inboard side. A bottom surface of the concave recessed portion 122e (end surface on the outboard side of the inner wall 122d) forms a receiving surface F' against which a seat surface 150a1 of the bolt member 150 comes into abutment.

On an outer peripheral surface on the inboard side of the hub wheel 101, there is formed a step portion 123 having a small diameter. Through press-fitting of an inner race 124 with respect to the step portion 123, there are formed an inner member having double-row inner raceway surfaces (inner races) 128 and 129. Of those double-row inner raceway surfaces, the inner raceway surface 128 on the outboard side is formed on an outer peripheral surface of the hub wheel 101, and the inner raceway surface 129 on the inboard side is formed on an outer peripheral surface of the inner race 124. A main part of the bearing for wheel 102 is formed of the inner member, a cylindrical outer member 125 arranged on an outer diameter side with respect to the inner member and having an inner periphery on which double-row outer raceway surfaces (outer races) 126 and 127 are formed, and balls as rolling elements 130 arranged between the outer raceway surface 126 on the outboard side of the outer member 125 and the inner raceway surface 128 of the hub wheel 101 and between the outer raceway surface 127 on the inboard side of the outer member 125 and the inner raceway surface 129 of the inner race 124. The outer member 125 is mounted to a knuckle 134 extending from a suspension of a vehicle body (not shown). To opening portions at both ends of the outer member 125, sealing members S1' and S2' are respectively provided to prevent a lubricant such as grease sealed in an inside of the bearing for wheel 102 from leaking to the outside and a foreign matter from intruding into an inside of the bearing. In this way, the inner member having the inner raceway surfaces 128 and 129 is formed of the hub wheel 101 and the inner race 124 fitted (press-fitted) to the step portion 123 of the hub wheel 101. Thus, weight reduction and compactification of the bearing device for wheel are achieved.

In the bearing for wheel 102, the inner race 124 is pressed to the outboard side with a crimped portion 131 formed by crimping an inboard-side end portion of the cylindrical portion 120 of the hub wheel 101 so that the inner race 124 is fixed to the hub wheel 101 and a preload is applied to the inside of the bearing. In this way, when a preload is applied to the bearing for wheel 102 with the crimped portion 131 formed at the end portion of the hub wheel 101, it is unnecessary to apply a preload to bearing for wheel 102 with the mouth portion 111 of the joint outer race 105 and the bolt member 150. In addition, it is unnecessary to strictly control tightening torque of the bolt member 150. Thus, the shaft portion 112 of the joint outer race 105 can be assembled to the hub wheel 101 without necessity of considering a preload amount, and hence assembly properties of the hub wheel 101 and the joint outer race 105 can be enhanced.

An inboard-side end portion of the hub wheel 101 is held in abutment against an outboard-side end portion of the joint outer race 105. Specifically, an end surface 131a of the crimped portion 131 of the hub wheel 101 and a back surface 111a of the mouth portion 111 of the joint outer race 105 face and are held in contact with each other.

Figure 17A:
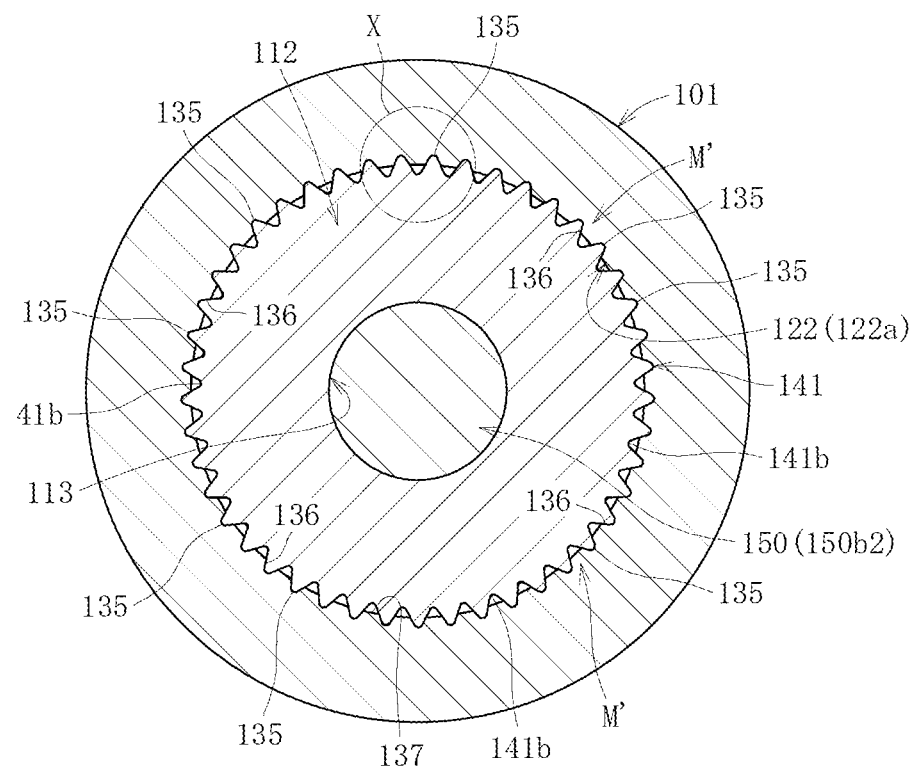
FIG. 17A An axially orthogonal sectional view of a recess-projection fitting structure provided in the bearing device for wheel illustrated in FIG. 16.
Figure 17B:
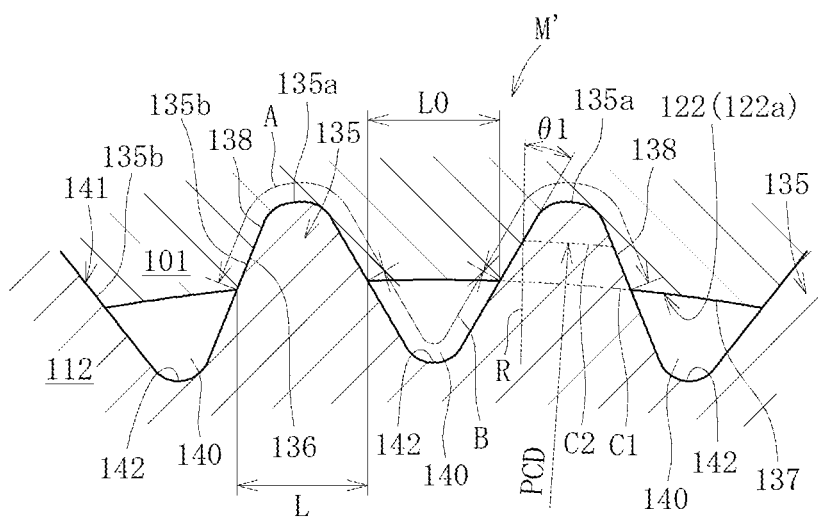
FIG. 17B An enlarged view of an X portion in FIG. 17A.

As illustrated in FIGS. 17A and 17B, the recess-projection fitting structure M' is formed of projection portions 135 provided on an outboard-side end portion of the shaft portion 112 and extending in the axial direction and recessed portions 136 formed in an inner surface 137 of the shaft-portion fitting hole 122a, of the hole portion 122 of the hub wheel 101. The projection portions 135 and the recessed portions 136 of the hub wheel 101, which fit to the projection portions 135, are kept in an intimate contact state over the entirety of each fitting part 138. In this embodiment, a male spline 141 is formed on an outer peripheral surface of the outboard-side end portion of the shaft portion 112. With this, the plurality of projection portions 135 extending in the axial direction are circumferentially arranged at a predetermined interval, and the plurality of axial recessed portions 136 to be fitted to the projection portions 135 are circumferentially formed in the inner surface 137 of the shaft-portion fitting hole 122a of the hub wheel 101. The projection portions 135 and the recessed portions 136 are tightly fitted to each other over the entire region in the circumferential direction.

In this embodiment, the projection portions 135 each have a triangular shape (mountain shape) in cross-section in which an apex portion is formed into a convex round shape, and a fitting region with respect to corresponding one of the recessed portions 136 is a range A illustrated in FIG. 17B. Specifically, each of the projection portions 135 and corresponding one of the recessed portions 136 are fitted to each other over a range of from halfway portions on both sides in the circumferential direction to the apex portion (tooth tip) 135a of the projection portion 135 in cross-section. Between the projection portions 135 adjacent to each other in the circumferential direction, a gap 140 is formed on an inner diameter side with respect to the inner surface 137 of the hub wheel 101. Thus, the side surfaces 135b of the projection portions 135 each have a region B in which the projection portion 135 is not fitted to corresponding one of the recessed portions 136.

Figure 18A:
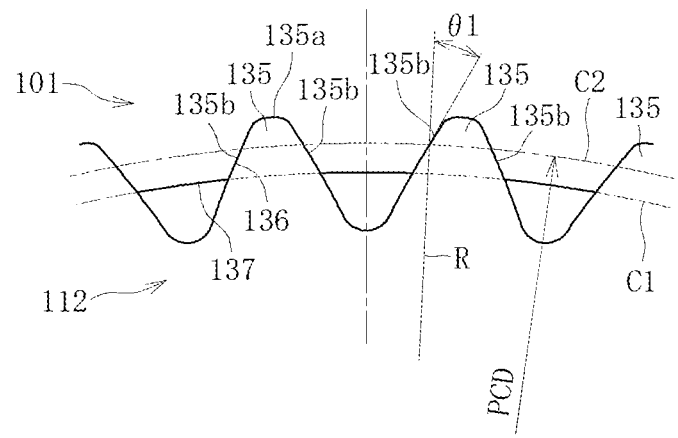
FIG. 18A A front view of projection portions provided to a shaft portion.

Also as illustrated in FIG. 18A, in the recess-projection fitting structure M', on a pitch circle of the projection portions 135, when an angle formed by a radial line (line of radius) R and a side surface 135b of each of the projection portions 135 is represented by θ1, the angle θ1 is set to fall within a range of 0°≤θ1≤45° (In FIG. 18A, θ1 is approximately 30°). Here, the pitch circle of the projection portions 135 refers to a circle C2 which passes, across the side surfaces 135b of each of the projection portions 135, halfway points of a distance from a circle C1 which passes boundary portions between a region in which the projection portion 135 is fitted to the recessed portion 136 and a region in which the projection portion 135 is not fitted to the recessed portion 136 to a circular orbit passing the tooth tips 135a of the projection portions 135. When a diameter of the pitch circle C2 of the projection portions 135 is represented by PCD and the number of the projection portions 135 is represented by Z, a ratio P of Z to PCD (P=PCD/Z) is set to fall within a range of 0.3≤P≤1.0.

Figure 18B:
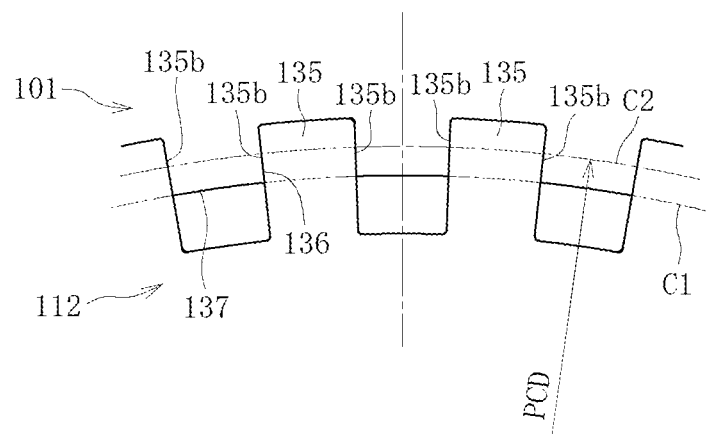
FIG. 18B A front view illustrating another example of the projection portions.
Figure 18C:
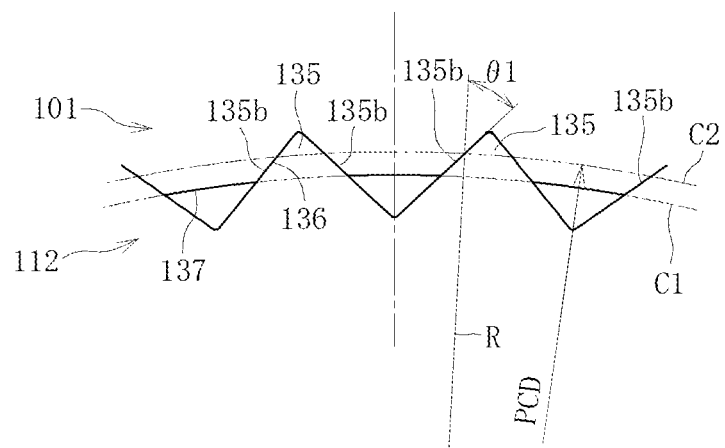
FIG. 18C A front view illustrating still another example of the projection portions.

Note that, the projection portions 135 illustrated in FIGS. 17 and 18A each have a triangular shape in cross-section in which the tooth tip 135a is formed into a round shape. Alternatively, there may be employed projection portions 135 each having other sectional shapes as illustrated in FIGS. 18B and 18C. The projection portions 135 illustrated in FIG. 18B each have a rectangular shape in cross-section in which the angle θ1 is set to substantially 0°, and the projection portions 135 illustrated in FIG. 18C each have a triangular shape in cross-section in which the tooth tip is formed to have an angle of approximately 90° and the angle θ1 is set to approximately 45°.

The hub wheel 101 and the joint outer race 105 are coupled to each other with the above-mentioned recess-projection fitting structure M' formed between the hole portion 122 of the hub wheel 101 and the shaft portion 112 of the joint outer race 105. The recess-projection fitting structure M' can be obtained, for example, by the following procedure.

First, as illustrated in FIGS. 16 and 17, the male spline 141 comprising the large number of teeth (projection portions 135) extending in the axial direction is formed on the shaft portion 112 of the joint outer race 105 by well-known processing methods (such as a rolling process, a trimming process, a pressing process, and a drawing process). Each of the projection portions 135 of the male spline 141 corresponds to a region surrounded by a circle passing tooth bottoms 142, the tooth tip (apex portion) 135a, and both the side surfaces 135b and 135b continuous to the tooth tip 135a. When the projection portions 135 of the shaft portion 112 are formed of the male spline 141, processing equipment for forming a spline for other shafts of this type can be utilized, and hence the projection portions 135 can be formed at low cost. In addition, at the axial center of the outboard-side end portion of the shaft portion 112, the bolt hole 113 comprising the male threaded portion is formed.

Figure 19:
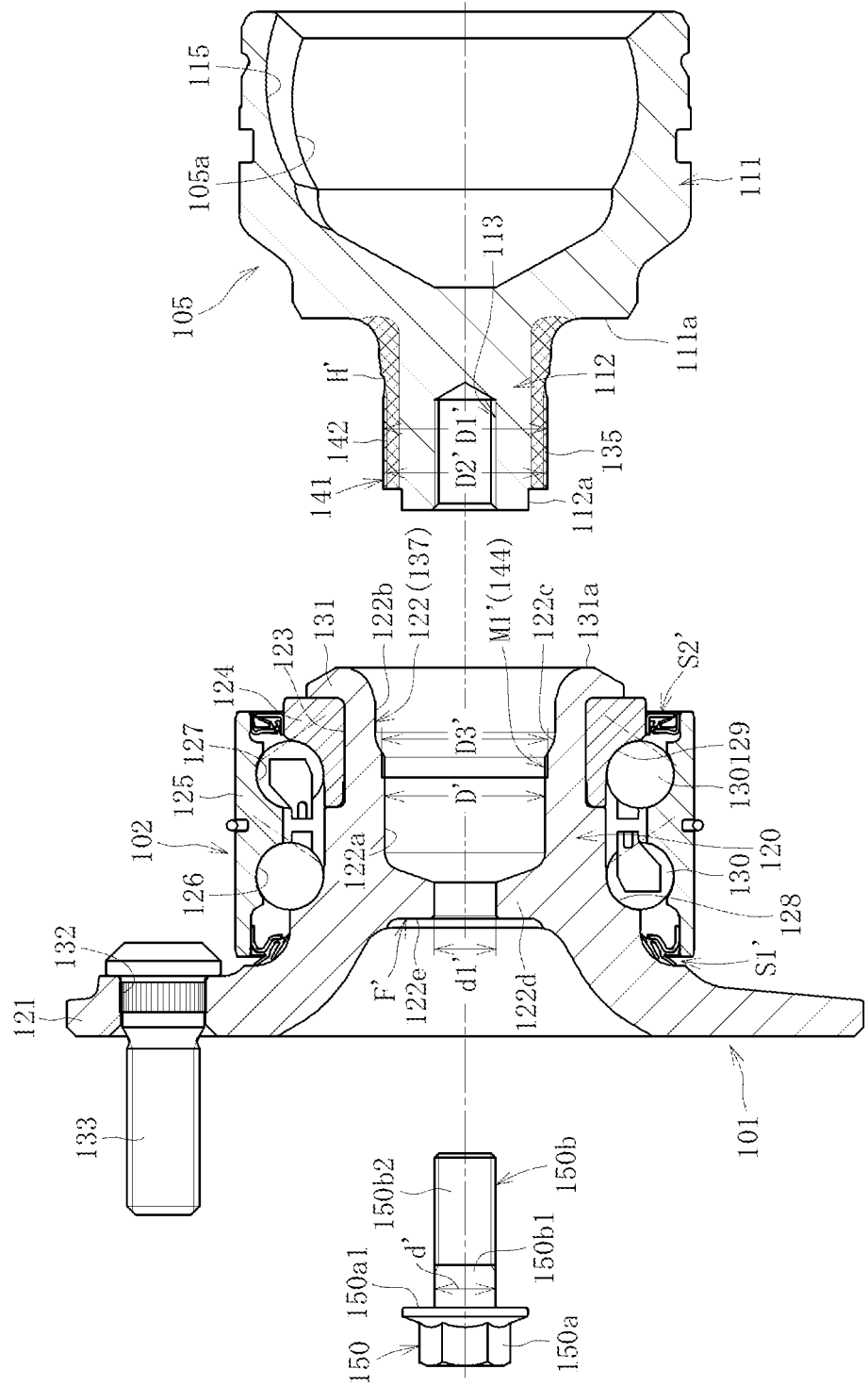
FIG. 19 A sectional view illustrating a state of the bearing device for wheel illustrated in FIG. 16 before assembly.

Next, on the shaft portion 112, regions indicated by cross-hatching in FIGS. 16 and 19 are subjected to thermosetting treatment so as to form a cured layer H'. The cured layer H' is continuously formed in the circumferential direction over the entirety of each of the projection portions 135 and the entirety of each tooth bottom 142. Note that, an axial range in which the cured layer H' is formed is defined as a range comprising at least a continuous region from an edge on the outboard side of the male spline 141 to the proximal end portion of the shaft portion 112 (border portion between the mouth portion 111 and the shaft portion 112). For the thermosetting treatment, various quenching methods such as induction hardening and carburizing-and-quenching can be employed. By the way, the induction hardening refers to a quenching method in which a part required to be quenched is inserted into a coil carrying a high-frequency current, and which applies the principle that, with an electromagnetic induction action, Joule heat is generated to heat a conductive body. The carburizing-and-quenching refers to a method of causing carbon to intrude and spread from a surface of a low carbon material and then performing quenching.

Meanwhile, an inner diameter side of the hub wheel 101 is left unheated. In other words, the inner surface 137 of the hole portion 122 of the hub wheel 101 is an uncured portion which is not subjected to thermosetting treatment (unheated state). A difference in hardness between the cured layer H' of the shaft portion 112 of the joint outer race 105 and the uncured portion of the hub wheel 101 is set to 20 points or more in HRC. For example, a hardness of the cured layer H' is set to range approximately from 50 HRC to 65 HRC, and a hardness of the uncured portion is set to range approximately from 10 HRC to 30 HRC. Note that, it suffices that, on the inner surface 137 of the hole portion 122 of the hub wheel 101, only a formation region for the shaft-portion fitting hole 122a is left uncured, and other regions may be subjected to thermosetting treatment. Further, the above-mentioned region, which is to be the "uncured portion", may be subjected to thermosetting treatment as long as the above-mentioned difference in hardness is secured.

Figure 21:
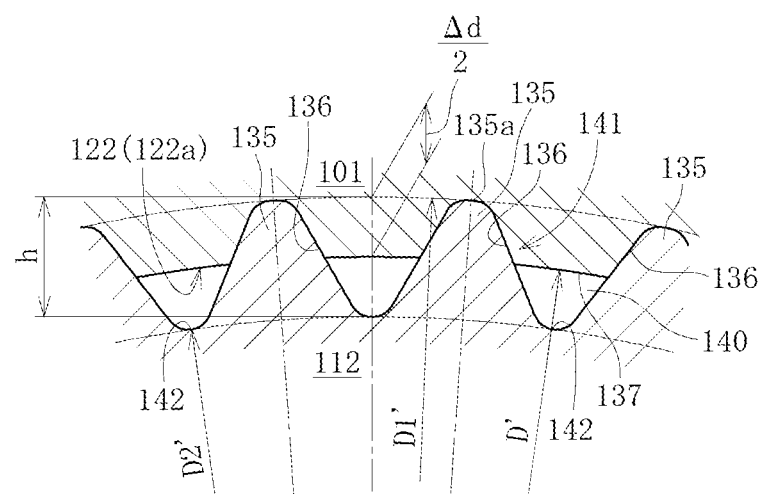
FIG. 21 A main-part enlarged view of FIG. 17A.

An intermediate portion of each of the projection portions 135 in a height direction corresponds to a position of the inner surface 137 of the shaft-portion fitting hole 122a of the hub wheel 101 prior to formation of the recessed portions 136. Specifically, as illustrated in FIGS. 19 and 21, an inner diameter dimension D' of the shaft-portion fitting hole 122a is set to be smaller than a maximum outer diameter dimension (diameter dimension of a circular orbit passing the tooth tips 135a of the projection portions 135) D1' of the male spline 141, and to be larger than a minimum outer diameter dimension (diameter dimension of a circular orbit connecting the tooth bottom 142 to each other) D2' of the male spline 141 (D2'<D'<D1').

Figure 20A:
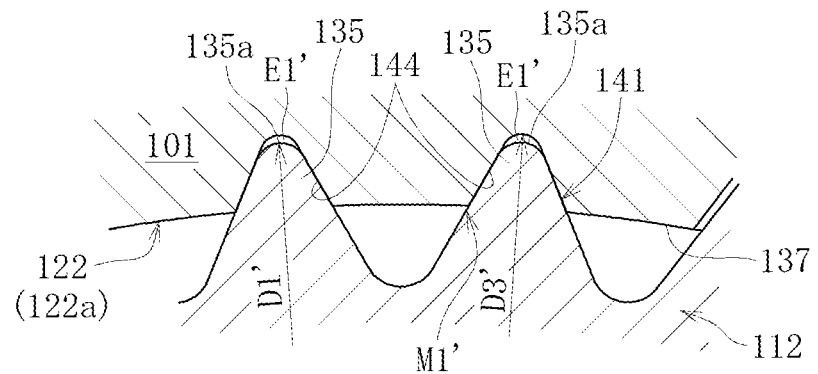
FIG. 20A A conceptual view illustrating a guide portion provided along an inner diameter of a hole portion of a hub wheel.

As illustrated in FIG. 19, in the hole portion 122 of the hub wheel 101, at an inboard-side end portion of the shaft-portion fitting hole 122a, there is provided a guide portion M1' for guiding the projection portions 135 at the start of press-fitting. As illustrated in FIG. 20A, the guide portion M1' is formed of a plurality of guide grooves 144 formed at a predetermined pitch in the circumferential direction (in this case, at the same pitch as those of the projection portions 135) at the inboard-side end portion of the shaft-portion fitting hole 122a. A radial dimension D3' of the bottom portions of the guide grooves 144 diameter dimension D3' of a circular orbit connecting groove bottoms of the guide grooves 144 to each other is set to be somewhat larger than the maximum outer diameter dimension D1' of the male spline 141 (D3'>D1'). With this, under a state in which leading end portions (outboard-side end portions) of the projection portions 135 of the shaft portion 112 are arranged at the inboard-side end portion of the shaft-portion fitting hole 122a of the hub wheel 101, a radial gap E1' is formed between each of the tooth tips 135a of the projection portions 135 and corresponding one of the groove bottoms of the guide grooves 144.

Then, as illustrated in FIG. 20, a leading end of the shaft portion 112 of the joint outer race 105 is arranged at the inboard-side end portion of the hole portion 122 of the hub wheel 101, and then the shaft portion 112 is press-fitted into the shaft-portion fitting hole 122a of the hub wheel 101. At the time of press-fitting the shaft portion 112, the leading end portions of the projection portions 135 provided to the shaft portion 112 are fitted to the guide grooves 144 formed at the inboard-side end portion of the shaft-portion fitting hole 122a. At this time, as described above, the radial gap E1' is formed between each of the projection portions 135 and corresponding one of the guide grooves 144, and hence the projection portions 135 can be easily fitted to the guide grooves 144. In addition, the guide grooves 144 do not hinder press-fitting of the projection portions 135. Note that, prior to press-fitting of the shaft portion 112, a sealing material may be applied in advance to the outer surface on the leading end side comprising the male spline 141 of the shaft portion 112. A type of a usable sealing material is not particularly limited, and, for example, sealing materials made of various resins can be selected and used.

The tapered portion 122c gradually reduced in diameter along a direction in which the shaft portion 112 is press-fitted (toward the outboard side) is provided in the hole portion 122 of the hub wheel 101. Thus, when press-fitting is started, the shaft portion 112 is centered with respect to the shaft-portion fitting hole 122a of the hole portion 122. As described above, the inner diameter dimension D' of the shaft-portion fitting hole 122a, the maximum outer diameter dimension D1' of the male spline 141, and the minimum outer diameter dimension D2' of the male spline 141 are set to satisfy the above-mentioned dimensional relationship (D2'<D'<D1'). Thus, when the shaft portion 112 is press-fitted into the shaft-portion fitting hole 122a of the hub wheel 101, the projection portions 135 bite into an inner diameter portion of the inboard-side end surface of the hub wheel 101 and cut into a body of the hub 101. Then, when the shaft portion 112 is further press-fitted, the projection portions 135 cut out or push out the inner surface 137 of the shaft-portion fitting hole 122a of the hub wheel 101. In this way, the recessed portions 136 conforming to the projection portions 135 of the shaft portion 112 are formed in the inner surface 137 of the shaft-portion fitting hole 122a. At this time, the projection portions 135 of the shaft portion 112 are formed to be higher by 20 points or more in hardness than the inner surface 137 of the shaft-portion fitting hole 122 of the hub wheel 101, and hence the recessed portions 136 are easily formed in the inner surface 137 of the shaft-portion fitting hole 122a of the hub wheel 101. Further, when the hardness on the shaft portion 112 side is set to be high as described above, torsional strength of the shaft portion 112 can also be enhanced.

Through such a press-fitting step, as illustrated in FIGS. 17A and 17B, the recessed portions 136 to be fitted to the projection portions 135 of the shaft portion 112 are formed in the inner surface 137 of the shaft-portion fitting hole 122a of the hub wheel 101. As the projection portions 135 gradually bite into the inner surface 137 of the shaft-portion fitting hole 122a of the hub wheel 101, the hole portion 122 is slightly increased in diameter, and in this state, the shaft portion 112 provided with the projection portions 135 is allowed to move in the axial direction. Meanwhile, when the axial movement of the shaft portion 112 is stopped, the inner surface 137 radially shrinks to return to an original diameter. In other words, at the time of press-fitting the projection portions 135, the hub wheel 101 is elastically deformed in an outer diameter direction, and a preload generated by the elastic deformation is applied to a surface of a part of the projection portions 135, which is to be fitted to the recessed portions 136. Thus, the recessed portions 136 are held in intimate contact with surfaces of the projection portions 135 entirely over the axial direction thereof. In this way, the recess-projection fitting structure M' is formed. As described above, a sealing material may be applied in advance to the outer surface of the shaft portion 112 on the leading end side. When the sealing material is applied in advance, the sealing material can be spread over the fitting portions 138 of the projection portions 135 and the recessed portions 136 along with press-fitting of the shaft portion 112. Thus, a foreign matter can be effectively prevented from intruding into the fitting portions 138.

Further, the hub wheel 101 undergoes plastic deformation along with press-fitting of the shaft portion 112, and hence surfaces of the recessed portions 136 undergo work hardening. Thus, the inner surface 137 of the hub wheel 101 on the recessed portions 136 side is hardened, with the result that rotational torque is transmitted with higher efficiency.

Note that, in order to form the recess-projection fitting structure M', the shaft portion 112 may be moved relative to the fixed hub wheel 101, or reversely, the hub wheel 101 may be moved relative to the fixed shaft portion 112. Alternatively, both the hub wheel 101 and the shaft portion 112 may be moved relative to each other.

As described above, the tapered portion 122c is capable of functioning as a guide at the time of starting press-fitting of the shaft portion 112, and hence the shaft portion 112 can be press-fitted with high accuracy. In addition, the guide grooves 144 (guide portion M1') are provided at the inboard-side end portion of the shaft-portion fitting hole 122a positioned on the outboard side with respect to the tapered portion 122c, and hence the shaft portion 112 can be press-fitted under a state in which the projection portions 135 are fitting along the guide grooves 144. With this, press-fitting can be performed with much higher accuracy, and hence a situation in which the projection portions 135 are press-fitted in a decentered state or an inclined state can be more effectively prevented. As a result, the recess-projection fitting structure M' having high accuracy can be obtained. Further, at the time of press-fitting the shaft portion 112, the sealing material applied to the outer surface of the shaft portion 112 functions as a lubricant, and hence the shaft portion 112 can be smoothly press-fitted.

Figure 20B:
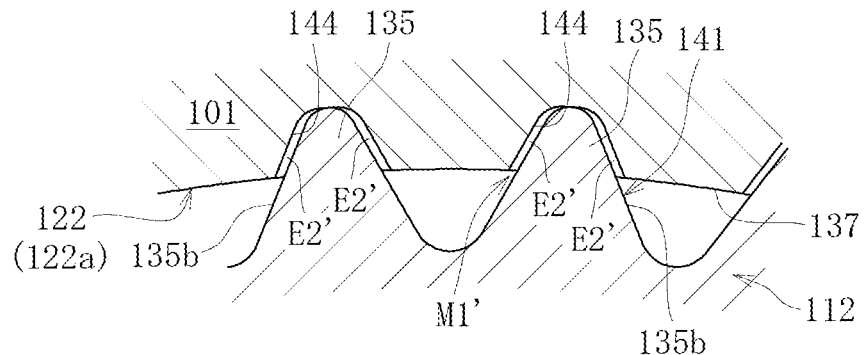
FIG. 20B A view illustrating another example of the guide portion.
Figure 20C:
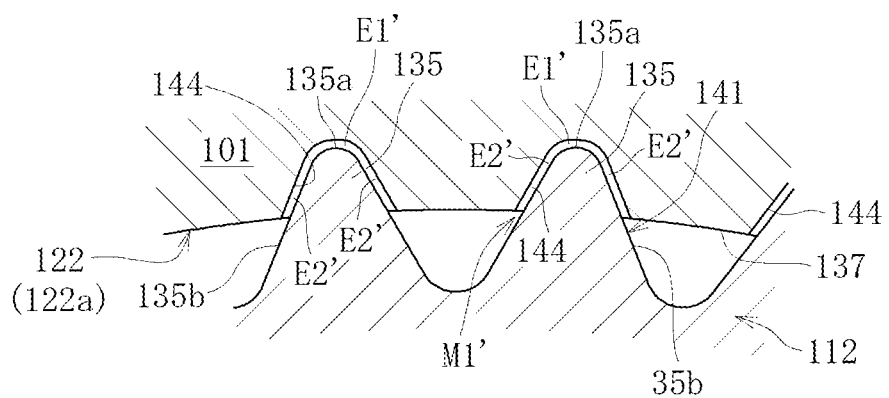
FIG. 20C A view illustrating still another example of the guide portion.

In this embodiment, as illustrated in FIG. 20A, the guide grooves 144 are formed at the inboard-side end portion of the shaft-portion fitting hole 122a so that the radial gap E1' is formed between each of the tooth tips 135a of the projection portions 135 and the corresponding one of the groove bottoms of the guide grooves 144. However, the way of forming the guide grooves 144 is not limited thereto. For example, as illustrated in FIG. 20B, the guide grooves 144 may be formed so that circumferential gaps E2' are formed between each of the guide grooves 144 and the side surfaces 135b of corresponding one of the projection portions 135. Alternatively, as illustrated in FIG. 20C, the guide grooves 144 may be formed so that the radial gap E1' is formed between each of the guide grooves 144 and the tooth tip 135a of corresponding one of the projection portions 135 and that the circumferential gaps E2' are formed between each of the guide grooves 144 and the side surfaces 135b of corresponding one of the projection portions 135.

The shaft portion 112 continues to be press-fitted until the back surface 111a of the mouth portion 111 abuts against the end surface 131a of the crimped portion 131 of the hub wheel 101 as illustrated in FIG. 16. When the end surface 131a of the crimped portion 131 of the hub wheel 101 and the back surface 111a of the mouth portion 111 of the joint outer race 105 are brought into abutment against each other in this way, flexural rigidity in the axial direction of the bearing device for wheel is enhanced. As a result, a product having high quality and excellent in durability is produced. Further, the shaft portion 112 of the joint outer race 105 can be positioned relative to the hub wheel 101 in the axial direction. Thus, dimensional accuracy of the bearing device for wheel is stabilized, and an axial length of the recess-projection fitting structure M' is also stabilized. As a result, torque transmission performance can be enhanced. Further, with this contact, a sealing structure can be formed between the hub wheel 101 and the mouth portion 111, and hence a foreign matter can be prevented from intruding into the recess-projection fitting structure M' from the crimped portion 131. With this, a fitting condition of the recess-projection fitting structure M' can be stably maintained over a long time period.

As described above, when the end surface 131a of the hub wheel 101 and the back surface 111a of the mouth portion 111 are held in contact with each other, it is desired that contact surface pressure of the end surface 131a and the back surface 111a be set to 100 MPa or less for the following reason. When the contact surface pressure exceeds 100 MPa, torque may be transmitted also through a contact portion (between the end surface 131a and the back surface 111a). In particular, when torque exceeds a frictional force (static friction) of the contact portion as a result of application of excessively high torque, an abrupt slip may occur at the contact portion so that abnormal noise is generated. In contrast, when the contact surface pressure is set to 100 MPa or less, the contact portion slides even with low torque, and hence generation of abnormal noise can be suppressed.

At a time point when press-fitting of the shaft portion 112 is completed and the back surface 111a of the mouth portion 111 and the end surface 131a of the crimped portion 131 of the hub wheel 101 come into contact with each other, the small diameter portion 112a of the shaft portion 112 is not held in contact with the inner surface 137 of the hole portion 122 (shaft-portion fitting hole 122a) of the hub wheel 101 or the inboard-side end surface of the inner wall 122d. With this, on an outer diameter side with respect to the small diameter portion 112a of the shaft portion 112, there is formed a pocket portion 146 for accommodating extruded portions 145 formed along with formation of the recessed portions 136.

Figure 22A:
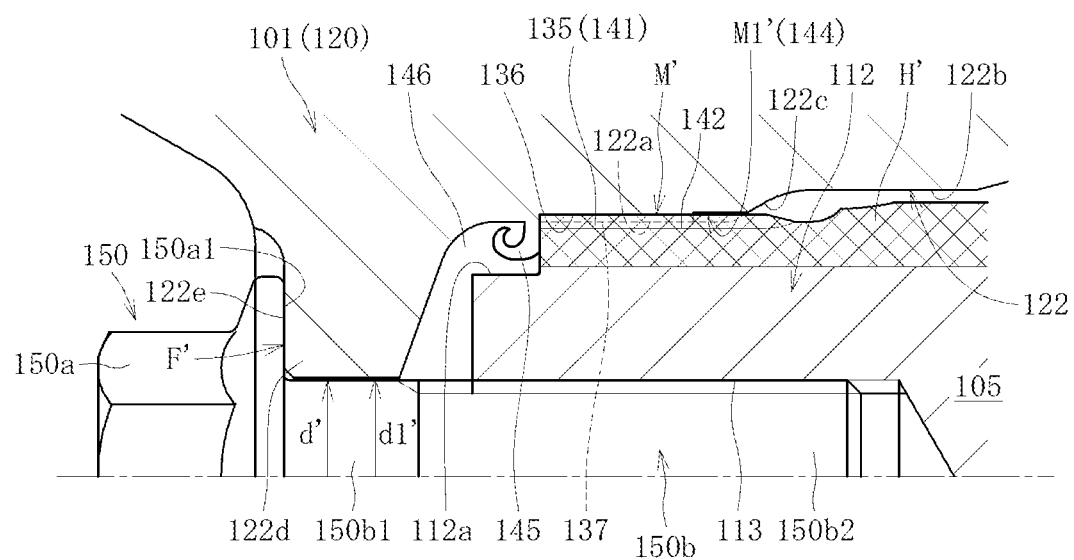
FIG. 22A An enlarged view of a vicinity of the recess-projection fitting structure illustrated in FIG. 16.

When the shaft portion 112 of the joint outer race 105 is press-fitted into the hole portion 122 of the hub wheel 101, also as illustrated in FIG. 22A, a material (body of the hub wheel 101) is extruded from the recessed portions 136 by a cut-out action or a push-out action caused by the projection portions 135. An amount of the extruded portions 145 thus formed corresponds to a capacity of parts of the projection portions 135, which are to be fitted to the recessed portions 136. When the extruded portions 145 are left as they are, the extruded portions 145 may drop into the inside of the vehicle. In contrast, when the pocket portion 146 as described above is formed, the extruded portions 145 are accommodated and retained in the pocket portion 146 while being curled. Thus, it is possible to prevent the extruded portions 145 from dropping off, and hence the above-mentioned failure can be overcome. Further, in this case, the extruded portions 145 can be left accommodated within the pocket portion 146, and hence it is no longer necessary to separately perform removal treatment for the extruded portions 145. Thus, assembly man-hours can be reduced, which leads to enhancement of assembly operability and cost reduction.

Note that, a shape of the pocket portion 146 is not limited as long as the generated extruded portions 145 can be accommodated. Further, a capacity of the pocket portion 146 is set to be at least larger than an expected formation amount of the extruded portions 145.

It is desired that the recess-projection fitting structure M' formed as described above be arranged out of inner diameter sides with respect to the raceway surfaces 126, 127, 128, and 129 of the bearing for wheel 102. In particular, it is more desired that the recess-projection fitting structure M' be formed out of an inner diameter side of intersections of the lines forming contact angles on the inner raceway surfaces 128 and 129, and be formed in a part of an axial region between those intersections. This is because, with this, an increase in hoop stress on the bearing raceway surfaces (tensile stress on an outer diameter portion of the hub wheel 101 an outer diameter portion of the inner race 124) can be effectively suppressed or prevented. When the increase in hoop stress can be suppressed or prevented, failures such as shortening of a rolling fatigue life, generation of cracks, and stress corrosion cracking can be prevented from occurring. As a result, the bearing 102 having higher quality can be provided.

Further, as illustrated in FIG. 21, at the time of forming the recess-projection fitting structure M', when a press-fitting margin of each of the projection portions 135 with respect to the hub wheel 101 is represented by $\Delta d$ and a height of each of the projection portions 135 is represented by "h", it is desired that $\Delta d/2h$ be set to fall within a range of $0.3 < \Delta d/2h < 0.86$. Here, the press-fitting margin $\Delta d$ is represented by a difference in diameter (D1'−D') between the maximum outer diameter dimension D1' of the male spline 141 provided to the shaft portion 112 and the inner diameter dimension D' of the shaft-portion fitting hole 122a of the hub wheel 101. With this, a part of each of the projection portions 135 near the intermediate portion of each of the projection portions 135 in the height direction bites into the inner surface of the hub wheel 101, and hence the press-fitting margin of each of the projection portions 135 can be sufficiently secured. As a result, the recessed portions 136 can be reliably formed.

When $\Delta d/2h$ is 0.3 or less, torsional strength decreases. Meanwhile, when $\Delta d/2h$ is 0.86 or more, minute decentering or inclination at the time of press-fitting may cause the entirety of each of the projection portions 135 to bite into a counterpart side. As a result, a press-fitting load may sharply increase, and formability of the recess-projection fitting structure M' may be deteriorated. When the formability of the recess-projection fitting structure M' is deteriorated, the torsional strength decreases. In addition, an expansion amount of an outer diameter of the hub wheel 101 increases. Thus, a function of the bearing for wheel 102 comprising the hub wheel 101 as a component is adversely affected, which may cause a problem of shortening of a rotational life. In contrast, when $\Delta d/2h$ is set to fall within the above-mentioned range, the formability of the recess-projection fitting structure M' is stabilized, and a variation in press-fitting load is eliminated. As a result, stable torsional strength can be obtained.

In the recess-projection fitting structure M' described above, the projection portions 135 and the recessed portions 136 are held in intimate contact with each other entirely over the fitting parts 138 without gaps, and hence backlash can be suppressed in the radial direction and the circumferential direction. Thus, a high torque load capacity can be secured even when a coupling portion of the hub wheel 101 and the joint outer race 105 is compactified. As a result, the bearing device for wheel can be downsized and reduced in weight. Further, backlash in the coupling portion (the recess-projection fitting structure M') can be suppressed, and hence generation of abnormal noise at the time of torque transmission can also be effectively prevented.

Further, it is unnecessary to form a female spline or the like in advance in the hole portion 122 of the hub wheel 101, and hence processing cost of the hub wheel 101 can be saved, and productivity can be enhanced. Still further, at the time of assembly of the hub wheel 101 and the shaft portion 112 of the joint outer race 105, phasing of the splines with respect to each other can be omitted, and hence assembly properties can be enhanced. Yet further, it is possible to avoid damage to tooth surfaces at the time of press-fitting, and hence a stable fitting condition can be maintained. Yet further, as described above, the hardness on the inner diameter side of the hub wheel 101 is set to be low, and hence the recessed portions 136 provided to the hub wheel 101 are fitted to the projection portions 135 of the shaft portion 112 with high fitting properties. Thus, backlash is more effectively prevented in the radial direction and the circumferential direction.

Further, as illustrated in FIG. 17B, on the pitch circle C2 (PCD) of the projection portions 135, the angle θ1 formed by the radial line (line of radius) and the side surface 135b of the projection portion is set to fall within the range of 0°≤θ1≤45°. This is because of the following reasons. That is, regarding an increase in diameter of the hole portion 122 of the hub wheel 101 along with press-fitting of the shaft portion 112, a radial expansion force at the time of press-fitting is liable to act when θ1 is excessively large, and hence a radial expansion amount of the outer diameter of the hub wheel 101 increases at the completion of press-fitting, which leads to an increase in tensile stress (hoop stress) on the outer diameter portion of the outer diameter of the hub wheel 101 and the outer diameter portion of the inner race 124 of the bearing 102. In addition, a radial component force becomes larger at the time of torque transmission, and hence the hub wheel 101 increases in diameter, which also leads to an increase in tensile stress (hoop stress) on the outer diameter portion of the hub wheel 101 and the outer diameter portion of the inner race 124. The tensile stress (hoop stress) thus increased shortens a life of the bearing. In this regard, with the above-mentioned setting, the radial expansion amount of the hub wheel 101 after press-fitting is reduced, with the result that press-fitting properties can be enhanced.

Further, when the pitch circle diameter of the projection portions 135 is represented by PCD and the number of the projection portions 135 is represented by Z, PCD/Z is set to fall within the range of 0.30≤PCD/Z≤1.0. This is because, when PCD/Z is excessively small (when PCD/Z is less than 0.30), an applicable range of the press-fitting margin of each of the projection portions 135 with respect to the hub wheel 101 is markedly small, and a dimensional tolerance is reduced. As a result, it is difficult to perform press-fitting.

In particular, when θ1 is set to fall within a range of 20°≤θ1≤35° and PCD/Z is set to fall within a range of 0.33≤PCD/Z≤0.7, even without taking measures such as use of special steel as a formation material for the shaft portion 112 (joint outer race 105), surface treatment on the projection portions 135, and sharpening of the shapes of the projection portions 135, the recessed portions 136 can be formed with the projection portions 135 by press-fitting the shaft portion 112 made of a general machine-structural steel material. In addition, the radial expansion amount of the hub wheel 101 after the shaft portion 112 is press-fitted can be suppressed. Further, when θ1 is set to θ≥20°, in a case where the projection portions 135 are provided on the shaft portion 112 side, the projection portions 135 can be formed by, among the above-mentioned processing methods, a rolling process in which cost and processing accuracy are best balanced.

When press-fitting of the shaft portion 112 is completed, through intermediation of the inner wall 122d of the hub wheel 101, the male threaded portion 150b2 of the bolt member 150 is tightened to (threadedly engaged into) the bolt hole 113 of the shaft portion 112. In this way, the shaft portion 112 of the joint outer race 105 is bolt-fixed to the hub wheel 101, and hence separation of the hub wheel 101 and the joint outer race 105 is restricted. The bolt member 150 is tightened in such a manner that the seat surface 150a1 of the bolt member 150 is brought into abutment against the receiving surface F' of the hub wheel 101, in other words, in this case, the bottom surface of the concave recessed portion 122e. When tightening of the bolt member 150 is completed, the hub wheel 101 is sandwiched in the axial direction between the head portion 150a of the bolt member 150 and (the back surface 111a of) the mouth portion 111 of the joint outer race 105. In this way, when the hub wheel 101 is sandwiched in the axial direction between the bolt member 150 and the mouth portion 111, flexural rigidity in the axial direction of the bearing device for wheel is further enhanced. As a result, reliability and durability can be enhanced.

Figure 22B:
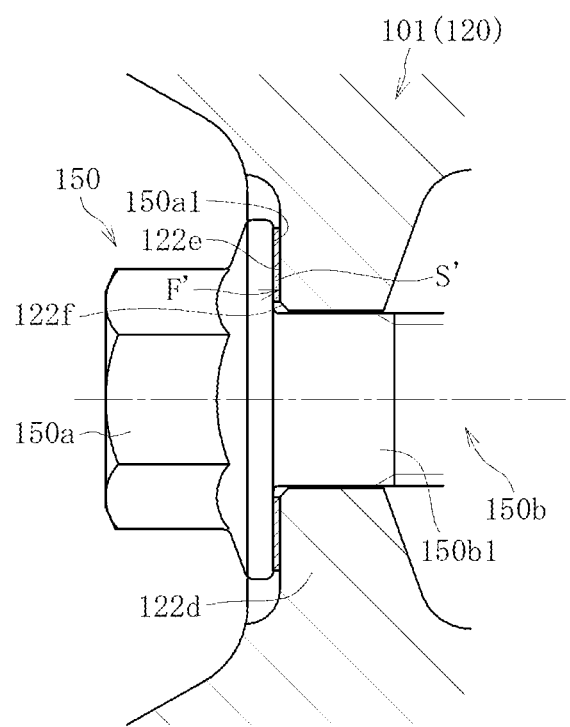
FIG. 22B A view illustrating a case where the structure illustrated in FIG. 22A is additionally provided with a sealing material.

As illustrated in FIG. 22B, a sealing material S' may be interposed between the seat surface 150a1 of the bolt member 150 and the receiving surface F' of the hub wheel 101. With this, sealability between the seat surface 150a1 and the receiving surface F' can be secured, and hence rainwater and a foreign matter can be prevented from intruding from the outboard side into the recess-projection fitting structure M'. A type of the usable sealing material S' is not particularly limited as long as sealability can be secured. For example, as in the sealing material applied to the outer surface of the shaft portion 112, sealing materials made of various resins can be selected and used. As a matter of course, a type of a sealing material different from that applied to the shaft portion 112 may be used. The sealing material may be applied to any one of or both the seat surface 150a1 and the receiving surface F'.

Note that, when the seat surface 150a1 of the bolt member 150 and the receiving surface F' of the hub wheel 101 are held in intimate contact with each other without gaps, it is not necessary to interpose the sealing material S' between the seat surface 150a1 and the receiving surface F'. For example, when the receiving surface F' is grinded, the receiving surface F' is fitted to the seat surface 150a1 of the bolt member 150 with higher fitting properties. Thus, as illustrated in FIG. 22B, the sealing material S' can be omitted. The grinding process on the receiving surface F' can be omitted so as leave a forged surface or a lathing-finished state as it is, as long as sealability is secured.

In the bearing device for wheel described above, the joint outer race 105 is allowed to be separated from the hub wheel 101 so that a bearing part (bearing for wheel 102) and a joint part (constant velocity universal joint 103) can be individually repaired when it is necessary, for example, to repair the bearing device for wheel. In order to separate the joint outer race 105 from the hub wheel 101, in the finished product state illustrated in FIG. 16, the bolt member 150 is removed. After that, a pulling-out force equal to or larger than a fitting force of the recess-projection fitting structure M' is applied to between the hub wheel 101 and the shaft portion 112 of the joint outer race 105, to thereby pull out the shaft portion 112 of the joint outer race 105 from the hub wheel 101. With this, the hub wheel 101 (bearing for wheel 102) and the joint outer race 105 (constant velocity universal joint 103) are separated from each other. Here, a case is exemplified where, after the hub wheel 101 and the joint outer race 105 are separated from each other, the hub wheel 101 and the joint outer race 105 thus separated are re-coupled to each other as they are. In the following, description is made of such a separation step and a re-coupling step in detail.

Figure 23:
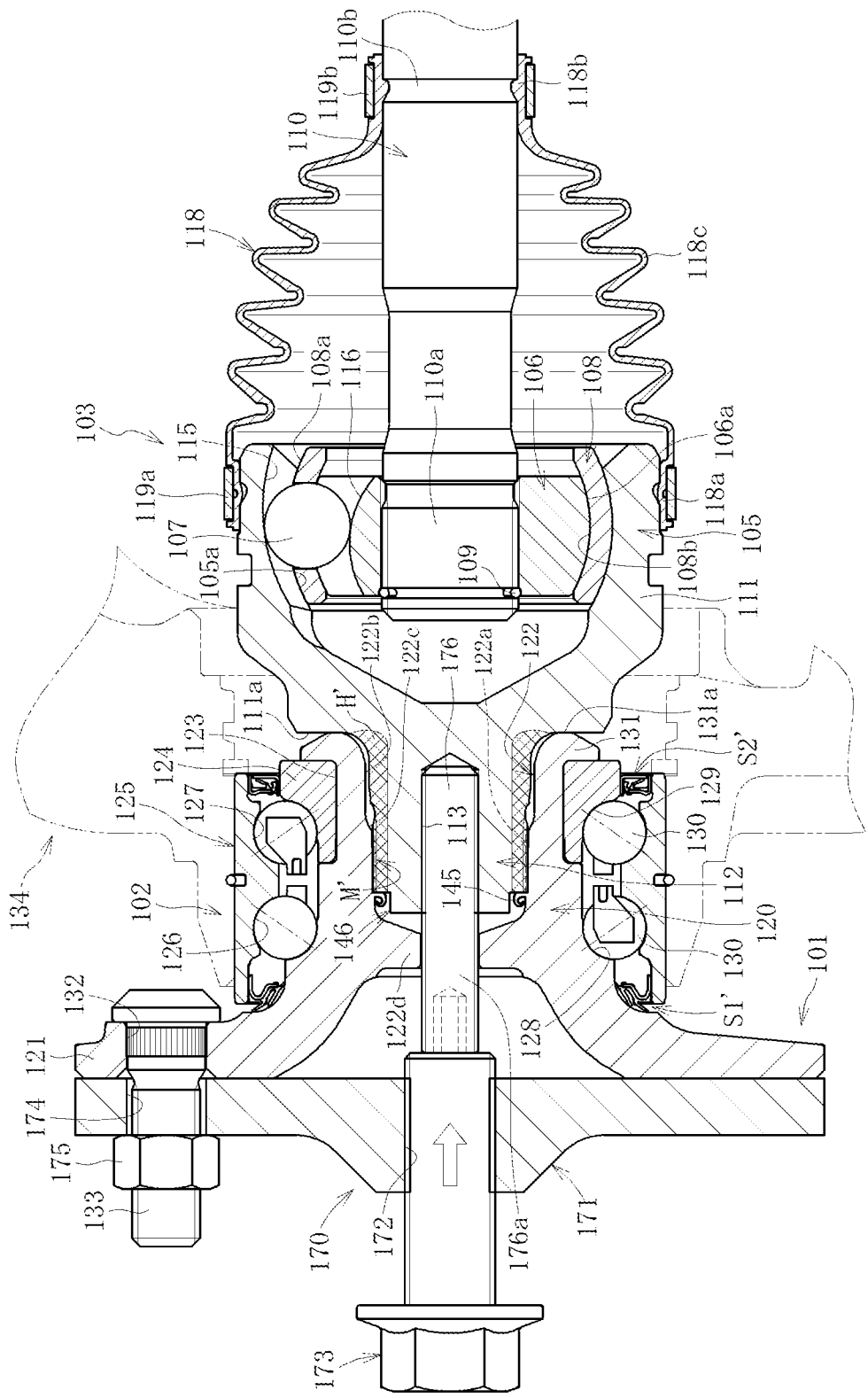
FIG. 23 A sectional view illustrating a separation step for the bearing device for wheel illustrated in FIG. 16.

The separation step, that is, pulling-out of the shaft portion 112 of the joint outer race 105 from the hub wheel 101 can be performed by using, for example, a jig 170 as illustrated in FIG. 23. The jig 170 comprises a platform 171, a pressing bolt member 173 to be threadedly engaged into a threaded hole 172 of the platform 171, and a threaded shaft 176 to be threadedly engaged into the bolt hole 113 of the shaft portion 112. The platform 171 is provided with a through-hole 174. A nut member 175 is threadedly engaged with the hub bolt 133 of the hub wheel 101, which is inserted through the through-hole 174. With this, the platform 171 is overlapped on the flange 121 of the hub wheel 101, and thus the platform 171 is mounted to the hub wheel 101. After the platform 171 is mounted to the hub wheel 101 in this way, the threaded shaft 176 is threadedly engaged into the bolt hole 113 of the shaft portion 112 in such a manner that a proximal portion 176a is projected to the outboard side with respect to the inner wall 122d. A projecting amount of the proximal portion 176a of the threaded shaft 176 is set to be larger than the axial length of the recess-projection fitting structure M'.

The pressing bolt member 173 is arranged coaxially with the threaded shaft 176, and the pressing bolt member 173 is threadedly mounted from the outboard side into the threaded hole 172 of the platform 171. In this state, the pressing bolt member 173 is threadedly advanced in a direction indicated by a hollow arrow in FIG. 23. Because the pressing bolt member 173 is arranged coaxially with the threaded shaft 176, the threaded shaft 176 is pressed to the inboard side when the pressing bolt member 173 is threadedly advanced. In accordance therewith, when the joint outer race 105 is moved to the inboard side with respect to the hub wheel 101 and the pressing bolt member 173 is threadedly advanced somewhat further, the recess-projection fitting structure M' is disengaged. As a result, the hub wheel 101 is separated from the joint outer race 105.

Figure 24:
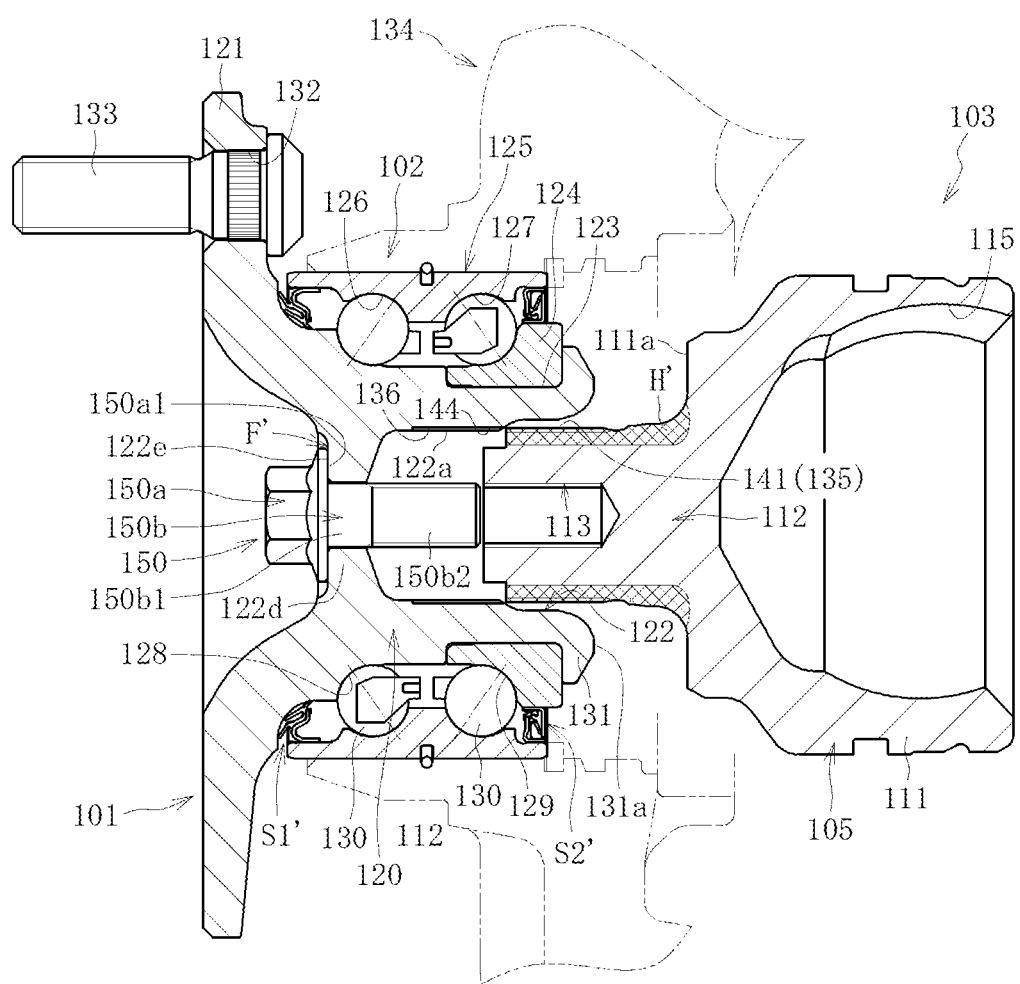
FIG. 24 A sectional view illustrating a state immediately before a re-coupling step after the separation step illustrated in FIG. 23 is started.

Under a state in which the hub wheel 101 and the joint outer race 105 are separated from each other, when the recess-projection fitting structure M' is re-formed by using the bolt member 150 illustrated in FIG. 16, the hub wheel 101 and the joint outer race 105 can be re-coupled to each other. In the re-coupling step, first, as illustrated in FIG. 24, after the platform 171 is removed from the hub wheel 101 and the threaded shaft 176 is removed from the shaft portion 112, the bolt member 150 is inserted along the inner periphery of the inner wall 122d of the hub wheel 101 so that the seat surface 150a1 of the bolt member 150 is brought into abutment against the receiving surface F' of the hub wheel 101. Simultaneously, in such a manner that the projection portions 135 on the shaft portion 112 side and the recessed portions 136 of the hub wheel 101, which are formed by previous press-fitting of the shaft portion 112, are phased with respect to each other in the circumferential direction, the shaft portion 112 of the joint outer race 105 is arranged along an inner diameter of the hole portion 122 of the hub wheel 101. The guide grooves 144 are provided on the inboard side of the recessed portions 136 formed along the hole portion 122 of the hub wheel 101. Thus, it suffices that the projection portions 135 and the guide grooves 144 are phased with respect to each other in the circumferential direction. At a stage immediately before the shaft portion 112 is press-fitted into the hole portion 122 as illustrated in FIG. 24, the male threaded portion 150b2 of the bolt member 150 and the female threaded portion of the bolt hole 113 are held in a non-fitted state. Note that, in FIG. 24, of the components of the constant velocity universal joint 103, only the joint outer race 105 is illustrated.

Figure 25:
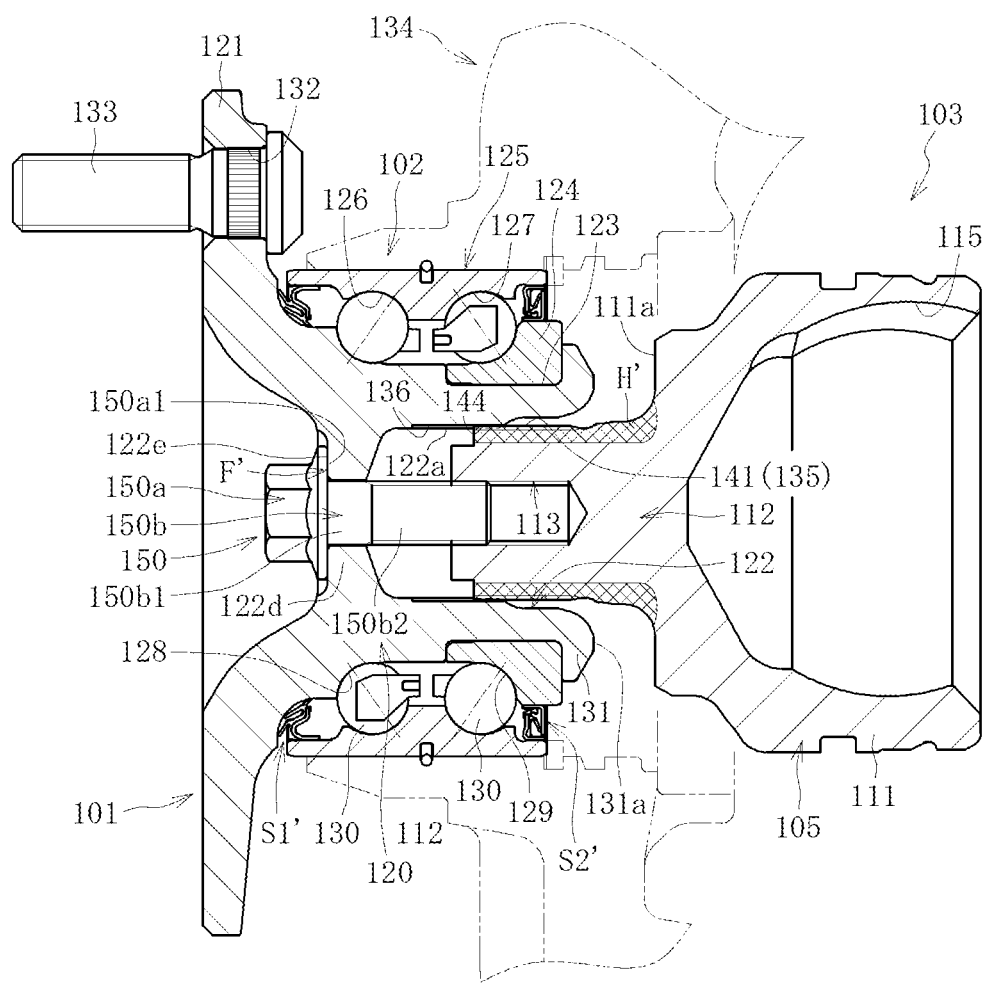
FIG. 25 A sectional view illustrating a state immediately after the re-coupling step is started.

Then, when the joint outer race 105 and the hub wheel 101 are moved closer relative to each other under the state in which the projection portions 135 on the shaft portion 112 side and the recessed portions 136 (guide grooves 144) on the hub wheel 101 side are phased with respect to each other in the circumferential direction, the shaft portion 112 of the joint outer race 105 is fitted into the hole portion 122 of the hub wheel 101, with the result that the projection portions 135 and the guide grooves 144 are fitted to each other. In this way, when the projection portions 135 and the guide grooves 144 are fitted to each other, as illustrated in FIG. 25, the male threaded portion 150b2 of the bolt member 150 is threadedly engaged with the female threaded portion of the bolt hole 113. In this state, when the bolt member 150 is turned so that the bolt member 150 is screwed into the bolt hole 113, thrust is generated. The thrust generated by this screwing-in causes the shaft portion 112 of the joint outer race 105 to be press-fitted into the shaft-portion fitting hole 122a of the hub wheel 101. In this way, as in the previous press-fitting, the recess-projection fitting structure M' in which all the fitting parts of the projection portions 135 with respect to the recessed portions 136 come into intimate contact with the corresponding recessed portions 136 is re-formed. As a result, the joint outer race 105 and the hub wheel 101 are re-coupled to each other.

In this way, when the recess-projection fitting structure M' can be re-formed by screwing the bolt member 150 into the bolt hole 113 again, the recess-projection fitting structure M' can be re-formed without using large-scale equipment such as a press machine for press-fitting. In the second press-fitting, the shaft portion 112 is press-fitted to the inner surface 137 of the shaft portion fitting hole 122a provided with the recessed portions 136, and hence press-fitting can be performed with a load lower than that in the first press-fitting. Because of this, the recess-projection fitting structure M' can be re-formed (the joint outer race 105 and the hub wheel 101 can be re-coupled to each other) by utilizing the thrust generated by screwing-in of the bolt member 150. Therefore, on site such as an automobile maintenance factory, the hub wheel 101 and the joint outer race 105 can be separated from and re-coupled to each other, that is, inspection, maintenance, repair, and the like of a bearing device for wheel can be easily performed. As a result, high maintenance properties can be achieved.

Note that, as illustrated in FIGS. 23 to 25, the hub wheel 101 and the joint outer race 105 can be separated from and re-coupled to each other under a state in which the outer member 125 of the wheel bearing 102 is mounted to the knuckle 134 of a vehicle. Thus, maintenance properties on site are especially satisfactory.

When the hub wheel 101 and the joint outer race 105 are re-coupled to each other by the above-mentioned procedure, it is necessary to particularly consider an overall dimension of the bolt member 150 to be used. For example, when the threaded shaft portion 150b of the bolt member 150 is excessively long, at the time of re-forming the recess-projection fitting structure M', the male threaded portion 150b2 may be threadedly engaged with the female threaded portion of the bolt hole 113 under a state in which the projection portions 135 on the shaft portion 112 side and the recessed portions 136 on the hub wheel 101 side are not phased with respect to each other in the circumferential direction. In this case, when the bolt member 150 is further screwed-in as it is, for example, the shaft portion 112 is press-fitted into the hole portion 122 (shaft-portion fitting hole 122*a*) in an inclined state. As a result, it is difficult to secure predetermined coaxiality between the hub wheel 101 and the joint outer race 105. In this case, the recess-projection fitting structure M' cannot be re-formed with predetermined accuracy, with the result that torque transmission performance and the like are adversely affected. Meanwhile, when the bolt member 150 (threaded shaft portion 150*b*) is excessively short, the male threaded portion 150*b*2 of the bolt member 150 is not threadedly engaged into the bolt hole 113. Thus, the recess-projection fitting structure M' cannot be re-formed by the above-mentioned procedure.

In order to prevent occurrence of such problems, as in the description with reference to FIG. 24, under a state immediately before the shaft portion 112 of the joint outer race 105 is press-fitted into the hole portion 122 of the hub wheel 101, the male threaded portion 150*b*2 of the bolt member 150 and the female threaded portion of the bolt hole 113 are held in a non-engaged state. Specifically, the overall dimension of the bolt member 150 (strictly speaking, overall dimension of the threaded shaft portion 150*b* of the bolt member 150) is set so that, as illustrated in FIG. 25, the male threaded portion 150*b*2 of the bolt member 150 and the female threaded portion of the bolt hole 113 do not come into an engaged state until the shaft portion 112 of the joint outer race 105 starts to be press-fitted into (fitted into) the shaft-portion fitting hole 122*a* provided in the hole portion 122 of the hub wheel 101, specifically, in this case, until the outboard-side end portions of the projection portions 135 provided to the shaft portion 112 are fitted to the guide portion M1' (guide grooves 144) provided at the inboard-side end portion of the shaft-portion fitting hole 122*a*. With this, the above-mentioned problems are effectively prevented from occurring, and the recess-projection fitting structure M' can be re-formed with high accuracy. Thus, also when the hub wheel 101 and the joint outer race 105 are re-coupled to each other, high coupling accuracy can be achieved. As a result, it is possible to provide a highly reliable bearing device for wheel which maintains high assembly accuracy even through repeated inspection, maintenance, repair, and the like.

Hereinabove, description is made of the case where the hub wheel 101 and the joint outer race 105 separated from each other are re-coupled to each other as they are. In addition, for example, even when the hub wheel 101 is damaged and needs to be replaced, the hub wheel 101 and the joint outer race 105 can be coupled to each other by the same procedure. In this case, it is desired that the inner surface 137 of the hole portion 122 (shaft-portion fitting hole 122*a*) of the hub wheel 101 to be newly used be provided with small recessed portions formed at a predetermined interval along the circumferential direction. This is because, by using the hub wheel 101 thus formed, press-fitting resistance at the time of press-fitting of the shaft portion 112 can be reduced, and the hub wheel 101 and the joint outer race 105 can be coupled to each other by the thrust generated by screwing-in of the bolt member 150.

As in the description with reference to FIG. 22A, the inner diameter dimension d1' of the inner wall 122*d* of the hub wheel 101 is set to be slightly larger than the axial diameter d' of the bolt member 150. Thus, the outer diameter of the threaded shaft portion 150*b* of the bolt member 150 and the inner diameter of the inner wall 122*d* can form a guide at the time when the bolt member 150 is threadedly advanced in the bolt hole 113. Thus, the bolt member 150 is prevented from being decentered, and hence the shaft portion 112 of the joint outer race 105 can be press-fitted into the hole portion 122 of the hub wheel 101 with high accuracy. Note that, when an axial dimension (thickness) of the inner wall 122*d* is excessively small, a stable guide function may not be exerted. Meanwhile, when the axial dimension of the inner wall 122*d* is set to be large, the axial length of the recess-projection fitting structure M' cannot be secured. In addition, the hub wheel 101 becomes heavier. Thus, the axial dimension of the inner wall 122*d* to be provided to the hub wheel 101 is determined in consideration of the above-mentioned factors.

Figure 26:
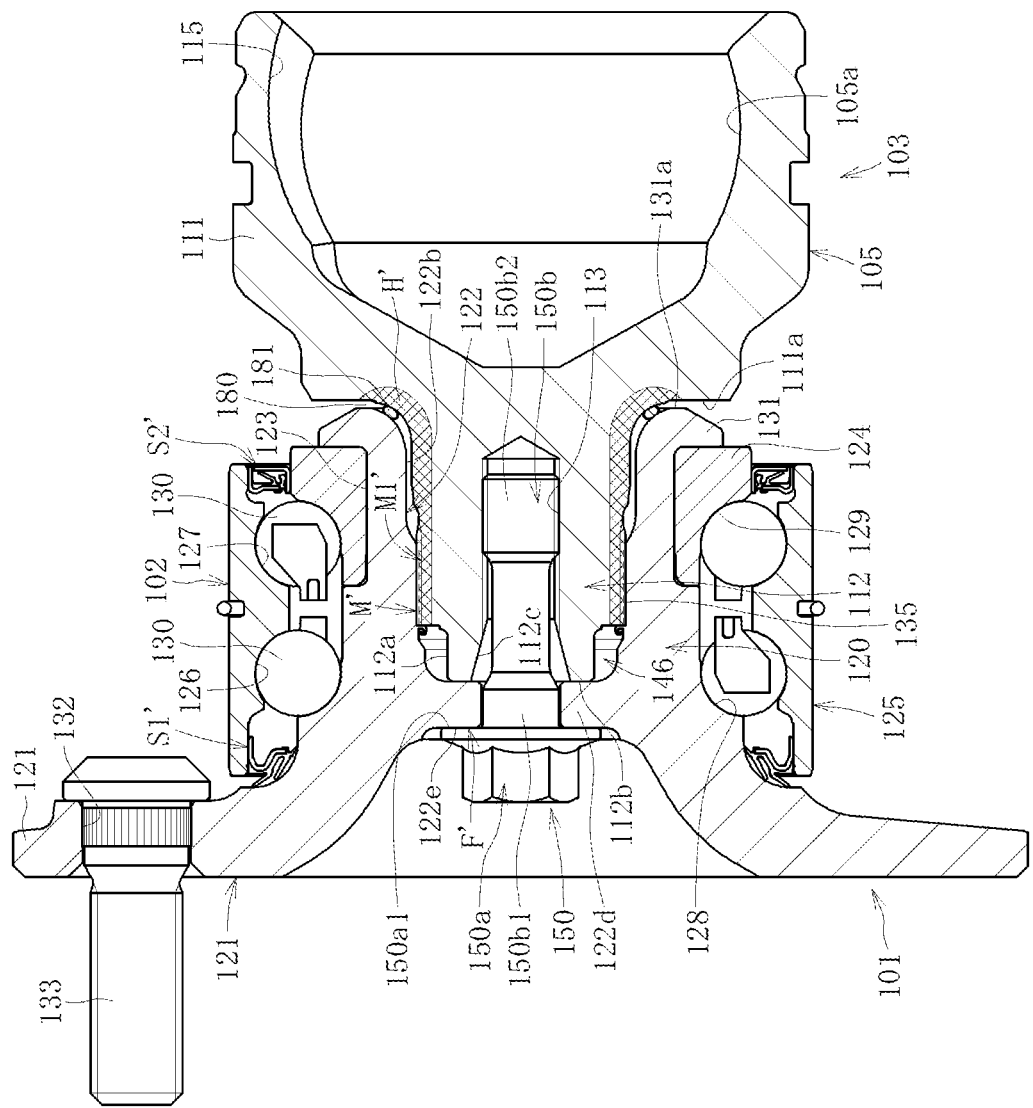
FIG. 26 A sectional view of a bearing device for wheel according to a second embodiment of the second invention of the present application.

FIG. 26 is a sectional view of a bearing device for wheel according to a second embodiment of the second invention of the present application. The bearing device for wheel illustrated in FIG. 26 is different from the bearing device for wheel illustrated in FIG. 16 mainly in that the end surface 131*a* of the crimped portion 131 of the hub wheel 101 and the back surface 111*a* of the mouth portion 111 are kept out of contact with each other and that an axial dimension of the shaft portion 112 (small diameter portion 112*a* in this case) is set to be larger so that an end surface (outboard-side end surface) 112*b* of the shaft portion 112 is brought into abutment against the inboard-side end surface of the inner wall 122*d* of the hub wheel 101. In this case, the inner wall 122*d* of the hub wheel 101 is sandwiched in the axial direction between the head portion 150*a* of the bolt member 150 and the outboard-side end surface 112*b* of the shaft portion 112. In this way, the hub wheel 101 and the joint outer race 105 are positioned in the axial direction.

Figure 27A:
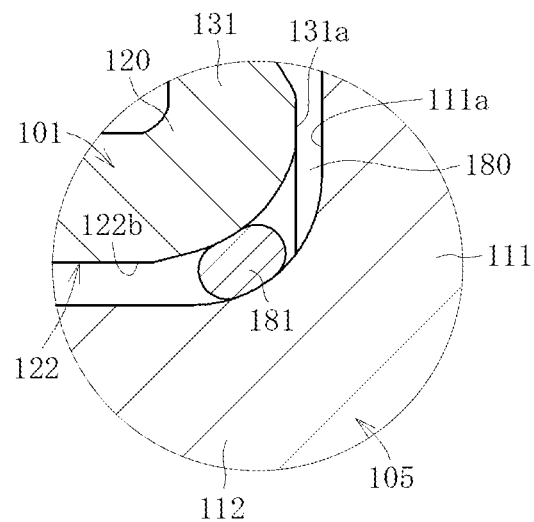
FIG. 27A A main-part enlarged view of FIG. 26.

In this case, also as illustrated in FIG. 27A, a gap 180 is provided between the end surface 131*a* of the crimped portion 131 and the back surface 111*a* of the mouth portion 111. The gap 180 is formed from a region between the crimped portion 131 of the hub wheel 101 and the back surface 111*a* of the mouth portion 111 to a region between the large diameter hole 122*b* of the hub wheel 101 and the shaft portion 112. In this way, when the mouth portion 111 and the hub wheel 101 are kept out of contact with each other, generation of abnormal noise which may be caused by contact of the mouth portion 111 and the hub wheel 101 can be more effectively prevented.

Figure 27B:
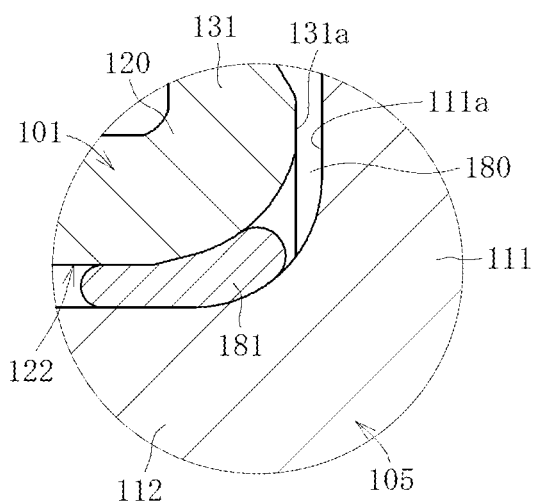
FIG. 27B A view illustrating another example of a sealing member illustrated in FIG. 27A.

When the end surface 131*a* of the hub wheel 101 and the back surface 111*a* of the mouth portion 111 are kept out of contact with each other, foreign matter intrusion prevention means for the recess-projection fitting structure M' is provided on the inboard side with respect to the recess-projection fitting structure M'. Specifically, as illustrated in FIG. 27A, the foreign matter intrusion prevention means is formed of a sealing member 181 fitted in the gap 180 between the crimped portion 131 of the hub wheel 101 and the back surface 111*a* of the mouth portion 111. In this way, by closing the gap 180 to be formed between the crimped portion 131 of the hub wheel 101 and the back surface 111*a* of the mouth portion 111 with the sealing member 181, rainwater and a foreign matter can be prevented from intruding into the recess-projection fitting structure M' from the gap 180. As the sealing member 181, a commercially available O-ring and the like as illustrated in FIG. 27A can be used. Alternatively, for example, a gasket or the like as illustrated in FIG. 27B can be used as well.

Further, in the bearing device for wheel according to the second embodiment, a tapered portion 112*c* increasing in diameter toward the opening side (outboard side) is provided at an opening portion of the bolt hole 113 of the shaft portion 112. When such a tapered portion 112*c* is formed in advance, the male threaded portion 150*b*2 of the bolt member 150 and the female threaded portion of the bolt hole 113 do not come into the engaged state until the shaft portion 122 of the joint outer race 105 starts to be press-fitted into the shaft-portion fitting hole 122a provided in the hole portion 122 of the hub wheel 101, specifically, in this case, until the outboard-side end portions of the projection portions 135 provided to the shaft portion 112 are fitted to the guide portion M1' provided at the inboard-side end portion of the shaft-portion fitting hole 122a. Further, the bolt member 150 used for coupling the hub wheel 101 and the joint outer race 105 to each other and the threaded shaft 176 used for separating the hub wheel 101 and the joint outer race 105 from each other are more easily threaded into the bolt hole 113. Such a structure is applicable also to the bearing device illustrated, for example, in FIG. 16.

Note that, other components than those described above are substantially the same as those of the bearing device for wheel illustrated in FIG. 16. Thus, the same reference symbols are used to omit redundant description.

Figure 28:
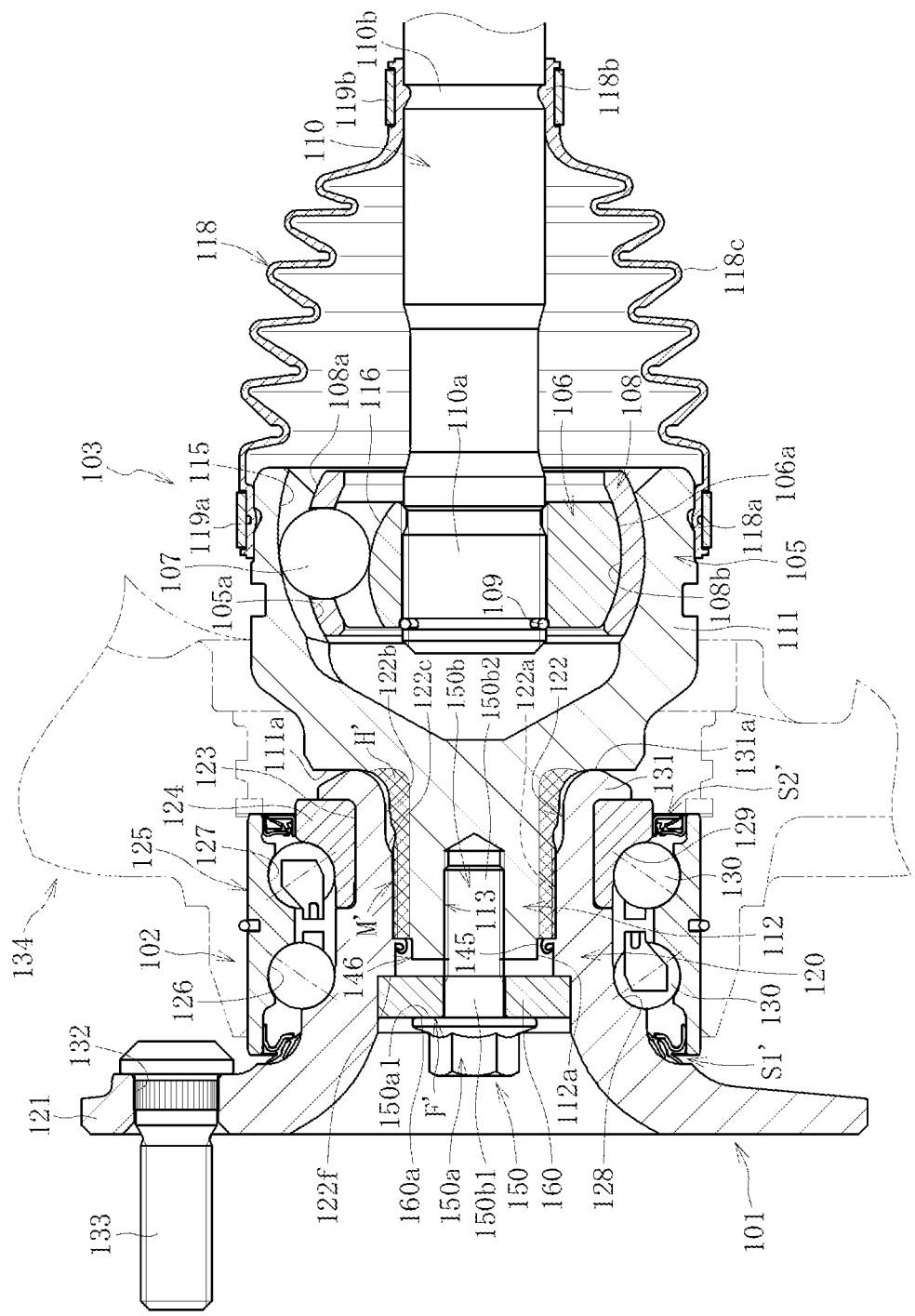
FIG. 28 A sectional view of a bearing device for wheel according to a third embodiment of the second invention of the present application.

FIG. 28 is a sectional view of a bearing device for wheel according to a third embodiment of the second invention of the present application. The bearing device for wheel illustrated in FIG. 28 is different from that illustrated in FIG. 16 mainly in that a step portion 122f is provided at an outboard-side end portion of the cylindrical portion 120 of the hub wheel 101 and that a ring-like receiving member 160 separate from the hub wheel 101 is fitted to the step portion 122f so that the head portion 150a of the bolt member 150 is received by the receiving member 160. Specifically, in this embodiment, an outboard-side end surface 160a of the receiving member 160 serves as a receiving surface F' for receiving the seat surface 150a1 of the bolt member 150. Other components are substantially the same as those of the bearing device for wheel illustrated in FIG. 16. Thus, the same reference symbols are used to omit redundant description.

Note that, although not described with reference to the drawings, as a matter of course, the structure illustrated in FIG. 28 is applicable also to the bearing device for wheel according to the second embodiment of the second invention illustrated in FIG. 26.

The head portion 150a of the bolt member 150 used in the embodiments described hereinabove is integrated with a flange (washer). The washer may be interposed as a separated member between the head portion 150a of the bolt member 150 and the hub wheel 101. In this case, an outboard-side end surface of the washer serves as the receiving surface F' for receiving the seat surface 150a1 of the bolt member 150.

Figure 29A:
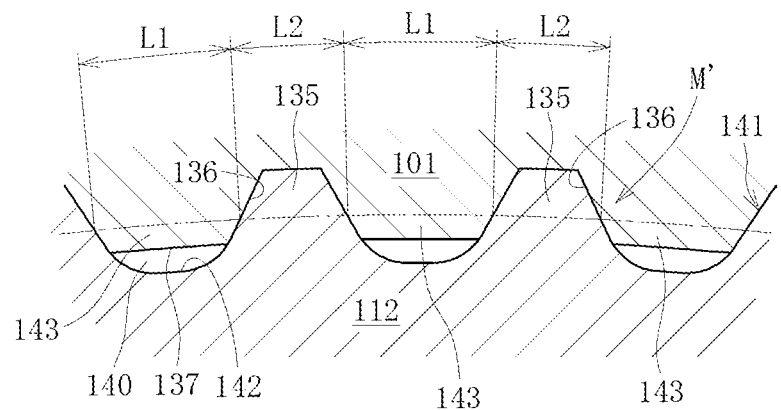
FIG. 29A A view illustrating another example of projection portions of a recess-projection fitting structure.

Further, in the embodiments described hereinabove, as illustrated in FIGS. 17A and 17B, the pitch of the projection portions 135 and the pitch of the recessed portions 136 are set to the same value. Thus, as illustrated in FIG. 17B, at the intermediate portion of each of the projection portions 135 in the height direction, a circumferential thickness L of each of the projection portions 135 and a groove width L0 between the projection portions adjacent to each other are substantially equal to each other. In contrast, as illustrated in FIG. 29A, at the intermediate portion of each of the projection portions 135 in the height direction, a circumferential thickness L2 of each of the projection portions 135 may be set to be smaller than a groove width L1 between the projection portions adjacent to each other. In other words, at the intermediate portion of each of the projection portions 135 in the height direction, the circumferential thickness L2 of each of the projection portions 135 of the shaft portion 112 is set to be smaller than a circumferential thickness L1 of a projecting portion 143 formed between the recessed portions 136 of the hub wheel 101 (L2<L1).

When the above-mentioned relationship is satisfied at each of the projection portions 135, a total sum Σ of the circumferential thicknesses L2 of the projection portions 135 of the shaft portion 112 can be set to be smaller than a total sum E1 of the circumferential thicknesses L1 of the projecting portions 143 of the hub wheel 101. With this, a shear surface area of each of the projecting portions 143 of the hub wheel 101 can be increased, and hence torsional strength can be secured. In addition, a tooth thickness of each of the projection portions 135 is small, and hence a press-fitting load can be reduced. As a result, press-fitting properties can be enhanced.

In this case, it is not necessary for all the projection portions 135 and the projecting portions 143 to satisfy the relationship of L2<L1. As long as the total sum Σ of the circumferential thicknesses of the projection portions 135 of the shaft portion 112 is smaller than the total sum Σ1 of the circumferential thicknesses of the projection portions 143 of the hub wheel 101, some of the projection portions 135 and the projecting portions 143 may satisfy a relationship of L2=L1 or L2>L1.

Figure 29B:
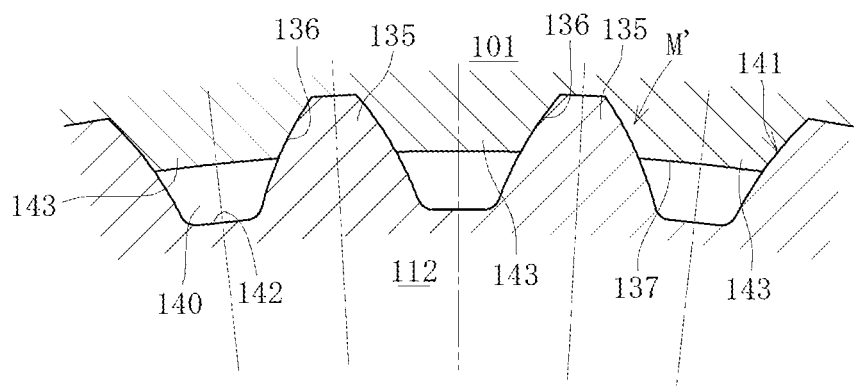
FIG. 29B A view illustrating still another example of the projection portions of the recess-projection fitting structure.

Note that, in FIG. 29A, each of the projection portions 135 is formed into a trapezoidal shape in cross-section. However, the sectional shape of each of the projection portions 135 is not limited thereto. For example, as illustrated in FIG. 29B, each of the projection portions 135 may be formed into an involute shape in cross-section.

Figure 30A:
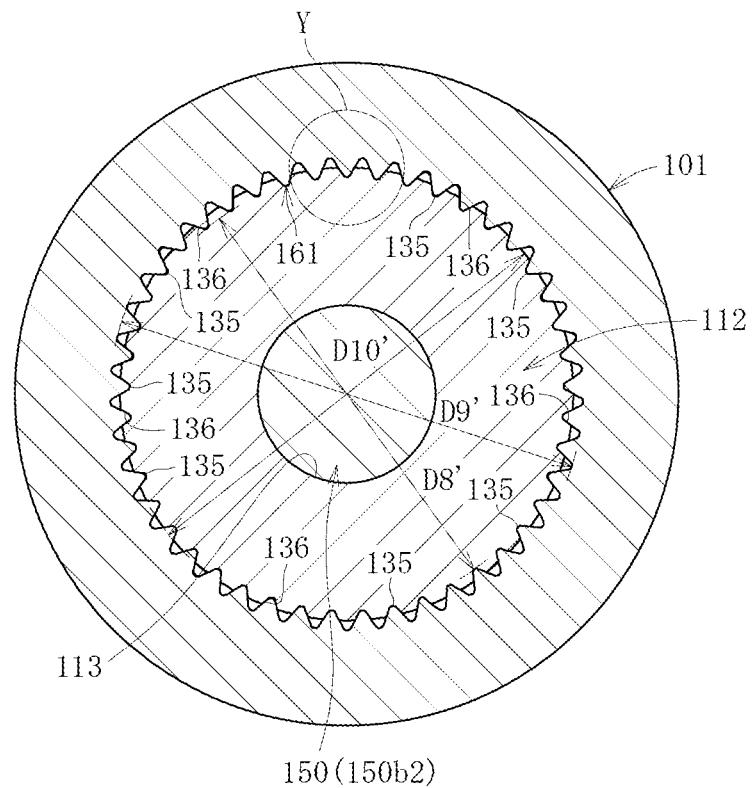
FIG. 30A A sectional view illustrating another embodiment of the recess-projection fitting structure.

In the embodiments described hereinabove, the male spline 141 (projection portions 135) is formed on the shaft portion 112 side. Reversely, as illustrated in FIG. 30, the projection portions 135 may be formed on the hub wheel 101 side through formation of a female spline 161 on the inner surface of the hole portion 122 of the hub wheel 101. In this case, as in the case where the shaft portion 112 is provided with the male spline 141, the hardness of the projection portions 135 of the hub wheel 101 is set to be higher than the outer surface of the shaft portion 112 by 20 points or more in HRC, for example, by means in which the female spline 161 of the hub wheel 101 is subjected to thermosetting treatment while the outer surface of the shaft portion 112 is left unheated. The female spline 161 can be formed by various well-known processing methods such as a broaching process, a trimming process, a pressing process, and a drawing process. Similarly, as for the thermosetting treatment, various types of heat treatment such as induction hardening and carburizing-and-quenching can be employed.

After that, when the shaft portion 112 is press-fitted into the hole portion 122 of the hub wheel 101, with the projection portions 135 on the hub wheel 101 side, the recessed portions 136 to be fitted to the projection portions 135 are formed in the outer peripheral surface of the shaft portion 112. In this way, the recess-projection fitting structure M' in which the projection portions 135 and the recessed portions 136 are held in intimate contact with each other entirely over the fitting parts is formed. The fitting parts 138 of the projection portions 135 and the recessed portions 136 correspond to regions A illustrated in FIG. 30B. The other region of each of the projection portions 135 corresponds to the region B in which the projection portion 135 is not fitted to corresponding one of the recessed portions 136. A gap 162 is formed on the outer diameter side with respect to the outer peripheral surface of the shaft portion 112 and between the projection portions 135 adjacent to each other in the circumferential direction.

Figure 31:
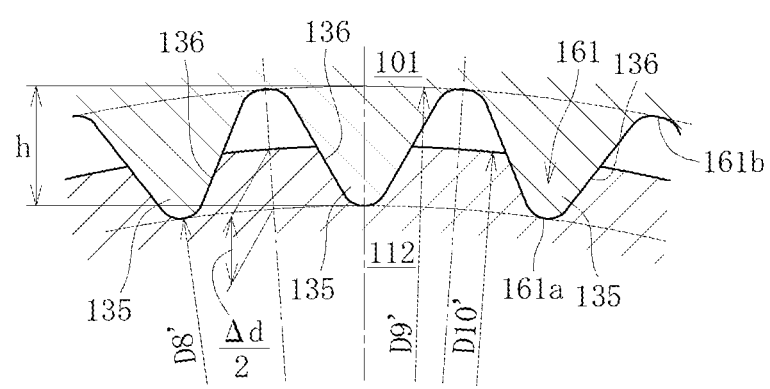
FIG. 31 A main-part enlarged view of FIG. 30A.

As illustrated in FIG. 31, the intermediate portion of each of the projection portions 135 in the height direction corresponds to a position of the outer surface of the shaft portion 112 prior to formation of the recessed portions. In other words, an outer diameter dimension D10' of the shaft portion 112 is set to be larger than a minimum inner diameter D8' of each of the projection portions 135 of the female spline 161 (diameter dimension of a circular orbit passing the tooth tips 161a of the female spline 161) and to be smaller than a maximum inner diameter dimension D9' of the female spline 161 (diameter dimension of a circular orbit connecting the tooth bottoms 161b of the female spline 161 to each other) (D8'<D10'<D9'). Further, when a press-fitting margin of each of the projection portions 135 with respect to the shaft portion 112 is represented by Δd and the height of each of the projection portions 135 is represented by "h", Δd/2h is set to fall within a range of 0.3<Δd/2h<0.86. The press-fitting margin Δd at this time is represented by a difference in diameter between the outer diameter dimension D10' of the shaft portion 112 and the minimum inner diameter D8' of each of the projection portions 135 (D10'−D8'). With this, the part of each of the projection portions 135 near the intermediate portion in the height direction bites into the outer surface of the shaft portion 112, and hence the press-fitting margin of each of the projection portions 135 can be sufficiently secured. As a result, the recessed portions 136 can be reliably formed.

Figure 30B:
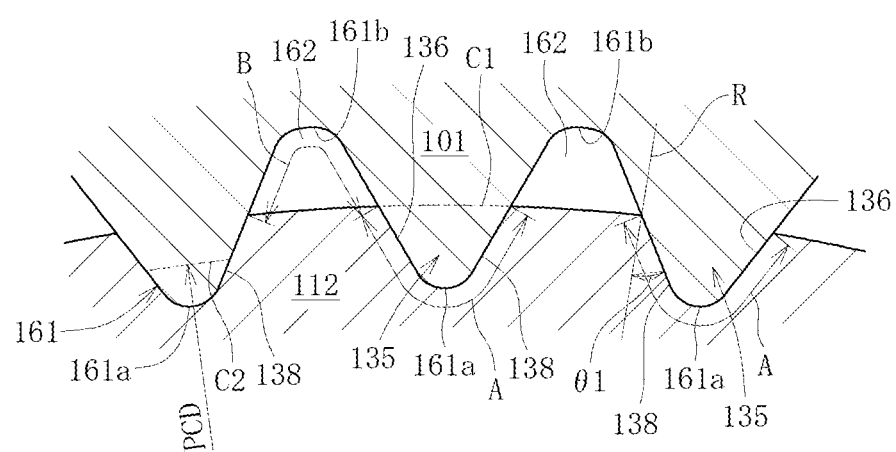
FIG. 30B An enlarged view of a Y portion in FIG. 30A.

Also in this recess-projection fitting structure M', as illustrated in FIG. 30B, the circle C2 which passes, across the projection portions 135, the halfway points of the distance from the circle C1 which passes boundary portions between the region in which the projection portion 135 is fitted to the recessed portion 136 and the region in which the projection portion 135 is not fitted to the recessed portion 136 to the circular orbit passing the tooth tips 161a of the projection portions 135 is defined as the pitch circle. On this pitch circle, the angle θ1 formed by the radial line and the side surface of each of the projection portions is set to fall within the range of 0°≤θ1≤45°. Further, when a diameter of the pitch circle C2 of the projection portions 135 is represented by PCD and the number of the projection portions 135 is represented by Z, PCD/Z is set to fall within the range of 0.30≤PCD/Z≤1.0.

Also in this structure, the extruded portions 145 are formed by press-fitting, and hence it is preferred to provide the pocket portion 146 for accommodating those extruded portions 145. In this structure, the extruded portions 145 are formed on the inboard side of the shaft portion 112, and hence the pocket portion 146 is provided on the inboard side with respect to the recess-projection fitting structure M' and on the hub wheel 101 side (not shown).

As described above, when the projection portions 135 of the recess-projection fitting structure M' are formed on the inner surface of the hole portion 122 of the hub wheel 101, it is unnecessary to perform thermosetting treatment on the shaft portion 112 side. Thus, there is an advantage that the joint outer race 105 of the constant velocity universal joint 103 can be manufactured with excellent productivity.

Hereinabove, description has been made of the embodiments of the second invention of the present application. However, the second invention of the present application is not limited to the above-mentioned embodiments, and various modifications may be made thereto. For example, for the projection portions 135 of the recess-projection fitting structure M', there may be employed a projection portion 135 having various sectional shapes other than the shapes illustrated in FIGS. 17, 18A to 18C, 29A, and 29B, such as a semi-circular shape, a semi-elliptical shape, and a rectangular shape. In addition, the area, the number, a circumferential arrangement pitch, and the like of the projection portions 135 can also be arbitrarily changed. The projection portions 135 may be formed of a key or the like separate from the shaft portion 112 and the hub wheel 101.

Further, the hole portion 122 of the hub wheel 101 may comprise a modified hole such as a polygonal hole other than a circular hole, and the sectional shape of the shaft portion 112 to be fit-inserted into the hole portion 122 also may comprise a modified sectional shape such as a polygonal shape other than a circular shape. Still further, when the shaft portion 112 is press-fitted into the hub wheel 101, it suffices that a hardness of at least an end portion region of each of the projection portions 135 comprising an end portion thereof on a press-fitting start side is higher than a hardness of a side which is subjected to press-fitting. Thus, it is not necessary to increase the hardness of the entirety of each of the projection portions 135. Further, in the embodiments described hereinabove, as illustrated, for example, in FIGS. 17B and 30B, the gaps 140 and 162 are formed between the outer surface of the shaft portion 112 and the inner surface of the hub wheel 101 of the recess-projection fitting structure M'. However, the entirety of a groove to be formed between the projection portions 135 adjacent to each other may be filled with a body of a counterpart so that such gaps 140 and 162 are not formed.

Although not shown, a member to which a member to be provided with the projection portions 135 is to be press-fitted (a member to be provided with the recessed portions 136) may be provided with small recessed portions in advance at a predetermined interval along the circumferential direction. It is necessary to set a volume of the small recessed portions to be smaller than a volume of the recessed portions 136. When such small recessed portions are provided, a capacity of the extruded portions 145 formed at the time of press-fitting of the projection portions 135 can be reduced. As a result, press-fitting resistance can be reduced. Further, an amount of the extruded portions 145 can be reduced, and hence the capacity of the pocket portion 146 can be saved. As a result, processability of the pocket portion 146 and strength of the shaft portion 112 can be enhanced. Note that, various shapes such as a triangular shape, a semi-elliptical shape, and a rectangular shape can be employed as the shape of the small recessed portion. In addition, the number of the small recessed portions can also be arbitrarily set.

Further, as the rolling elements 130 for the bearing for wheel 102, rollers may be used other than the balls. In addition, in the constant velocity universal joint 103, the joint inner race 106 and the shaft 110 may be integrated with each other through intermediation of the above-mentioned recess-projection fitting structure M'.

Further, in the embodiments described hereinabove, the second invention of the present application is applied to a third-generation bearing device for wheel. In addition, the second invention of the present application may be similarly applied to bearing device for wheels of a first generation type, a second generation type, and a fourth generation type as well.

REFERENCE SIGNS LIST 1 bearing device for wheel
2 constant velocity universal joint
3 outer joint member
4 mouth portion
5 shaft portion
5a small diameter portion (fit-in portion)
5d bolt hole
20 bearing for wheel
21 hub wheel
23 cylindrical portion
23a receiving portion
23c crimped portion
24 hole portion
28 outer raceway surface
29 inner raceway surface
30 bolt member
41 projection portion
42 recessed portion 43 fitting portion
44 male spline
45 guide groove
46 extruded portion
47 pocket portion
M recess-projection fitting structure
M1 guide portion
101 hub wheel
102 bearing for wheel
103 constant velocity universal joint
105 joint outer race
111 mouth portion
112 shaft portion
113 bolt hole
122 hole portion
122a shaft-portion fitting hole
122d inner wall
126, 127 outer raceway surface (outer race)
128, 129 inner raceway surface (inner race)
131 crimped portion
135 projection portion
136 recessed portion
137 inner surface
138 fitting part
144 guide groove
145 extruded portion
146 pocket portion
150 bolt member
150b2 male threaded portion
F' receiving surface
M' recess-projection fitting structure
M1' guide portion

The invention claimed is:

1. A bearing device for wheel, comprising:
a bearing for wheel comprising:
   an outer member having an inner periphery on which double row outer raceway surfaces are formed; and
   an inner member comprising a hub wheel to be mounted to a wheel and having an outer periphery on which double row inner raceway surfaces respectively facing the double row outer raceway surfaces are formed;
a constant velocity universal joint comprising an outer joint member; and
a recess-projection fitting structure, which is formable by press-fitting a projection portion provided to any one of a shaft portion of the outer joint member and a hole portion of the hub wheel and extending in an axial direction to another of the shaft portion of the outer joint member and the hole portion of the hub wheel so that a recessed portion is formed with the projection portion along the another of the shaft portion of the outer joint member and the hole portion of the hub wheel, and in which the projection portion and the recessed portion are held in intimate contact at a fitting part with each other, the hub wheel and the outer joint member being tightened to each other by screwing a bolt member into a bolt hole provided in the shaft portion of the outer joint member, the recess-projection fitting structure being allowed to be separated by being applied with a pulling-out force in the axial direction under a state in which the bolt member is removed,
wherein the hub wheel comprises a receiving portion for the bolt member so that the hub wheel and the outer joint member are tightened with the bolt member to each other between the receiving portion and the bolt hole, and
wherein the shaft portion of the outer joint member comprises a fit-in portion to be fitted along an inner periphery of the receiving portion under a state in which the recess-projection fitting structure is formed, the fit-in portion being used as a part for confirming a fitting condition of the recess-projection fitting structure.

2. A bearing device for wheel according to claim 1,
wherein the projection portion is provided to the shaft portion of the outer joint member, and
wherein a hardness of at least the end portion on the press-fitting start side of the projection portion is set to be higher than a hardness of an inner diameter portion of the hole portion of the hub wheel.

3. A bearing device for wheel according to claim 1,
wherein the projection portion is provided to the shaft portion of the outer joint member, and
wherein the shaft portion of the outer joint member comprises a pocket portion for accommodating an extruded portion formed along with formation of the recessed portion by the press-fitting of the projection portion.

4. A bearing device for wheel according to claim 1,
wherein the projection portion is provided to the hole portion of the hub wheel, and
wherein a hardness of at least the end portion on the press-fitting start side of the projection portion is set to be higher than a hardness of an outer diameter portion of the shaft portion of the outer joint member.

5. A bearing device for wheel according to claim 1, wherein the projection portion is provided to the hole portion of the hub wheel, and
wherein the hole portion of the hub wheel comprises a pocket portion for accommodating an extruded portion formed along with formation of the recessed portion by the press-fitting of the projection portion.

6. A bearing device for wheel according to claim 1,
wherein the projection portion comprises a plurality of projection portions provided at a plurality of points in a circumferential direction, and
wherein, at an intermediate portion of each of the plurality of projection portions in a height direction, a circumferential thickness of the each of the plurality of projection portions is set to be smaller than a groove width between adjacent ones of the plurality of projection portions.

7. A bearing device for wheel according to claim 1,
wherein the projection portion comprises a plurality of projection portions provided at a plurality of points in a circumferential direction, and
wherein, at intermediate portions of the respective plurality of projection portions in a height direction, a total sum of circumferential thicknesses of the respective plurality of projection portions is set to be smaller than a total sum of groove widths between adjacent ones of the plurality of projection portions.

8. A bearing device for wheel according to claim 1,
wherein the inner member further comprises an inner race press-fitted to an outer periphery of an inboard-side end portion of the hub wheel, the double row inner raceway surfaces being provided respectively on an outer periphery of the hub wheel and an outer periphery of the inner race, and
wherein a preload is applied to the bearing for wheel by crimping the end portion of the hub wheel.

9. A bearing device for wheel according to claim 1, wherein an end surface of the hub wheel and an end surface of the outer joint member facing each other are held in contact with each other at surface pressure of 100 MPa or less.

10. A bearing device for wheel according to claim 1, wherein a sealing material is interposed between a seat surface of the bolt member and the receiving surface.

11. A bearing device for wheel according to claim 1, wherein the recess-projection fitting structure is arranged out of a position directly below the double row inner raceway surfaces.

12. A bearing device for wheel according to claim 1, wherein a guide portion for guiding the press-fitting of the projection portion is provided at an end portion on a press-fitting start side of the another of the shaft portion of the outer joint member and the hole portion of the hub wheel.

13. A bearing device for wheel according to claim 12,
wherein the projection portion is provided to the shaft portion of the outer joint member, and
wherein a hardness of at least the end portion on the press-fitting start side of the projection portion is set to be higher than a hardness of an inner diameter portion of the hole portion of the hub wheel.

14. A bearing device for wheel according to claim 12,
wherein the projection portion is provided to the shaft portion of the outer joint member, and
wherein the shaft portion of the outer joint member comprises a pocket portion for accommodating an extruded portion formed along with formation of the recessed portion by the press-fitting of the projection portion.

15. A bearing device for wheel according to claim 12,
wherein the projection portion is provided to the hole portion of the hub wheel, and
wherein a hardness of at least the end portion on the press-fitting start side of the projection portion is set to be higher than a hardness of an outer diameter portion of the shaft portion of the outer joint member.

16. A bearing device for wheel according to claim 12, wherein the projection portion is provided to the hole portion of the hub wheel, and
wherein the hole portion of the hub wheel comprises a pocket portion for accommodating an extruded portion formed along with formation of the recessed portion by the press-fitting of the projection portion.

17. A bearing device for wheel according to claim 12,
wherein the projection portion comprises a plurality of projection portions provided at a plurality of points in a circumferential direction, and
wherein, at an intermediate portion of each of the plurality of projection portions in a height direction, a circumferential thickness of the each of the plurality of projection portions is set to be smaller than a groove width between adjacent ones of the plurality of projection portions.

18. A bearing device for wheel according to claim 12,
wherein the projection portion comprises a plurality of projection portions provided at a plurality of points in a circumferential direction, and
wherein, at intermediate portions of the respective plurality of projection portions in a height direction, a total sum of circumferential thicknesses of the respective plurality of projection portions is set to be smaller than a total sum of groove widths between adjacent ones of the plurality of projection portions.

19. A bearing device for wheel according to claim 12,
wherein the inner member further comprises an inner race press-fitted to an outer periphery of an inboard-side end portion of the hub wheel, the double row inner raceway surfaces being provided respectively on an outer periphery of the hub wheel and an outer periphery of the inner race, and
wherein a preload is applied to the bearing for wheel by crimping the end portion of the hub wheel.

20. A bearing device for wheel according to claim 12, wherein an end surface of the hub wheel and an end surface of the outer joint member facing each other are held in contact with each other at surface pressure of 100 MPa or less.

21. A bearing device for wheel according to claim 12, wherein a sealing material is interposed between a seat surface of the bolt member and the receiving surface.

22. A bearing device for wheel according to claim 12, wherein the recess-projection fitting structure is arranged out of a position directly below the double row inner raceway surfaces.

23. A bearing device for wheel, comprising:
a bearing for wheel comprising:
an outer member having an inner periphery on which double row outer raceway surfaces are formed;
an inner member comprising a hub wheel to be mounted to a wheel and having an outer periphery on which double row inner raceway surfaces respectively facing the double row outer raceway surfaces are formed; and
a plurality of double row rolling elements interposed between the double row outer raceway surfaces and the double row inner raceway surfaces;
a constant velocity universal joint comprising an outer joint member; and
a recess-projection fitting structure, which is formable by press-fitting a projection portion provided to any one of a shaft portion of the outer joint member and a hole portion of the hub wheel and extending in an axial direction to another of the shaft portion of the outer joint member and the hole portion of the hub wheel so that a recessed portion is formed with the projection portion along the another of the shaft portion of the outer joint member and the hole portion of the hub wheel, and in which the projection portion and the recessed portion are held in intimate contact over an entire fitting part with each other,
the hub wheel and the outer joint member being tightened to each other by a bolt member screwed into a bolt hole provided in the shaft portion of the outer joint member, the recess-projection fitting structure being allowed to be separated by being applied with a pulling-out force in the axial direction under a state in which the bolt member is removed,
wherein the hub wheel has a receiving surface, which is formed directly or through intermediation of a separate member, for the bolt member so that the hub wheel and the outer joint member are tightened with the bolt member to each other between the receiving surface and the bolt hole,
wherein a guide portion for guiding the press-fitting of the projection portion is provided at an end portion on a press-fitting start side of the another of the shaft portion of the outer joint member and the hole portion of the hub wheel, and
wherein a length of the bolt member is set so that, at re-assembly of the recess-projection fitting structure after separation of the recess-projection fitting structure, a male threaded portion of the bolt member having a seat surface held in abutment against the receiving surface is free from being engaged with a female threaded portion of the bolt hole until an end portion on the press-fitting start side of the projection portion is fitted to the guide portion.

24. A bearing device for wheel according to claim 23,
wherein the projection portion is provided to the shaft portion of the outer joint member, and
wherein a hardness of at least the end portion on the press-fitting start side of the projection portion is set to be higher than a hardness of an inner diameter portion of the hole portion of the hub wheel.

25. A bearing device for wheel according to claim 23,
wherein the projection portion is provided to the shaft portion of the outer joint member, and
wherein the shaft portion of the outer joint member comprises a pocket portion for accommodating an extruded portion formed along with formation of the recessed portion by the press-fitting of the projection portion.

26. A bearing device for wheel according to claim 23,
wherein the projection portion is provided to the hole portion of the hub wheel, and
wherein a hardness of at least the end portion on the press-fitting start side of the projection portion is set to be higher than a hardness of an outer diameter portion of the shaft portion of the outer joint member.

27. A bearing device for wheel according to claim 23, wherein the projection portion is provided to the hole portion of the hub wheel, and
wherein the hole portion of the hub wheel comprises a pocket portion for accommodating an extruded portion formed along with formation of the recessed portion by the press-fitting of the projection portion.

28. A bearing device for wheel according to claim 23,
wherein the projection portion comprises a plurality of projection portions provided at a plurality of points in a circumferential direction, and
wherein, at an intermediate portion of each of the plurality of projection portions in a height direction, a circumferential thickness of the each of the plurality of projection portions is set to be smaller than a groove width between adjacent ones of the plurality of projection portions.

29. A bearing device for wheel according to claim 23,
wherein the projection portion comprises a plurality of projection portions provided at a plurality of points in a circumferential direction, and
wherein, at intermediate portions of the respective plurality of projection portions in a height direction, a total sum of circumferential thicknesses of the respective plurality of projection portions is set to be smaller than a total sum of groove widths between adjacent ones of the plurality of projection portions.

30. A bearing device for wheel according to claim 23,
wherein the inner member further comprises an inner race press-fitted to an outer periphery of an inboard-side end portion of the hub wheel, the double row inner raceway surfaces being provided respectively on an outer periphery of the hub wheel and an outer periphery of the inner race, and
wherein a preload is applied to the bearing for wheel by crimping the end portion of the hub wheel.

31. A bearing device for wheel according to claim 23, wherein an end surface of the hub wheel and an end surface of the outer joint member facing each other are held in contact with each other at surface pressure of 100 MPa or less.

32. A bearing device for wheel according to claim 23, wherein a sealing material is interposed between a seat surface of the bolt member and the receiving surface.

33. A bearing device for wheel according to claim 23, wherein the recess-projection fitting structure is arranged out of a position directly below the double row inner raceway surfaces.

* * * * *